(12) United States Patent
Torre et al.

(10) Patent No.: US 8,812,379 B2
(45) Date of Patent: *Aug. 19, 2014

(54) METHOD AND SYSTEM BALANCING NET SAVINGS, RESOURCES AND CLAIMS INTO RETIREMENT

(71) Applicant: Advisor Software, Inc., Walnut Creek, CA (US)

(72) Inventors: Nicolo G. Torre, Oakland, CA (US); Andrew T. Rudd, Orinda, CA (US)

(73) Assignee: Advisor Software, Inc., Lafayette, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,466

(22) Filed: Aug. 19, 2013

(65) Prior Publication Data
US 2014/0052669 A1 Feb. 20, 2014

Related U.S. Application Data

(63) Continuation of application No. 12/749,390, filed on Mar. 29, 2010, now Pat. No. 8,515,848, which is a continuation of application No. 11/627,814, filed on Jan. 26, 2007, now Pat. No. 7,689,494.

(60) Provisional application No. 60/785,117, filed on Mar. 23, 2006.

(51) Int. Cl.
*G06Q 40/00* (2012.01)

(52) U.S. Cl.
CPC .................................... *G06Q 40/00* (2013.01)
USPC .............................. 705/30; 705/36 R; 705/35

(58) Field of Classification Search
USPC ...................................................... 705/36 R
See application file for complete search history.

(56) References Cited

U.S. PATENT DOCUMENTS

2005/0004855 A1 * 1/2005 Jenson et al. ................... 705/35

* cited by examiner

*Primary Examiner* — James A Vezeris
(74) *Attorney, Agent, or Firm* — Haynes Beffel & Wolfeld LLP; Ernest J. Beffel, Jr.

(57) ABSTRACT

The present disclosure relates to household portfolio simulation and analysis to provide retirement income. In particular, it discloses advanced technologies for modeling, simulation and analysis of potential economic futures, as applied to household retirement prospects. Improved modeling may capture factors such as concrete objectives of participants' priorities among objectives, risk adversity and starting conditions that impact tax consequences of transactions. Improved modeling may address consistency among similar factors, tax consequences in simulation periods and transactions in real estate and private investments. Improved analyses may apply a margin of safety and/or risk budget analysis to a household portfolio to produce a meaningful presentation.

28 Claims, 22 Drawing Sheets

| Resources | Total $ | Total % |
|---|---:|---:|
| Charles IRA | $450,000.00 | 8.00% |
| Joint Investment Account | $1,540,980.00 | 28.00% |
| Employee Stock Options | $350,000.00 | 6.00% |
| Total Investments | $2,340,980.00 | 43.00% |
| Home Value | $1,500,000.00 | 27.00% |
| Human Capital | $1,450,000.00 | 26.00% |
| Social Security Benefits | $200,000.00 | 4.00% |
| Total Resources | $3,150,000.00 | 57.00% |
| Total All Resources | $5,490,980.00 | 100.00% |

| Claims | Total $ | Total % |
|---|---:|---:|
| Mortgage | $470,000.00 | 9.00% |
| Deferred Taxes | $400,000.00 | 7.00% |
| Estimated Income Tax | $430,000.00 | 8.00% |
| Valuation Adjustments | $53,000.00 | 1.00% |
| Total Obligations | $1,353,000.00 | 25.00% |
| Basic Income | $1,809,000.00 | 33.00% |
| Education | $512,000.00 | 9.00% |
| Total Primary | $2,321,000.00 | 42.00% |
| Additional Income | $560,000.00 | 10.00% |
| Basic Bequest | $450,000.00 | 8.00% |
| Total Secondary | $1,010,000.00 | 18.00% |
| Additional Bequest | $225,000.00 | 4.00% |
| Total Additional | $225,000.00 | 4.00% |
| Wealth Building | 581,980 | 11.00% |
| Total Residual | $581,980.00 | 11.00% |
| Total All Claims | $5,490,980.00 | 100.00% |

Add Goal: Education

*Required Fields*

Goal Name/Description: [Maria Secondary School] ⟵501

Beneficiary: [Maria Lake ▼] ⟵502

Donor Type: [Individual ▼] ⟵503  Donor: [Select One ▼]

Funding: [Personal plus Joint Accounts ▼] ⟵504

Length of Program: [4 years ▼] ⟵505

Start Date:  Month [September ▼]  Year [2010 ▼] ⟵506

Institution: [None Specified ▼] ⟵507

Degree: [None Specified ▼] ⟵508

Annual Cost of Tuition: $ [35,000.00] ⟵509

Annual Cost of Board: $ [18,000.00] ⟵510

Funding Targets

Minimum: % [50.00] ⟵511

Target: % [100.00]

Maximum: % [100.00]

[⊙ HELP]                              [DONE >]  [X CANCEL]

FIG. 5

Add Goal: Retirement Timing & Income

STEPS:

1) Goal Name
2) Charles Howard: Current Retirement Status
3) Charles Howard: Retirement Planning
4) Charles Howard: Partial Retirement Timing
5) Charles Howard: Final Retirement Timing
6) Sally Howard: Current Retirement Status
7) *more ...*

*Required Fields*

Charles Howard: Final Retirement Timing

Select one:

○ Start as soon as possible

○ Start at exact age  Enter age (in years)

⦿ Flexible start range
   Not before age (in years): 68
   Not after age (in years): 70

HELP    < PREVIOUS    NEXT >    X CANCEL

FIG. 7A

Add Goal: Retirement Timing & Income

STEPS:

1) Goal Name
2) Charles Howard: Current Retirement Status
3) Charles Howard: Retirement Planning
4) Charles Howard: Partial Retirement Timing
5) Charles Howard: Final Retirement Timing
6) Sally Howard: Current Retirement Status
7) Goal Amount for Household: Full Employment
8) Goal Amount for Household: Partial Retirement
9) Goal Amount for Household: Final Retirement
10) Summary

*Required Fields*

Goal Amount for Household: Final Retirement

How much disposable income will the Household need during the period of Final Retirement?

Annual Amount in Today's Dollars

Minimum: $ 75,000.00
Target: $ 100,000.00
Maximum: $ 150,000.00

[ ↻ HELP ]  [ < PREVIOUS ]  [ NEXT > ]  [ X CANCEL ]

FIG. 7B

```
<!--Com...===========================================
<!--Com...RetirementTimingGoal                    901
<!--Com...===========================================
```

▲ ObjectType
  = name       RetirementTimingGoal
  ▲ Documentation
        <!--CData
            <p>Extends the RetirementGoal type. This is a special kind of
        FinancialGoal that is actually an aggregation of several goals. The min, target,
        and max values on this goal type are undefined.</p>
            <p>An instance of this type is an assembly of up-to three individual
        IncomeGoals (finalRetirementIncomeGoal, fullEmploymentIncomeGoal, and
        partialRetirementIncomeGoal) and one or two RetirementTiming objects.</p>

▲ ModelProperty (7)

| | = name | = value | = name |
|---|---|---|---|
| 1 | javaPackage | com.asi.m2.beans.g... | isPersistable |
| 2 | | true | |
| 3 | modelPackage | com.asi.m2.beans.goal.retirement | |
| 4 | javaClass | RetirementTimingGoal | 902 |
| 5 | isPersistable | true | |
| 6 | sqlName | RETIREMENT_TIMING_GOAL | |
| 7 | xmlName | RetirementTimingGoal | |

◄ Generalization
- = name                RetirementGoal<RetirementTimingGoal
- = generalizationRef   RetirementGoal
- = specializationRef   RetirementTimingGoal <!--Com... finalRetirementIncomeGoal ◄ Attribute
- = name          RetirementTimingGoal.finalRetirementIncomeGoal
- = domainRef     RetirementTimingGoal
- = codomainRef   IncomeGoal
- ◄ ModelProperty
  - = value   true
  - = name    isPersistable ◄ Association
- = name   FinalRetirementIncomeGoalAssociation
- ◄ ModelProperty
  - = value   modelPackage
  - = name    com.asi.m2.beans.goal.retirement ◄ AssociationEnd (2)

| = name | = rolename | = domainRef | = codomainRef | = navigable | = multiplic... | = aggregation |
|---|---|---|---|---|---|---|
| 1 FinalRetirementIncome GoalAssociation.a | finalRetirementIncome GoalAssociation | FinalRetirementIncome GoalAssociation | RetirementTimingGoal | true | 1 | aggregate |
| 2 FinalRetirementIncome GoalAssociation.b | finalRetirementIncome GoalAssociation | FinalRetirementIncome GoalAssociation | IncomeGoal | true | 1 | none |

902

| Resources | | Total $ | Total % |
|---|---|---:|---:|
| | Charles IRA | $450,000.00 | 8.00% |
| | Joint Investment Account | $1,540,980.00 | 28.00% |
| | Employee Stock Options | $350,000.00 | 6.00% |
| | Total Investments | $2,340,980.00 | 43.00% |
| | Home Value | $1,500,000.00 | 27.00% |
| | Human Capital | $1,450,000.00 | 26.00% |
| | Social Security Benefits | $200,000.00 | 4.00% |
| | Total Resources | $3,150,000.00 | 57.00% |
| | Total All Resources | $5,490,980.00 | 100.00% |

| Claims | | Total $ | Total % |
|---|---|---:|---:|
| | Mortgage | $470,000.00 | 9.00% |
| | Deferred Taxes | $400,000.00 | 7.00% |
| | Estimated Income Tax | $430,000.00 | 8.00% |
| | Valuation Adjustments | $53,000.00 | 1.00% |
| | Total Obligations | $1,353,000.00 | 25.00% |
| | Basic Income | $1,809,000.00 | 33.00% |
| | Education | $512,000.00 | 9.00% |
| | Total Primary | $2,321,000.00 | 42.00% |
| | Additional Income | $560,000.00 | 10.00% |
| | Basic Bequest | $450,000.00 | 8.00% |
| | Total Secondary | $1,010,000.00 | 18.00% |
| | Additional Bequest | $225,000.00 | 4.00% |
| | Total Additional | $225,000.00 | 4.00% |
| | Wealth Building | 581,980 | 11.00% |
| | Total Residual | $581,980.00 | 11.00% |
| | Total All Claims | $5,490,980.00 | 100.00% |

FIG. 11

| Cash Flow Analysis Over-Time | | Item | 2005 | 2010 | 2020 | 2030 |
|---|---|---|---:|---:|---:|---:|
| Investments | | Portfolio Value | $1,000,000.00 | $1,050,000.00 | $725,000.00 | $75,000.00 |
| | x | Rate of Return | 7.00% | 6.00% | 4.50% | 4.50% |
| | | Portfolio Return | $70,000.00 | $63,000.00 | $32,625.00 | $3,375.00 |
| | − | Deferred Income | ($40,000.00) | ($0.00) | ($0.00) | ($0.00) |
| | + | Gains Realized | $0.00 | $10,000.00 | $20,000.00 | $0.00 |
| | | Current Portfolio Income | $30,000.00 | $73,000.00 | $52,625.00 | $143,375.00 |
| Annuity | + | Annuity Payments | $0.00 | $0.00 | $0.00 | $140,000.00 |
| | | Total Investment Income | $30,000.00 | $73,000.00 | $52,625.00 | $143,375.00 |
| Social Security | + | Social Security Income | $20,000.00 | $23,000.00 | $29,900.00 | $38,870.00 |
| Pension | + | Pension | $20,000.00 | $20,000.00 | $20,000.00 | $20,000.00 |
| | | Total Income | $70,000.00 | $116,000.00 | $102,525.00 | $202,245.00 |
| | | Total Income | $70,000.00 | $116,000.00 | $102,525.00 | $202,245.00 |
| | − | Tax Exempt Income | ($15,000.00) | ($20,000.00) | ($25,000.00) | ($120,000.00) |
| | | Taxable Income | $55,000.00 | $96,000.00 | $77,525.00 | $82,245.00 |
| | x | Tax Rate | 22.00% | 19.00% | 19.00% | 19.00% |
| Taxes | | Taxes | $12,100.00 | $18,240.00 | $14,730.00 | $15,627.00 |

FIG. 19A

|  | | | | | |
|---|---|---:|---:|---:|---:|
| Cash Flow | Total Income | $70,000.00 | $116,000.00 | $102,525.00 | $202,245.00 |
| | − Taxes | ($12,100.00) | ($18,240.00) | ($14,730.00) | ($15,627.00) |
| | After-Tax Income | $57,900.00 | $97,760.00 | $87,795.00 | $186,618.00 |
| | + Capital Drawdown | $37,000.00 | $12,000.00 | $55,000.00 | $0.00 |
| | Cash Flow | $94,900.00 | $109,760.00 | $142,795.00 | $186,618.00 |
| Surplus | − Baseline Expense | ($84,000.00) | ($96,600.00) | ($125,580.00) | ($163,254.00) |
| | Surplus Income | $10,900.00 | $13,160.00 | $17,215.00 | $23,364.00 |
| | ÷ Variable Expense | $12,000.00 | $13,800.00 | $17,940.00 | $23,322.00 |
| Analysis | % Variable Expense | 91.00% | 95.00% | 96.00% | 100.00% |

FIG. 19B

IRS Form 1040

The following table is an estimate of your 2006 tax position based on the recommended investment plan. This information is provided to assist you in working with your tax advisor. It does not constitute tax advice and is not your actual tax liability as reported to the IRS.

| | Line on Form | Item Name | Value |
|---|---|---|---|
| Filing status & Exemptions | 2 | Filing Status | Joint |
| | 6a | Exemption | Self |
| | 6b | Exemption | Spouse |
| | 6d | Total Exemptions | 2 |
| Income | 8a | Taxable Interest | $2,000.00 |
| | 8b | Tax Exempt Interest | $8,000.00 |
| | 9a | Ordinary Dividends | $25,000.00 |
| | 8b | Qualified Dividends | $24,000.00 |
| | 13 | Capital Gain | $3,000.00 |
| | 15a | IRA Distribution | $3,000.00 |
| | 15b | Taxable IRA Distribution | $20,000.00 |
| | 16a | Pension and Annuity | $10,000.00 |
| | 16b | Taxable Pension | $20,000.00 |
| | 20a | Social Security Benefits | $20,000.00 |

FIG. 20A

|  |  |  |  |
|---|---|---|---|
|  | 20b | Taxable Social Security Benefits | $5,000.00 |
|  | 22 | Total Income | $48,000.00 |
| Adjusted Gross Income | 25 | IRA Deduction | $3,000.00 |
|  | 35 | Total Adjustments | $3,000.00 |
|  | 36 | Adjusted Gross Income | $45,000.00 |
|  | 39 | Itemized Deductions | $3,000.00 |
|  | 40 | Line 37 minus Line 39 | $42,000.00 |
|  | 41 | Scaled Exemption | $6,200.00 |
|  | 42 | Line 40 minus Line 41 | $35,800.00 |
|  | 43 | Tax | $5,370.00 |
|  | 44 | AMT | $0.00 |
| Tax & Credits | 45 | Line 43 plus Line 44 | $5,370.00 |
|  | 55 | Total Credits | $0.00 |
|  | 56 | Line 43 plus Line 44 | $5,370.00 |
|  | 62 | Total Tax | $5,370.00 |
|  | NOTE: | Quarterly Payment | $1,210.00 |
| Schedule A: Itemized Deductions | 5 | State Income Tax | $2,500.00 |
|  | 6 | Real Estate Tax | $500.00 |
|  | 9 | Total Taxes | $3,000.00 |
|  | 28 | Total Itemized Deduction | $3,000.00 |

©2006 ASI

FIG. 20B

Balance Goals
Based on the information that has been entered under the Resources and Claims sections the following is the current Financial Outlook. More ▶
Margin of Safety — 2111
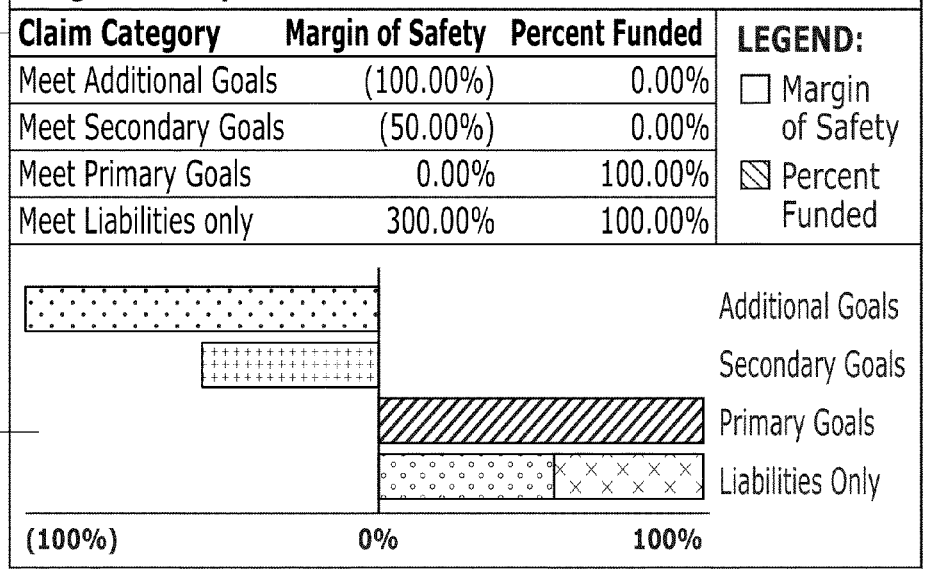
2121
Goal Chart     View | Total Claims Breakdown ▼ |
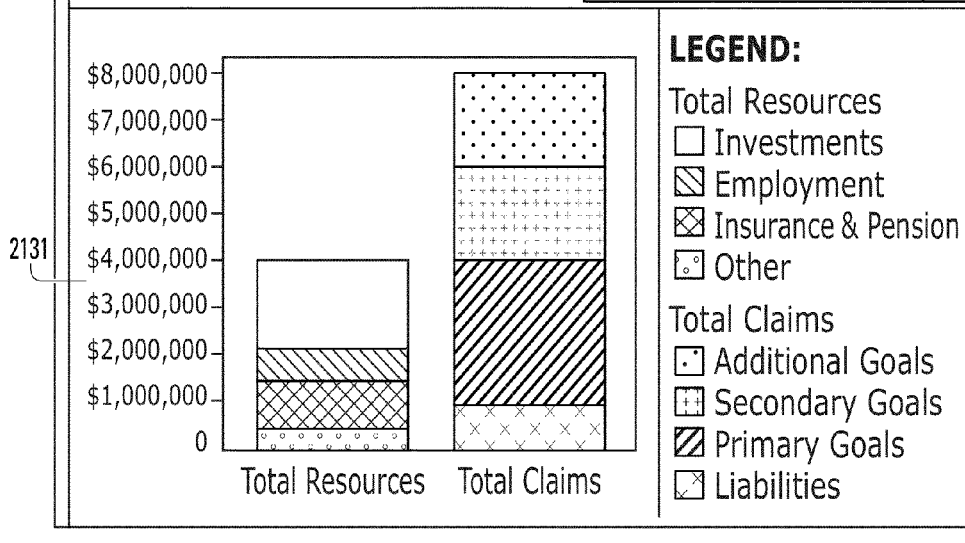
2131
FIG. 21A

| Balance Sheet | |
|---|---:|
| ⊟ Resources | $3,250,000.00 |
| ⊟ Marketable | 2,250,000.00 |
| ⊟ Liquid | 750,000.00 |
| Joint Account | 250,000.00 |
| Stock Purchase | 500,000.00 |
| ⊞ Illiquid | 750,000.00 |
| ⊟ Restricted | 750,000.00 |
| ⊟ Deferred Accounts | 250,000.00 |
| Mindy's IRA | 100,000.00 |
| Scott's 401K | 100,000.00 |
| Scott's IRA | 50,000.00 |
| Sheltered Accounts | 0.00 |
| ⊞ Employee Incentive Compensation | 500,000.00 |
| Contingent | 0.00 |
| ⊟ Income Producing | 1,000,000.00 |
| Social Security | 250,000.00 |
| Deferred Benefits | 750,000.00 |
| Reserve | 0.00 |
| Informational | 0.00 |
| ⊟ Claims | $5,000,000.00 |
| ⊟ Liabilities | 1,104,000.00 |
| ⊞ Loans — 2132 | 250,000.00 |
| Margin Loans | 0.00 |
| ⊞ Insurance Policy Loans | 104,000.00 |

FIG. 21B

METHOD AND SYSTEM BALANCING NET SAVINGS, RESOURCES AND CLAIMS INTO RETIREMENT

RELATED APPLICATIONS

This application is a continuation of U.S. patent application Ser. No. 12/749,390, filed 29 Mar. 2010, titled METHOD AND SYSTEM BALANCING RESOURCES AND CLAIMS INTO RETIREMENT, which issued as U.S. Pat. No. 8,515,848 on 20 Aug. 2013 which is a continuation of U.S. patent application Ser. No. 11/627,814, filed 26 Jan. 2007, titled SIMULATION OF PORTFOLIOS AND RISK BUDGET ANALYSIS, which issued as U.S. Pat. No. 7,689,494 on 30 Mar. 2010 which claims the benefit of U.S. Provisional Patent Application No. 60/785,117, filed Mar. 23, 2006. The related applications are incorporated by reference by reference herein in their entirety.

TABLE OF CONTENTS

Simulation of Portfolios and Risk Budget Analysis
  RELATED APPLICATIONS
  COPYRIGHT NOTICE
  BACKGROUND OF THE INVENTION
  SUMMARY OF THE INVENTION
  BRIEF DESCRIPTION OF THE DRAWINGS
  DETAILED DESCRIPTION
    Overview
    Hardware and Software Architectures
    Use Cases and Interfaces
      Employment Related Resources
      Incentive Compensation
      Employee Stock Option
      Stock Appreciation Right
      Performance Share Award
      Restricted Stock Award
      Defined Benefit Plan
      Social Security
    General Financial Assets
    Real Property
    Private Investments
      Private Mortgage
      Private Firm
      Private Business Loan
      Private Equity
      Cash Flow Method
    Concrete Objectives
    Claims In General
    Debts
      Mortgages
    Investment Strategies
    Retirement Timing and Income Goals
      Retirement Goals Overview
      Retirement Timing
      Income Goals
    Special Expenditures
      Education
      Family Support
      Charitable Giving
    Capital Expenditures
      Real Property Purchase
      Lump Sum
    Estate Planning Goals
      Personal Gifting
      Bequest Goal
      Property Bequest Goal
    Schema Architecture
    Goal Balancing
    Margin of Safety and Lifetime resources and claims Statement
    Tools for Understanding Simulation Results
      Lifetime Resources and Claims Statement Case Study
      Margin of Safety Analysis
    Some Particular Embodiments
      A Method, Embodiments and Aspects
      An Extended Method
      A System, Embodiments and Aspects
      Another Method Resembling the Extended Method
      A General Method
  CLAIMS
Method and System Balancing Net Savings, Resources and Claims Into Retirement
  ABSTRACT

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

The present disclosure relates to household portfolio simulation and analysis to provide retirement income. In particular, it discloses advanced technologies for modeling, simulation and analysis of potential economic futures, as applied to household retirement prospects.

Many books are available to introduce risk budgeting and portfolio simulation to portfolio advisors, such as Pearson, N. 2002. *Risk Budgeting: Portfolio Problem Solving with Value-at-Risk*. New York: Wiley & Sons; Meucci, A. 2005. *Risk and Asset Allocation*. New York: Springer-Verlag; and Scherer, B. 2004. *Portfolio Construction and Risk Budgeting, Second Ed*. London: Risk Books. While these books are very technical and present mathematically sophisticated treatments of institutional portfolios, the problem of simulating and analyzing household portfolios is much more difficult than institutional portfolios. Factors that complicate individual portfolio include limited analytical resources, household objectives that change over a lifetime, prioritization of individual and household objectives, and complex income flows and spending goals. Tax minimization presents more issues and alternatives for a household than for an institutional portfolio. The simple objective of "maximize wealth" and the assumption of "non-satiation" (that dollars are of equal value, regardless of whether monthly income is $1,000 or $10,000 or $100,000) do not suit household portfolios.

Shortcomings of prior household portfolio simulation and modeling approaches reduce the resulting analysis to a general indication of the direction that a retirement plan will go, without enough accuracy to be used as a plan that can be implemented. In other systems, goals are typically mapped independently (1-to-1) with portfolios or sub-accounts, making it difficult for advisors and their clients to understand the interdependencies between goals and make important trade-off decisions. A limited view of the investor's resources is provided, which excludes certain asset classes, product types, assets held away, and major liabilities, frequently providing an overly optimistic or pessimistic view of the likelihood of meeting financial goals. Investment plans assume a static, fixed asset allocation over time, even though the client's investment strategy should be adjusted as their investment time horizon decreases and other changes impact the investment strategy. Investment planning applications are poorly integrated with the financial institution's investment product offerings and investment policies. Goal planning models are typically deterministic and formulaic (vs. stochastic and personalized). Output appears canned or "cookie cutter." Together, these factors typically yield investment plans which are not properly aligned with an investor's true objectives and preferences, and are difficult to manage over time as the investor's resources, investment needs, goals, and priorities shift. Simulation over both capital markets and longevity/morbidity.

A preliminary discussion of household portfolio treatment by some of these inventors appeared as Torre & Rudd, "The Portfolio Management Problem of Individuals: A Quantitative Perspective," Journal of Wealth Management (Summer 2004). It was discussed in a keynote speech at the IMN World Series of ETFs, by Andrew Rudd, "A New Approach to Financial Planning," on Mar. 31, 2005.

An opportunity arises to improve on household portfolio management. In one aspect, concrete goals such as "pay for 100% of Susan's public college BA degree, which currently would cost $XX,000 a year" or "partially retire between age 55 and 65, with a partial retirement income of $XX,000 a year" can be elicited and automatically converted into future financial constraints. Priorities among concrete goals can be elicited, such as goals rated primary, secondary, and additional goals. Levels of satisfaction of concrete goals can be elicited, such as levels rated planned, minimum and better. In another aspect, the potential for unemployment can be evaluated by simulation, reflecting the chance and potential duration of a reversal of fortune. A further aspect is that results of simulations can be reported in terms of complete or partial accomplishment of prioritized goals. Better simulations of future economic impacts and more readily understood measures of effectiveness for alternative portfolio strategies result from various embodiments and combinations of aspects of this technology.

SUMMARY OF THE INVENTION

The present disclosure relates to household portfolio simulation and analysis to provide retirement income. In particular, it discloses advanced technologies for modeling, simulation and analysis of potential economic futures, as applied to household retirement prospects. Improved modeling may capture factors such as concrete objectives of participants' priorities among objectives, risk adversity and starting conditions that impact tax consequences of transactions. Improved modeling may address consistency among similar factors, tax consequences in simulation periods and transactions in real estate and private investments. Improved analyses may apply a margin of safety and/or risk budget analysis to a household portfolio to produce a meaningful presentation.

BRIEF DESCRIPTION OF THE DRAWINGS

FIG. 5 illustrates entry of an educational expense goal, as a concrete objective rather than a cash flow.

FIGS. 7A-7B depict one interface that implements steps in the FIG. 6 flow.

FIGS. 9A-9B include selected excerpts from the object model schema (OMS) of a retirement goal.

FIG. 11 depicts a lifetime resources and claims statement, adapted to retirement planning FIGS. 12-13 graph margin of safety analysis.

FIGS. 19A-19B and 20A-20B present a cash flow and pro form a tax form report generated by simulation.

FIGS. 21A-21B depict a display useful for goal balancing.

DETAILED DESCRIPTION

Figure 1:
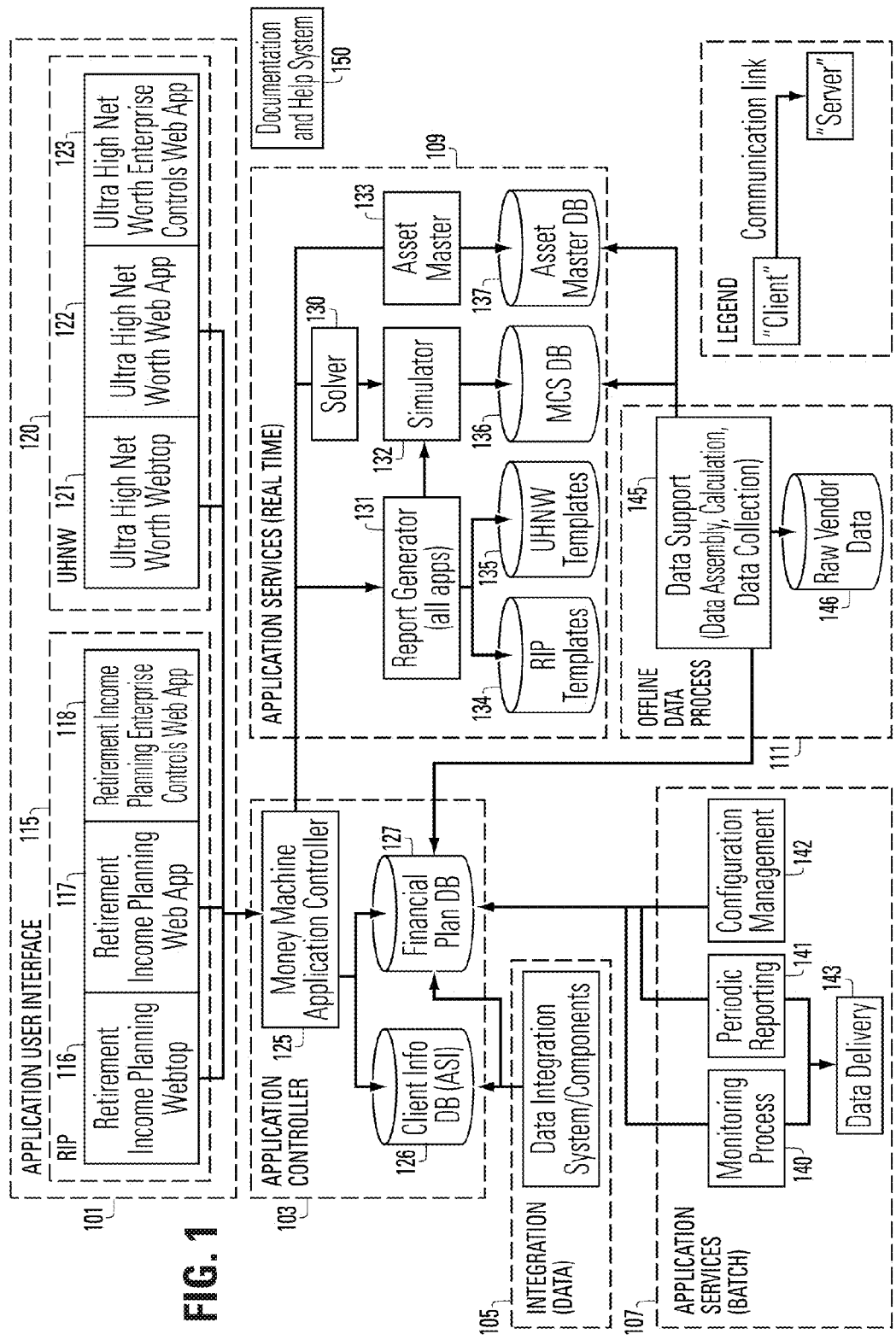
FIG. 1 depicts a high-level hardware architecture that can be used implement embodiments of the technology disclosed.

The following detailed description is made with reference to the figures. Preferred embodiments are described to illustrate the present invention, not to limit its scope, which is defined by the claims. Those of ordinary skill in the art will recognize a variety of equivalent variations on the description that follows.

Overview

A long term plan in an uncertain economic environment is impractical for a human portfolio analyst to test without computer assistance. The limitations and biases of human judgment undermine mental projections. Possible future outcomes explode geometrically as a monthly or more granular time horizon extends to 10, 20 or 30 years. Humans tend to bias projected results, even unconsciously. A long term plan cannot be tested by mental or manual processes. A computer-based system is essential.

Computer-based embodiments address the distinct technical problems of translating concrete objectives into problem constraints that can be tested by simulation, simulating long term plans through self-consistent economic conditions with sufficient repetitions to illustrate the uncertain economic environment, and displaying simulation results in a meaningful way. Some computer-based embodiments may go further, to search for a recommended long term plan. This is particularly computation-intensive, because the satisfaction indifference surface for several concrete objectives is multi-dimensional and may be very complex, with local maxima that are mapped and evaluated using advanced numerical methods.

It is difficult to formulate constraints from concrete objectives for a household's long term plan, because of the difference between concrete objectives and constraints that are amenable to modeling, simulation and sensitivity analysis. For instance, a concrete objective may be to pay for Susan's public college BA degree, which currently would cost $xx,000 a year. A household having a single 10 year old child can look up the current cost of college tuition, but is unlikely to accurately predict its future cost, eight to ten years in advance, much less make a prediction consistent with simulated economic conditions. The range of college options, such as public community colleges, state colleges, and state universities, parochial colleges, private colleges, and select private colleges impacts the rate at which the future cost of education increases—tuition costs typically change at a different rate than living costs. Another example of a concrete objective is to partially retire between age 55 and 65, with a partial retirement income of x current dollars a year. This objective translates into a series of alternative goals to be tested by simulation, with income requirements that are adjusted consistent with the simulation.

Goals such as a bequest, education, family support, financial reserve, lump sum expenditure, real property purchases, household disposable income and wealth building present different timing and tax consequences. Over-simplification of concrete goals into a single annual income requirement is a mistake that concrete goals technology corrects. An automatic tool for translating a concrete goal into formal constraints assists a typical household to be able to describe a whole long term plan; automatically adjusting constraints to match simulated economic conditions over a long-term horizon depends on using a computerized model.

Simulating a range of long-term plans for comparison purposes, taking into account economic uncertainty, is beyond the mental or manual capabilities of even the most skilled analyst. Simulations may be factor driven and should produce self-consistent sets impacts on different types of investments, faithful to historical or adjusted historical covariance data. For instance, when stocks decline sharply, the price of bonds goes up as investors shift their money from equities to bonds. Or, when interest rates go up, bank stocks rise and housing starts to fall. Covariance is a typical measure of how the performance of one asset class tracks another asset class. For overall economic simulation, smaller or larger sets of factors may be used. Monte Carlo simulation is popular for simulating events over time. One or more random number generators typically are invoked for a simulation period to determine the direction and magnitude of economic factor vectors. Individual assets and income requirements are simulated consistent with the economic vectors, sometimes with a secondary random number generator to simulate intra-period variation, for instance, between a particular stock and the sector to which it belongs. In each simulation, a different seed is used for the random number generator(s) and the future economic history follows a different course. Evaluation of a long-term plan may involve 100 or more simulations, to generate a distribution of potential results of following the plan.

As a simulation proceeds, numerous calculations are performed. In a particular period, both the performance of the asset base and the satisfaction of income requirements need to be taken into account. Multiple levels of income requirement satisfaction may be simulated during a particular simulation run. The start of period t+1 depends on the performance of the asset base, the realistic extent to which primary, secondary and additional income goals, planned and minimum income requirements can be met, and the erosion (or accumulation) of the asset base.

Simulating the tax consequences of long-term plans can bring more realistic results, results that tangibly predict a household's economic well-being, rather than pointing a general direction. Tax consequence simulation depends on description of the starting condition of a household portfolio, selection of a long-term plan and simulation of resulting tax realization events. These detailed calculations exacerbate the technical problems encountered trying to evaluate long-term plans.

Extensive simulation can produce too much data. Raw data reports are meaningless to all but the most experienced analysts. Anyone interested in the results of a simulation and the performance of a long-term plan can benefit from well-selected summary statistics. Use of concrete objectives affords a set of summary statistics. For instance, if a household has ten concrete objectives, a simulation can report how often the goals are fully satisfied and, for goals that are not fully satisfied, the extent to which they are partially satisfied. Satisfaction of objectives can be stratified by fortunate, normal and unfortunate economic circumstances, or with additional categories or percentiles of simulated economic outcomes, such as quartiles or deciles. The range of outcomes can be presented both as a spread, over time, in potential results and as wandering paths that exemplary simulations follow to reach to a final event horizon. The impact of partial or full retirement at different ages can be concretely evaluated.

Lifetime resources and claims can be presented in a hybrid balance sheet format, sometimes called a lifetime resources and claims statement. The assets and liabilities of an accountant's balance sheet are bankable and static, at a particular time. Lifetime resources and claims are anticipatory forward looking Resources may be grouped as investments and other resources. Claims may be grouped as obligations, primary, secondary and additional goals, and residual wealth building. Resources include human capital, roughly, future income histories of the household wage earners. Obligations include deferred taxes and income taxes that will be accrued in the future. A current lifetime resources and claims statement summarizes resources and concrete goals. A simulation results lifetime resources and claims statement can be constructed that reflects the results of favorable, expected or unfavorable economic conditions, or other desired ranges of economic conditions. The simulation lifetime resources and claims statement can illustrate scenarios that are easier for a household to understand than raw probabilities, such as "employee stock options lose all value", or "Sally dies prior to Charles, with a resulting loss of income."

Stress testing of scenarios produces results distinct from the usual cases. Stress testing can cover economic conditions, disability, catastrophic illness and even death of a wage earner. The summary measures appropriate for explaining stress tests may differ from the ordinary measures.

Using a computer instead of mental processes or the fullness of time is the only way to rigorously simulate performance of a long term plan. Even with a computer, numerous technical problems are resolved by the technology disclosed, each of which should be considered an invention in its own right. Embodiments need not exercise all of the technical improvements disclosed; it is expected that those of skill will recognize a wide variety of valuable alternative combinations and subcombinations of features described herein, into subsystems, systems and enhanced systems.

Hardware and Software Architectures

FIG. 1 depicts a high-level hardware architecture that can be used to implement embodiments of the technology disclosed. The major groupings of this hardware architecture are applications and user interface 101, application controller 103, data integration 105, batch application services 107, real-time application services 109 and off-line data processes 111. The legend indicates that a client system is linked in communication with a server system. As depicted, this hardware is arranged in an application service provider (ASP) configuration, which means that certain processes, such as computing intensive processes, security sensitive processes and processes that rely on subscription or proprietary data are hosted on servers. In some implementations, the servers will be remotely hosted. Some customers will set up their own servers. A shared server is useful for computing intensive processes, because the computing resources can be shared among many users. In the disclosure that follows, it will be apparent that a few analysis steps involve many times more computing resources than all the data entry steps that precede analysis. A shared server also is useful for security sensitive processes, because fewer systems need to be secured than if all of the sensitive data were downloaded to all of the workstations used for data entry. A shared server is further useful for processes that rely on subscription or proprietary data, because subscriptions often are priced based on the number of servers updated on a regular basis. It may be less expensive or more convenient to update a single server or server farm and perform calculations from the updated hardware than it would be to distribute the subscription data to numerous workstations. Of course, while an ASP model has advantages, some workstations are capable of running both the client and server side of an application. That is, they can run a server such as Apache and also run a browser such as Mozilla that accesses the server.

The application user interface 101 depicts alternative interface applications, complementary levels of service and complementary user and administrative interfaces. The retirement income planning module 115 and the ultra high net worth module 120 represent complementary levels of service and interface structures adapted to different customers. The retirement income planning module 115 potentially includes alternative Webapp 116 and thick client 117 interfaces. The retirement income planning Webapp 116 is commonly known as a thin client. It can be implemented using JavaScript and a conventional browser such as Microsoft Internet Explorer, Netscape's browser, Opera, Safari, Mozilla's Foxfire or another browser. Other implementation software options such as PHP, Perl and Java also are available for thin clients. The retirement planning Webtop 117 is commonly known as a thick client. Some of the programming languages for preparing a thick client include Java and the visual languages, such as Visual Basic and Visual C++. In addition to thick and thin client interfaces, the retirement income planning application includes an enterprise control Webtop 118 (or Webapp) that one or more analysts would use to store and manipulate data for a plurality of customers. The ultra high net worth module 120 similarly includes a Webapp thin client 121, a Webtop thick client 122 and an enterprise control Webapp or Webtop 123. The modules of the application or user interface 101 typically are operated on a laptop, desktop or workstation. The application user interfaces are coupled in communication with an application controller module 103.

The application controller module 103 may include a money machine application controller 125, a client information database 126 and a financial plan database 127. The application controller 103 manages updating of client-related input and invokes real-time application services 109. The application controller process 125 accesses and updates a client information database 126 and a financial plan database 127, responsive to requests from the application and user interface 101. A data integration module 105 can be invoked by the application controller to import information for the client database 126 from an external source such as a brokerage client application. The data integration module 105 also can be invoked by the application controller to import information for the financial plan database 127, such as stock holdings from a client asset list. More than one client asset list may be accessible to the data integration module 105, such as a first asset list for holdings managed by a particular analyst and additional asset lists for brokerage accounts managed elsewhere. Changes in client information or asset lists may be published for access by the data integration module 105 and automatically posted to the client information database 126 and/or the financial plan database 127, without invocation by the application controller module 103. Alternatively, the application controller 125 can publish to the application and user interface 101 the availability of updated data and post updates to the databases 126, 127 under user control, mediated by the application controller module.

The financial plan database 127 further is subject to updating by the batch application services 107 and the off-line data process 111. The batch application services 107 may include a monitoring process 140, a periodic reporting process 141, a data delivery process 143 and a configuration management process 142. The monitoring process 140 repeatedly and periodically checks the status of client assets against the plan. It also may check liabilities. This monitoring process 140 is more persistent and consistently available to watch for variations between the plan and the market than either a client or analyst would be, as the process 140 does not become distracted or take vacations. The monitoring process can monitor for variations from the plan such as a need to rebalance the portfolio, a lack of stoploss orders or a general deterioration in a segment of the client's asset base. The monitoring process may detect deterioration in asset segments more readily and accurately than either a client or analyst would. It uses the data delivery process 143 to reach the client or analyst by predetermined means, consistent with the urgency of a particular alert.

A periodic reporting module 141 may generate reports on demand or at predetermined periods, such as weekly, monthly or quarterly. The monitoring process 140 and periodic reporting process 141 can be connected to a data delivery process 143 that transmits alerts or periodic reports to the client and/or analyst. The data delivery process in 143 may send e-mails, SMS messages, faxes, pages or other alerts. The alerts may provide complete information or a link to a location at which complete information can be accessed.

The off-line data process may include data support 145 and raw vendor data. The raw vendor data 146 is depicted as a database, but may be a Web service or other online source. Raw vendor data may include asset pricing and asset characteristics, such as estimates of volatility and covariance or correlation of performance among asset classes. Data support 145 may include data assembly, calculation and data collection.

The application controller 125 may invoke real-time application services 109. In one embodiment, application services include a report generator 131, a solver and simulator 130, 132 and an asset master 133. In turn, these processes are connected to databases 134-137. As client information is entered, the asset master 133 and asset master database 137 may be accessed for templates used to assemble information about particular client assets and goals or concrete objectives. Reference to master templates simplifies the extension and updating of system designs. Once assets and goals have been entered, the solver 130 and simulator 132 can be invoked. The solver is beyond the scope of this application. One form of simulation uses Monte Carlo simulation. The simulator 132 may access the Monte Carlo simulation database 136. Simulation parameters such as number of simulation runs, time interval, probability distributions for model factors, probability distributions for particular assets given particular model factors, covariance factors and similar data may usefully be maintained in a simulation database. The simulation parameters may reflect a random walk approach, a trending approach or other approach to the relationship of model factors in successive periods.

The basic need of the simulator is a mechanism for generating possible future price paths for the assets and liabilities entering into the simulation, for instance stocks, bonds, houses, college tuitions, living expenses, etc. These paths should be generated consistent with one another so one may evaluate the adequacy of the assets for funding the liabilities.

There are several methods for generating financial asset price paths. Typically, one starts with the current price as given and by generating a chain of price changes arrives at the price at a future time. A price change over a fixed time interval, e.g. a month, is referred to as a return. Typically, one models the returns as being multivariate normally distributed random variables where the distribution is characterized by its mean vector and covariance matrix. The mean vector and covariance matrix are the governing parameters of this model. There is a whole science devoted to how to extract reasonable estimates of these quantities from historical data. Application of the methods to particular financial markets involves a certain degree of art and application of care and judgment. As a result, the commercial marketplace recognizes the models of different practitioners as being distinguishable entities. Thus, one speaks of the Barra model, the RiskMetrics model and so forth. Certain models have established positions of commercial leadership and are taken as reference or standard models for particular domains of application. The models evolve gradually with changes in the markets.

With the simulation disclosed, we have extended financial modeling methods into new areas. We have developed models of living expenses, house prices and education expenses. We have integrated these new applications with traditional financial asset modeling in a new and systematic fashion. Even recognizing the need for an integrated model appears to be novel, because retirement planning software typically treats inflation as an omnibus parameter that largely drives the outcome of the model.

We also have extended actuarial modeling. Actuaries have long compiled data on the incidence of illness and the probability of dying. We have applied this information to simulating possible life histories that model individuals getting sick, lingering for some period and then dying. The purpose of this level of detailed modeling is to evaluate the adequacy of medical insurance coverage in the context of a total financial plan. It has been difficult to get adequate data to support these analyses since the relevant data collecting agencies (e.g. bureaus of vital statistics, departments of health) do not recognize the questions of interest. Identifying the need to model illness before death in a simulation is a significant contribution of the work disclosed herein.

A report generator 131 can be shared among complementary levels of service offered through the application and user interface 101, such as the retirement investment planning 115 and ultra high net worth 120 services. Templates for alternative services 134, 135 can be combined with financial plan data 127 and simulation results 132 to generate reports.

A documentation and help module 150 complements other modules.

Figure 2:
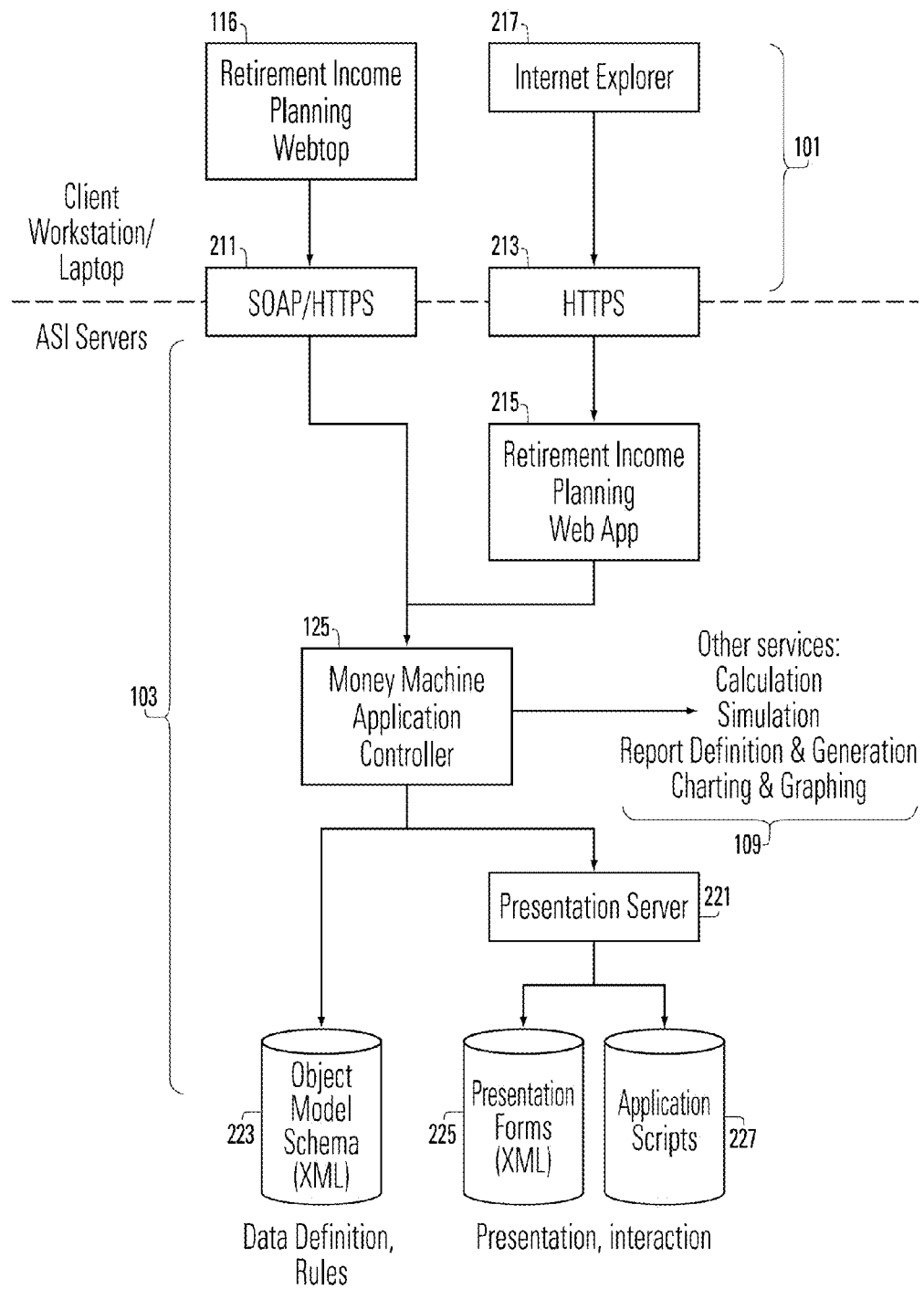
FIG. 2 provides additional detail regarding one implementation of the presentation architecture.

FIG. 2 provides additional detail regarding one implementation of the presentation architecture. Many components of the presentation architecture are numbered as in FIG. 1: the application and user interface 101, the application controller 103 and real-time application services 109. In this schematic diagram, the retirement income planning Web top 116 is the thick client and the Internet explorer 217 supports the thin client. The Web top 116 communicates using SOAP and HTTPS 211 with the application controller 103. The Internet explorer 217 communicates using HTTPS 213 through a Web application 215 with the application controller 125. The Web application 215 reformats data from the Internet explorer 217 to match data from the Web top 116 and uploads JavaScript, applet or similar components to the Internet explorer 217. The application controller interacts with an object model schema 223 and a presentation server 221. The object model schema may be written in XML. It defines data and rules for associations among data elements. The presentation server accesses presentation forms 225 and application scripts 227 that define the interaction with the user and presentation logic.

Figure 3:
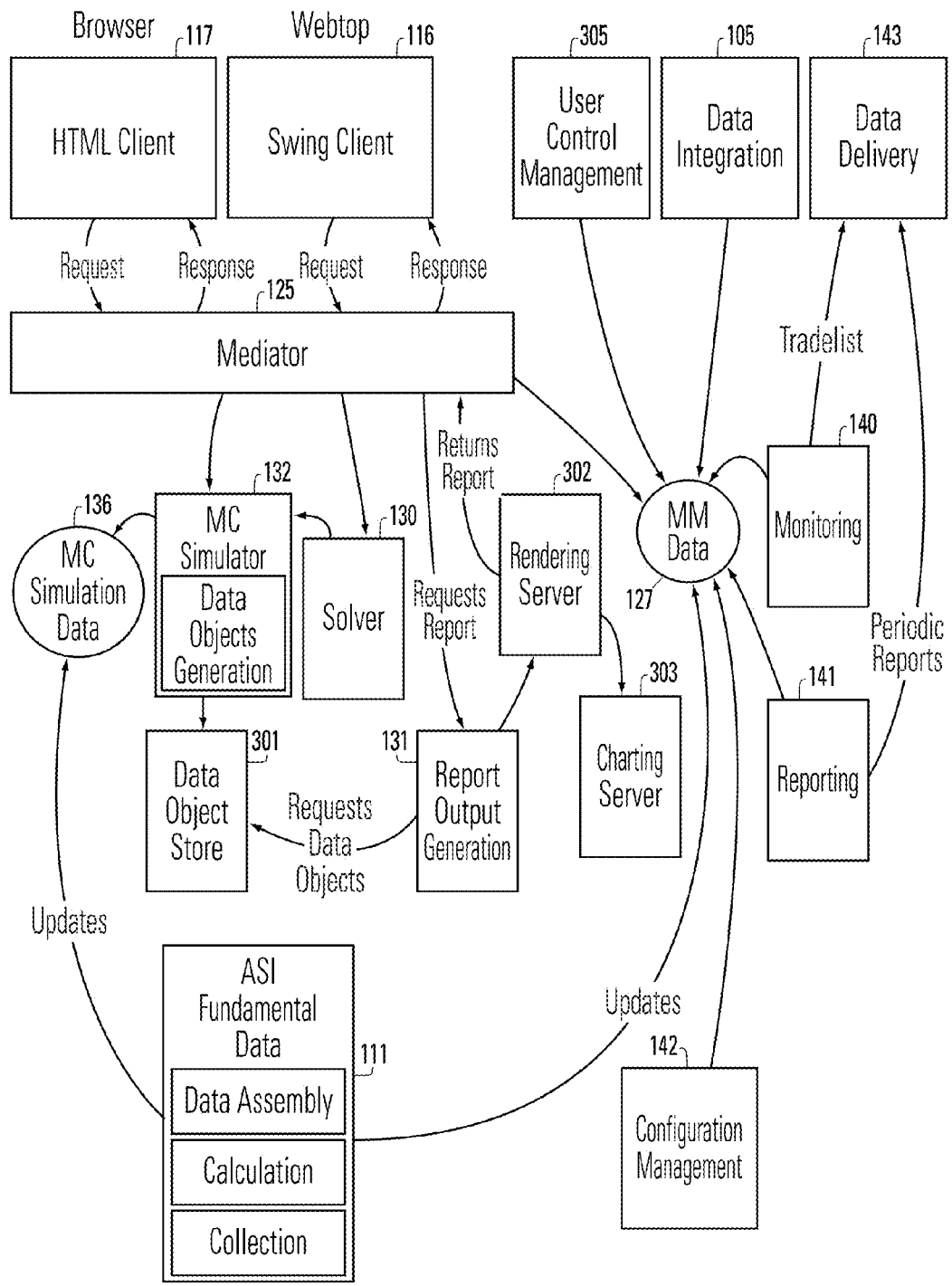
FIG. 3 presents the software architecture without explicit demarcation of the corresponding hardware.

FIG. 3 presents the software architecture without explicit demarcation of the corresponding hardware. To some extent, parallel numbering with FIG. 1 has been applied. To the extent that there are any discrepancies between FIGS. 1 and 3, the figures should be taken as alternative embodiments. In one embodiment, the Web top 116 is implemented as a Java swing client. The Web top 116 interacts via requests and responses with the application controller, which acts as a mediator 125. The mediator alternatively allows an HTML client 117 to interact by requests and responses. Money machine data 127 in this figure includes both client information and financial plan information. Money machine data 127 may be updated by the mediator 125 responsive to client interaction, by configuration management 142, by data integration 105 or by user control management 305. Monte Carlo simulation data is updated by data support 111, which may include processes for data assembly, calculation and collection. In turn, the simulation data is used by the simulator 132 to produce data objects that are persisted in a data object store 301. The mediator 125 can invoke either the simulator 132 or solver 130. Results from the solver can be used in simulation. The mediator also can invoke the report output generator 131, which accesses the data object store and the results of simulation. The report output generator utilizes a rendering server 302, which may invoke a charting server 303 and return a report to the mediator 125. The data support module 111 also updates the money machine data 127. Monitoring and reporting 140, 141 interact with data delivery 143.

Use Cases and Interfaces

Figure 4:
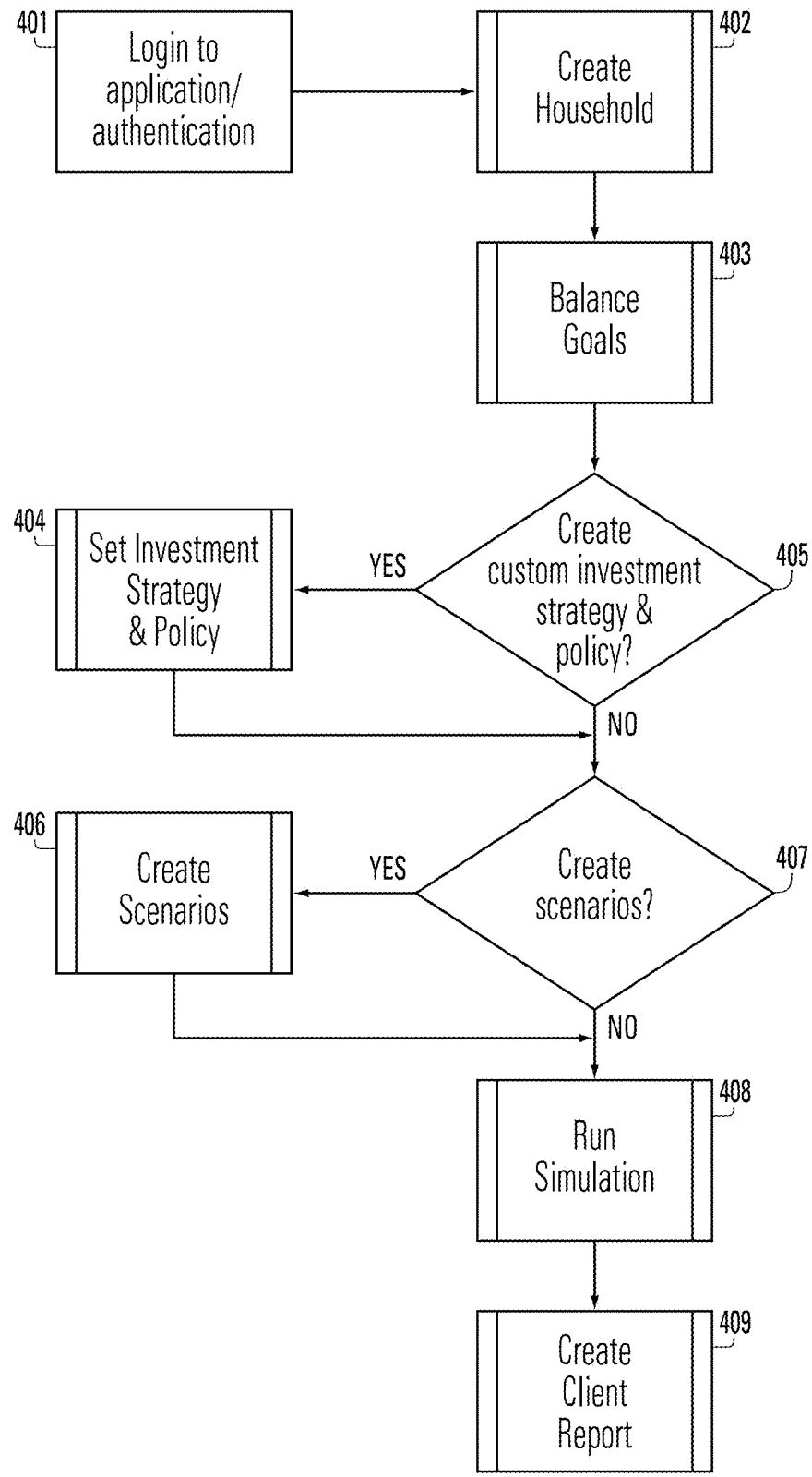
FIG. 4 is a high-level schematic of a use case, proceeding from creation of a household through creation of a client report.

FIG. 4 is a high-level schematic of a use case, proceeding from creation of a household through creation of a client report. This use case involves one or more sessions and interaction with the client, analyst or both. The system is security protected, so access begins with a login 401. Creation of a household 402 includes description of household entities, assets, liabilities and goals. Household entities include the principles and related persons. Principals and assets have tax related information. In some instances, principals have trusts or businesses.

Assets include human capital, captured as a future wage scenario, optionally with factors reflecting potential disruption of employment, and more traditional financial assets, such as insurance, eligibility for Social Security and pensions, and holdings of stocks, bonds and real property. Accounts are set up, assets added to accounts and assets summarized in varying degrees of detail by a lifetime resources and claims statement. Liabilities include deferred taxes, mortgages and other debts. Deferred taxes can be inferred from the basis information and account type information for various assets. Goals include some or all of the retirement goals, paying down a mortgage on the family home, retiring other debts, putting a child through school, donating to charity, leaving a bequest, and supporting a family member who no longer resides with a household. Goals are presented in pull-down menus, wizards or dialogs as concrete objectives, rather than as abstract cash flows.

Employment Related Resources

Employment related resources include human capital, equity based incentive compensation, defined benefit plans and social security. Human capital refers to the capitalized value of future salary. Equity based compensation covers the various schemes companies develop to compensate employees based on the performance of the firm's equity (for instance, employee stock options.) Defined benefit plans are basically a mechanism for deferring receipt of salary income to a future period (typically once the employee has retired.) Social security is a government sponsored defined benefit plan.

Earning potential is a function of education, life experience as revealed by current employment role and career plans. Immediate earning capacity is shown by current salary and expected salary progression. The stability of the current job also needs to be considered and the difficulty of replacing that job should it be lost. For individuals currently seeking employment, the relevant data would be the expected length of the search process and the characteristics typical of the job sought. Earning potential is limited by plans for full or partial retirement. However, we consider those plans in the goal section rather than the resource section. The input data for evaluating earning potential may include:

| Label | Type | Contents |
|---|---|---|
| Person | person | employed person |
| Education | choice | highest educational degree |
| Currently Unemployed | check | true if unemployed |
| Expected length of unemployment | integer | expected length of time until reemployed |
| Type of Employer | choice | type of organization at which employed |
| Business Sector | choice | economic sector in which employed |
| Ticker | symbol | employer's ticker symbol |
| Stability of Employer's Operations | choice | operational stability of employer |
| Effect of General Economy | choice | sensitivity to business cycle |
| Role at Employer | choice | job type |
| Years at Employer | integer | years at this employer |
| Job Security | choice | appraisal of job security |
| Ease of replacing job at current salary | choice | assessment of difficulty of replacing the job |
| Likely length of unemployment | integer | time to find a new job |
| Potential Paycut | float | salary reduction in new job as percentage of current job |
| Current Base Salary | integer | current base pay |
| Bonus | float | typical cash bonus as percentage of base pay |
| Bonus tied to personal performance | percentage | fraction bonus tied to personal performance |
| Bonus tied to firm performance | percentage | fraction bonus tied to firm performance |
| Salary Progression | choice | expected progression in salary |
| Seniority increase | percentage | annual percentage increase in salary due to seniority |

-continued

| Label | Type | Contents |
|---|---|---|
| Seniority cap | integer | level at which seniority increases are likely to halt |

Education choices may include none, primary school, secondary school, technical college, two-year college, four-year college, graduate business degree, professional degree, doctorate, postgraduate specialization. Type of employer may be government, public business corporation, private business corporation, endowed institution, unendowed institution, small business, professional partnership, and self-employed. Stability of an employer's operations are classified as very stable, stable, moderately stable, or not stable. Sensitivity to the business cycle is classified as not effected, somewhat effected, or strongly effected. Role at employer is classified as staff, professional staff, manager, executive, senior executive, or proprietor. Job security is classified as very secure, secure, uncertain, and not secure. Ease of replacing the job is classified as easy, not difficult, some difficulty, might not be possible. Salary progression is classified as stable, cost of living increase, seniority and cost of living increase. Seniority increase and cap are grayed unless seniority and cost of living increase is selected for salary progression.

The lifetime resources and claims statement presentation of human capital may be:
  Insured Value
  Uninsured Value
  (Job Security Adjustment)
  Net Value
  memo: bonus percentage Assume partial retirement and full retirement occur at their target dates. Take full salary to be base plus bonus. If currently employed, project forward the full salary taking into account planned salary progression and any period of partial employment. One may calculate salary progression as:
  Stable: No change in salary
  Cola: Salary escalates annually by inflation rate
  Seniority: Let r be the sum of seniority rate and inflation rate. Each year increase salary cap by inflation rate. Increase salary by rare r until it hits cap, then keep it equal to cap (which continues to receive a cola.)

To give effect to partial employment, calculate the full employment value and then multiply by the percent employed fraction. If unemployed, propend a search period of zero income, and then project forward. Let $\tau$ denote the age at which death benefits terminate. Denote the present value of full salary in years up to $\tau$ discounted at the risk free rate as $P_1$. Denote the actuarial present value of these salary years as $P_2$. Denote the sum of death benefits payable under term and whole life insurance as $P_3$. Let $P_4$ be the lesser of $P_1$ and $P_3$. Then $P_4$ is the insured value. Let $P_5$ denote the actuarial present value of salary for years after $\tau$. Let $P_6=P_5+\max(0, P_2-P_4)$, this is the uninsured value. Let $P_7=P_4+P_6$. If job security is not secure, then repeat the calculation assuming immediate unemployment for the indicated length of time and adjusting salary down by the paycut. Denote by $P'_7$ the quantity analogous to $P_7$ calculated in this way. Let $P_8=P'_7-P_7$. If the job is not secure, $P_8$ is the job security adjustment. If job security is uncertain, then the adjustment is $0.5P_8$. Otherwise the adjustment is zero. The net value is the sum of insured value, uninsured value and job security adjustment. The bonus percentage is bonus as a percentage of full compensation.

In simulation, a monthly salary cash flow can be calculated in the amount $$\frac{\chi}{12}(\text{base} + \text{bonus})$$

where $\chi$ is the employment fraction (1 during full employment, less during partial employment, 0 when unemployed or retired). Assume an initial period of unemployment lasts the expected length of time and that partial and full retirement occur at the expected dates. A simulated death terminates salary.

Payment of bonuses is uncertain and, therefore, may be simulated, preferably consistent with simulated economic conditions. Let $\phi_1$ be the typical bonus as a percent of base; let $\phi_2$ the part tied to personal performance; let $\phi_3$ be the part tied to firm performance. Let $\phi_4 = 1 - \phi_2 - \phi - 3$. Let $S(t)$ be the base salary in year t. For an employer which is a public company, let $u_1(t)$ be 0 if the return is negative in year t and 1 otherwise. For other employers, use the return to the stock market index instead of the return to the stock to define $u_1(t)$. Let $u_2(t)$ be a coin toss taking on the values 0 and 1 equally often. Then the bonus in year t is $$[0.85\phi_1 + \phi_2 u_1(t) + \phi_3 u_2(t)]\mu\phi_1 S(t)$$

where $$\mu = 0.85\phi_1 + 0.66\phi_2 + 0.5\phi_3$$

Incentive Compensation

A variety of schemes have been devised, chiefly for compensating executive employees, either based on stock performance or through grants of stock. Goals of these programs are to align the economic interests of the employee and the firm and to encourage employees to remain at their employer. As a result, the schemes typically make a grant at one date but the grant vests over time and the unvested portion is lost should the employee leave the employer before vesting occurs.

Employee Stock Option

Employee stock options are options to purchase the employer's stock at a stated strike price over a period of time. They acquire value if the employer's stock price exceeds the strike price prior to the expiration date of the option. Options are typically granted on a fixed block of shares and some fraction of the block vests on each annual anniversary of the grant. Options cannot be exercised prior to vesting. Employee options typically expire shortly after the employee leaves employment. However, on normal retirement or death, it is usual to allow a fairly substantial time period between the end of employment and option expiration. In some cases, severance of employment for these reasons may not change the option life from that which would apply were employment continued. For tax purposes, options come in three flavors: statutory, non-statutory or incentive. Options may have a tax basis, but usually have just a zero tax basis. The details of the option are spelled out by the employer in the documentation provided to the employee at the time of the option grant.

Input for calculations may include:

| Label | Type | Contents |
| --- | --- | --- |
| Description | text | identifying label |
| Grantee | person | to whom granted |
| Granted | date | date granted |
| Type | choice | |

-continued

| Label | Type | Contents |
| --- | --- | --- |
| Number Shares | integer | number of shares optioned |
| Optioned Security | symbol | ticker symbol of underlying |
| Expiration date | date | when the options expire |
| Special Expiration | choice | how expiration set for retirement and death |
| Special Expiration Period | integer | length of special expiration period |
| Strike Price | float | option strike price |
| Vesting | choice | how options vest |
| level rate | float | fraction grant vesting each anniversary of the grant |
| schedule: date | date | vesting date |
| schedule: amount | integer | number shares vesting on date |
| Prior Exercise | integer | number options in grant already exercised |
| Basis | integer | option basis |
| Grant Date Value | integer | value of options on grant date |

The stock option type may be statutory, non-statutory or incentive. Vesting is complete, level rate or schedule. Level rate may be grayed out or unavailable if vesting is not level rate. Special expiration is immediate (options expire at once), special (options expire a given number of months after employment ends) or normal (options expire at normal time.)

The lifetime resources and claims statement presentation is
Cash Value
Incremental Time Value
(Deferred Tax)
Net Value
memo: unvested amount The effective grant is the number of shares granted less prior exercise. Calculate the currently vested number of shares. If fully vested, this is the effective grant. If vesting is by schedule use the most recent date in the schedule prior to today and subtract the prior exercised shares. If at a level rate, then create a schedule in which a rate percentage of the original grant vests on each annual anniversary of the grant. Then see the prior case. The vesting ratio is vested shares divided by effective grant shares.

The cash price of the option is the excess of the underlying price over the strike price, i.e.

$$\max(0, \text{market price of underlying} - \text{strike price})$$

The time price of an option is the price calculated by the Black-Scholes formula. To apply the formula get the price and volatility of the underlying stock. Also figure the remaining life of the option (time from now until expiration). If job security is secure and life is greater than 3 years, then reduce it to 3 years. If job security is uncertain and life is greater than 18 months, reduce it to 18 months. Get the risk free rate for a maturity equal to remaining life. If job security is insecure, time price is the cash price. Otherwise the time price is the price returned by the Black-Scholes formula. The time value is the time price times the vested shares. The cash value is the cash price times the vested shares. The incremental time value is the time value minus the cash value.

Let $\phi_v$ be the ratio of vested shares to grant shares and $\phi_u$ be the ratio of unvested shares to grant shares. Let $\phi_v$ times the grant date value be the effective grant value. Let $\phi_u$ times the basis be the effective basis. Let x be the cash value. We calculate tax on vested shares as follows:

Statutory, zero grant value: x times long term capital gains rate

Statutory, nonzero grant values: y is x minus the effective grant value. Let n be the number of years from now until one year past the final expiration date. Let $\rho_n$ be the risk free discount factor for maturity n. Let $t_1$ denote $o_n$ times the ordinary income tax rate times the effective grant value. Let $t_2$ be the capital gain rate times y. The deferred tax is $t_1+t_2$.

Incentive: tax is equal to the AMT rate applied to x.

Non statutory, zero basis: tax is equal to the ordinary income tax rate applied to x.

Non statutory, nonzero basis: tax is zero.

The unvested shares are the effective grant shares less vested shares. Calculate net value as for vested shares, with one exception. For non-statutory options, with nonzero basis make a supplementary calculation of value based on an option expiring on its vesting date and call the result z. Let m be the number of years to vesting, subtract the effective basis times $\rho_m$ from z. Multiply the result by the ordinary income rate to get the deferred tax. Here $\rho_m$ is the m year risk free discount factor. Multiple calculations are needed if the options vest over years.

The effective grant is the number of shares granted less prior exercise. Calculate the currently vested number of shares. If fully vested, this is the effective grant. If vesting is by schedule, use the most recent date in the schedule prior to today and subtract the prior exercised shares. If at a level rate, then create a schedule in which a rate percentage of the original grant vests on each annual anniversary of the grant. Then see the prior case. The vesting ratio is vested shares divided by effective grant shares. Model as a stock option on the underlying for the vested number of shares. When executed, the treatment described below applies:

Statutory: No tax is recognized until acquired stock is sold. The basis of the stock is the strike price of the option and the holding period commences on option exercise.

Incentive: We term the price of the underlying at the time of exercise as the exercise price. The excess of the exercise price over the strike is known as spread. If the stock acquired through exercise is sold within two years of the option grant or within one year of exercise, then the spread is recognized as SALARY income. The difference between the sale price and the exercise price is recognized as capital gain. If this gain is actually a loss, then it is applied first to reduce the salary income from the spread and only the remainder is taken as a capital loss. If the stock is not sold in the year of exercise then the spread is recognized as AMT income, and the AMT basis of the stock is set equal to the exercise price. If the stock is retained past the one and two year limits, then when sold the difference between sale and strike price receives long-term capital gain treatment for ordinary tax purposes and the difference between sale and AMT basis is the capital gain for AMT purposes.

Non-statutory options, zero basis: When exercised, option spread is SALARY income and basis of acquired stock is exercise price.

Non-statutory option, positive basis: When the option vests, let S be its immediate exercise value and B its basis. The excess of S over B is recognized as SALARY and the new basis of the option is S. Note that this applies even if the option is not exercised. If S is less than B, then no taxable event occurs at vesting and the basis remains B. When the option is exercised, the basis of the option (plus strike) is transferred to the acquired shares and no taxable event occurs. The holding period of the stock includes the holding period of the option. If the option expires unexercised, then a capital loss equal to the basis is realized.

An option may also be exercised for cash. This is equivalent to an option exercise followed by immediate sale of the acquired stock. In general this results in salary income in the amount of the spread. For a non-statutory option with positive basis, however, cash exercise results in a capital gain with a holding period determined by the option expiration date.

Stock Appreciation Right

A stock appreciation award gives the employee the right to receive the difference between the stock price on the day the employee exercises the right and a base price. Typically these rights must be exercised prior to an expiration date. Also the amount which can be paid under a right may be limited by a cap. As with options, a block of rights is typically granted at one time and then vests over a period of time.

Inputs for calculation may include:

| Label | Type | Contents |
| --- | --- | --- |
| Description | text | identifying label |
| Grantee | person | to whom granted |
| Granted | date | date granted |
| Number Shares | integer | number of shares optioned |
| Underlying Security | symbol | ticker symbol of underlying |
| Expiration date | date | when the options expire |
| Base Price | float | base from which appreciation measured |
| Appreciation Cap | float | maximum price |
| Vesting | choice | how options vest |
| level rate | float | fraction grant vesting each anniversary of the grant |
| schedule: date | date | vesting date |
| schedule: amount | integer | number shares vesting on date |
| Prior Exercise | integer | number options in grant already exercised |
| Basis | integer | option basis |

In this embodiment, the vesting choices include complete, level rate or schedule. The level rate option may be unavailable or grayed out, if vesting is not level rate.

In the lifetime resources and claims statement, stock appreciation rights are treated as ESOPs, except for the valuing of the rights. The value of the right is calculated as the difference in two option values. The first option has a strike equal to the base price. The second option has a strike equal to the cap price.

In simulation, there is no cash flow until exercise. At exercise the right pays max(0,underlying price−base price)

Exercise occurs at expiration or when the price of the underlying hits the appreciation cap if not earlier. The cash flow is salary.

Performance Share Award

A performance stock award is typically tied to either a firm's revenue or earnings per share. An evaluation date and target value are established. If the monitored quantity exceeds the target value on the evaluation date and the grantee is still employed, then the employee receives a block of stock. Otherwise the grantee receives nothing. For instance, the current earnings per share might be one dollar. The CEO will be awarded 100,000 shares if the firm's earnings have been doubled in three years. Here, the monitored quantity is earnings per share, the evaluation date is three years after the grant date, the target value is $2 per share and the award is 100,000 shares.

Inputs for calculation may include:

| Label | Type | Contents |
| --- | --- | --- |
| Description | text | identifying label |
| Grantee | person | to whom granted |
| Granted | date | date granted |
| Number Shares | integer | number of shares to be awarded |
| Underlying Security | symbol | ticker symbol of underlying |
| Determination date | date | when the award is evaluated |
| Based on | choice | quantity defining performance |
| Base Value | float | base from which appreciation measured |
| Award Value | float | level required for award |

The award can be based on revenue, earnings, revenue per share or earnings per share.

Restricted Stock Award

A restricted stock grant is a block of shares granted at one time, subject to forfeiture and sales restrictions. The forfeiture restriction establishes a period of time in which the grant may be lost if certain conditions are not met. These conditions will generally be different for each grant and need not concern us. The sale restriction will forbid the sale of the stock during the forfeiture period. The sale restriction may extend beyond the forfeiture period however. The restriction could derive from SEC rules governing stock sales by corporate insiders or it might derive from an explicit condition in the grant. Such a condition could apply for either a fixed period of time (a temporary restriction) or for an indefinite period (a permanent restriction.) The tax treatment of such grants is governed by elections the grantee makes when the grant is received.

Inputs for calculation may include:

| Label | Type | Contents |
| --- | --- | --- |
| Description | text | identifying label |
| Grantee | person | to whom granted |
| Granted | date | date granted |
| Number Shares | integer | number of shares granted |
| Underlying Security | symbol | ticker symbol of underlying |
| Forfeiture Period | check | true if has a forfeiture period |
| Forfeiture Ends | date | date forfeiture period ends |
| Restriction | choice | describes restrictions |
| Restriction Ends | date | date restrictions end |
| Section 83b Election | check | true if section 83b tax election was made |
| Basis | integer | tax basis if section 83b election made |

Choices for restrictions are insider trading related, indefinite term and restriction ends date.

Defined Benefit Plan

Defined benefit plans are pension arrangements established by employers for employees. The benefit paid under the plan is related to the length of the employee's service. Accordingly, we distinguish between active life plans and retired life plans. An active life plan is one where the beneficiary is still working for the employer sponsoring the plan and thus has the opportunity to increase his ultimate benefit level. A retired life plan is one where the employee has left the employer and the benefit level is thus frozen. The structure of benefits typically is either an annuity product or a lump sum payment. Because the benefit structure is the same for all pension participants, there is not the same ability to tailor the annuity benefit to individual circumstances as occurs with life insurance products. Lump sum payment plans seek to overcome that difficulty by paying out the accumulated plan value at one time and then leaving it up to the beneficiary to purchase the individually tailored annuity benefit from a third party life insurance company.

For active employees one needs to know how the benefit is determined and then estimate what benefit will be earned. We take the basic benefit formula to be $$\text{maximum benefit} = \text{benefit multiplier} \times \text{benefit base}$$

There are several popular schemes for establishing the benefit base:
- the benefit base is a fixed dollar amount
- the benefit base is the number of years of employment
- the benefit base is the salary in the final year of employment
- there is a integer constant N and the benefit base is the average salary over the last N years of employment
- the benefit base is the average salary over the entire period of employment The vesting proportion is typically determined by a schedule which relates the number of years of employment to a proportion. The actual benefit is $$\text{actual benefit} = \text{vesting percentage} \times \text{maximum benefit}$$

Once the actual benefit amount is determined, there are two ways of delivering it: It may be paid out as a lump sum; or it may be paid as a life annuity, either over the employee's life or over the joint life of the employee and the employee's spouse (possibly with a reduction in the benefit on the death of either party).

There is also a timing issue with the benefit as to when it is paid (or when it begins paying, in the case of the annuity). The payment time could be either retirement or the latter of retirement and a specific age. Several examples serve to illustrate this arrangement.

In one instance, for employees with at least 20 years of service, the benefit is 72% of final salary. For employees with more than 25 years of service, the benefit is 80% of final salary. In either case, the benefit is paid annually for the rest of the employee's life beginning at age 65. Here the benefit base is final salary. The benefit multiplier is 0.8 (since the maximum benefit is 80% of final salary). The vesting schedule is

| years of service | vesting proportion |
| --- | --- |
| <20 | 0 |
| 20-25 | 90% |
| >25 | 100% |

Here, the vesting proportion for years 20-25 follows from 72%=90% of 80% where the 80% is the maximum benefit proportion. The payment method is a life annuity on a single life commencing at age 65.

Alternatively, the benefit may be $10,000 for every year of service paid as a lump sum on retirement to all employees with at least 5 years of service. Here the benefit base is the number of years of service. The benefit multiplier is $10,000. The vesting schedule is

| years of service | vesting proportion |
|---|---|
| <5 | 0 |
| 5+ | 100% |

The payment method is lump sum and the timing is retirement.

Another arrangement is a benefit of 5 times the average salary in the last 5 years of employment paid as a lump sum at retirement to all employees with 20 or more years of service. The benefit base is the average salary over the last N years with N equal to 5. The benefit multiplier is 5. The vesting schedule is

| years of service | vesting proportion |
|---|---|
| <20 | 0 |
| 20+ | 100% |

The payment method is lump sum and the timing is retirement.

Note that some benefit formulas are very complex and may not be reduced to the form given here. In this case, one should estimate what the benefit is likely to be, take this amount as the benefit base and set the benefit multiplier to one. The vesting schedule may be taken as

| years of service | vesting proportion |
|---|---|
| >0 | 100% |

For retired lives, the benefit is fixed. It is either a lump sum to be paid out at a date certain or an annuity since lump sums paid at retirement will already have been received by the retired employee.

For the active plan (i.e. worker still employed), input fields may be:

| Label | Type | Contents |
|---|---|---|
| Description | text | identifying label |
| Employee | person | employed person |
| Benefit Base | choice | base for benefits |
| Number Years | integer | number of years off which recent pay average calculated |
| Multiplier | float | multiplier of the benefit base |
| schedule: year | integer | year of employment |
| schedule: vested | float | percent maximum benefit vested |
| start of employment | date | when employment began |
| history: year | integer | calendar year |
| history: salary | integer | salary |
| payment | choice | how benefit is paid |
| at | choice | when benefit paid |
| age | integer | age at which paid |

Here, the benefit base is fixed dollar, years of employment, final pay, recent years and total pay history. Number years is grayed out and unavailable unless recent years is the benefit base. The history fields are grayed out unless recent years or total history is selected. Payment method is lump sum or annuity. Date is retirement or age. Age is grayed unless at is age. If the payment method is annuity then the annuity details (as for the fixed annuity) should be given. For the already retired employee, the fields may include:

| Label | Type | Contents |
|---|---|---|
| Description | text | identifying label |
| Employee | person | employed person |
| Payment | choice | how benefit is paid |
| lump sum: Date | date | date when paid |
| lump sum: amount | integer | when paid |

If the payment method is annuity, then the annuity details are given as for the fixed annuity.

Lifetime resources and claims statement: We suppose employment began at t=0. We let t=t denote now. Suppose first that employment continues until final retirement at $t_f$=t+ n. Let S(t) denote salary at time t. If the prior salary history is given, use it. Otherwise, estimate it as S(t)=S(t)/I(t)/I(t) where I(t) is the CPI-U index at time t. For the future salary progression, use the provided data, or else forecast it as S(t)=S(t)I(t)/I(t). Let B denote the benefit base. If the base is based on final salary then B=S($t_f$). If it is based on n years then $$B = \frac{1}{n}[S(t_f) + S(t_{f-1}) + S(t_{f-2}) + \ldots + S(t_{f-n+1})]$$

If the base is a fixed amount then B is that amount. If B is years of employment then B is $t_f$ times the multiple. Let A denote the benefit amount, it is generally a multiple of B. Let $V_0$ denote the value of the benefit. If the pay-out is a lump sum, the $V_0$ is the present value of A discounted at the risk free constant dollar rate. If the payout is an annuity, project the annuity payments and subtract applicable tax. If they are subject to cola, then discount them at the constant dollar rate to the present. If they are not, then use the dollar discount rate to determine the lump sum equivalent value at retirement and discount it at the constant dollar rate to present. The calculation of $V_0$ assumes the benefit is fully vested. Let $V_1$ be the value $V_0$ multiplied by the appropriate vesting fraction. Next repeat all the calculations assuming immediate retirement and denote the result by $V_2$. Then $U=V_1-V_2$ is the unvested portion. Show $V_1$ as final benefit, the unvested portion U as a subtraction and $V_2$ as the value of the currently vested benefit.

For retired lives, the benefit is an annuity with a current value and with or without cola. Discount it using the risk free dollar or constant dollar rate to get the present value. It is fully vested so there is no unvested amount.

Simulate the salary as in human capital. Apply the benefit formula and vesting schedule to determine the benefit. No tax events occur prior to distribution. If distribution is lump sum, assume it is rolled into a traditional IRA account with zero basis. Otherwise, treat it as converted to an annuity.

Social Security

Social security is a government sponsored defined benefit plan where the benefit is based on a weighted average of the employee's entire life time earning history. The benefit is paid as a joint life annuity over the lives of the employee and the employee's spouse. The benefit is reduced on the death of the employee and is adjusted annually for inflation. The maximum benefit is earned at age 70 and a vesting schedule covers benefits which are commenced at an earlier age. The benefit is also capped so that even if a higher benefit should be computed based on the salary history, only the maximum allowed benefit will be paid. When partial retirement generates income that reduces the maximum allowed benefit, the benefit is capped accordingly. The above describes the core pension benefit provided by social security. The social security program provides a complex array of additional benefits which may be earned (for instance disability insurance). However, we shall not discuss those additional benefits here. The Social Security Administration provides both a website and an annual benefit statement from which one may estimate one's future benefit. For active lives we shall suppose that those estimates are used. For retired lives, the benefit is established by the monthly benefit payment. If both partners in a marriage have worked then the benefit paid will be, while both parties are alive, the greater of the two individual benefits, and after the death of one party, the greater of the survivor's individual benefit and the survivor benefit of the decedent's individual benefit. The survivor benefit is generally 80% of the decedent's individual benefit. For active lives, useful information includes the expected annual benefit and the age at which one expects to begin drawing those benefits. For retired lives, useful information includes the actual monthly benefit being paid and what the benefit will become after the death of a party.

During employed life, the input fields may be:

| Label | Type | Contents |
| --- | --- | --- |
| Description | text | Identifying label |
| Insured | person | covered person |
| Benefit Start | choice | when benefits first drawn |
| Starting age | integer | age at which benefits first drawn |
| Expected Benefit | choice | benefit expected |
| Benefit Amount | integer | monthly benefit amount |

The benefit start choice may be retirement or age. Starting age may be grayed out if benefit start is not age. Expected benefit is a maximum or amount. Benefit amount is grayed out if expected benefit is not amount. During retired life, the input fields may be:

| Label | Type | Contents |
| --- | --- | --- |
| Description | text | Identifying label |
| Insured | person | covered person |
| Benefit Amount | integer | current monthly benefit amount |
| Survivor Benefit | integer | amount paid to the survivor of the covered person |

The lifetime resources and claims statement may project the annuity value, subtract tax and discount it at the constant dollar rate to get its present value. The result is the promised benefit. If the beneficiary was born on or before 1950, then this is also the estimated benefit. Otherwise multiply the promised benefit by a factor and label that as the unsecured benefit. Subtract the unsecured benefit from the promised benefit to get the estimated benefit. This computation reflects the fact that the current program is actuarially underfunded and is likely to be reformed. As we do not know the nature of the reform we show a conservative estimate of the likely value to be realized as the estimated benefit.

In simulation, from benefit start until the first death, a monthly benefit is paid. The monthly benefit is determined by dividing the annual benefit by 12. The annual benefit is adjusted at the start of the year for the change in CPI over the last year. After the first death, the survivor fraction is paid until the second death. This is like an index linked fixed annuity with survivor benefit.

General Financial Assets

A wide variety of general financial assets may be recognized in retirement planning model. They include portfolios and cash assets, such as bank assets, checking accounts, market rate accounts, saving accounts, certificates of deposit, money market accounts, and Treasury bill accounts. They include fixed income assets, such as saving bonds, fixed rate bonds, floating rate bonds, indexed bonds, and convertible bonds. They include equity and derivative securities, such as preferred stocks, common equity, partnerships, warrants, incentive compensation, options, and futures. They include investment funds such as ETFs, closed and open end mutuals, unit trusts, and hedge funds. They also include precious metals, collectibles, insurance products, pensions, defined benefit plans, social security, private investments, mortgages, fixed rate bonds, floating rate bonds, indexed bonds, convertible bonds, preferred stocks, common equity, partnerships, warrants, trust, inheritances, family support and tax assets.

Real Property

Real property and private investments have not been adequately considered and modeled in retirement planning Real property is a category which includes all forms of property investment from family residences through vacant lots to rental units. The salient characteristics of this investment category are pricing, mortgages, liquidation plans, rents, costs and tax treatment.

In general, recent market prices for real property are unavailable. Thus, these properties are valued on an appraisal basis. The appraisal process basically involves comparison with similar properties which were recently sold so as to get an estimate of the property's likely market value. The model can use a current appraisal value if available. Otherwise, it will take the most recent value—either market or appraisal—and update it based on price indices for comparable property. For this purpose, considerable descriptive data can be used to determine the comparable property. By an appraisal value, we mean the value a real estate agent would estimate as the current market value of the property, as opposed to the valuation that a tax assessor or insurance agent would put on the property. Insurance and tax valuation generally follows a more conservative methodology than market valuation, which may be used, but are not preferred.

Real property is often encumbered with mortgages. The details of these mortgages should be taken into account. Also, real property is not easily liquidated. Thus, the investor's plan for liquidating the property should be spelled out. If the property is being rented, then additional detail about the rents and tax accounting for the property is useful. Costs affect the investment return of this asset even if it is not rented. Tax rules cover a wide range of real estate situations and depend on a fair degree of detail.

We give here an overview of the basic data useful to describe real estate.

Description: We can describe real property in terms of the use the investor makes of the property (e.g., primary residence, pure investment, etc.), the type of structure built on the property, and whether the property is located in a city, suburb or rural area; and/or the zip code of the property.

Mortgages: A mortgage has descriptive data and terms. The descriptive data includes whether the mortgage is a first or second mortgage and whether it is assumable and non-recourse. If the mortgage has the first claim to the value of the collateral, it is called a first mortgage. Additional mortgages that are subject to a prior claim on the collateral value to the mortgage are called a second, third, etc. mortgage. A mortgage is assumable if it may be transferred to a new property owner when the property is sold. A non-assumable mortgage generally must be repaid at the time of property sale. With a non-recourse mortgage in the event of a default, the lender's only recourse is to the mortgaged property. With a recourse mortgage, the lender can seek compensation from the borrower's total assets.

Liquidation Plans: A liquidation plan is the investor's intention with regard to how he will liquidate his investment in the property. The simplest plan is simply to retain the property indefinitely. The next simplest is to sell the property either at a fixed future date or at a date related to the investor's retirement (e.g., five years after retirement). A partial liquidation of the investment may be achieved by mortgaging the property. Alternately, there may be a plan to rent the property. In particular, a long-term lease may be considered as a partial liquidation of the property.

An investor's intentions may be firm, i.e. almost certain to be implemented, likely or expected to be implemented but could change, or vague, that is, just a provisional plan.

If an investor's plan is to retain the property, then it is worth exploring and modeling his willingness to partially mortgage or rent the property, as these steps retain ownership while still generating liquidity from the property. In general, an investor might be willing to give up retaining the property either if it were necessary to realize his overall objectives, or in an emergency to deal with untoward events, or, perhaps, not at all.

If the investor's plan is to sell the property, then that intention may be coupled to a plan to buy a successor property. In this case, we say that the plan is to replace the property. The description of the property to be purchased should be included in the investor's goal section and should be cross referenced to the property it replaces. It is perfectly possible for one property to be replaced by a package or for several properties to be sold and replaced by a single property. In tax parlance, a 1031 exchange may be elected and modeled.

Where the plan is to rent or lease, the expected annual rent is needed. In the case of a rental, one also needs to know if owner occupancy of the property continues, and if so what fraction of the property is allocated to personal use and what part to rental use (the two uses need not sum to one since there may also be vacancy periods). This impacts depreciation and other tax issues.

Rents: Rents need to be described. Rental property has a special tax treatment that is best modeled using additional detail. Rents are described in terms of their current level, trend over time, variability and whether that variability is associated with the general business cycle. A property may also be under rent controls that limit the annual increase in rent.

The tax detail relates to the depreciation charges on the property. Generally tax law will classify different parts of the property into different categories—for instance land, improvements, structures and appliances. On some categories, depreciation charges may be claimed, which reduces the investor's taxes. The amount of depreciation varies by category, the initial value in each category, the accumulated depreciation charges taken to date for that category, when the first depreciation charge was taken and the method the tax payer elected to apply for calculating the depreciation charge.

Costs: The important cost categories for all properties include taxes, insurance and operating costs. Taxes may be controlled such that the annual increase is limited, which need to be taken into account when projecting taxes over extended periods. Operating costs reflect the annual average expense of repairs, maintenance and property management and may increase with inflation.

If the property is rented, the portion of operating expense which is capitalized for tax purposes should be broken out and allocated among the different depreciation categories. In general, these expenses are episodic in nature, so the numbers should be based on average experience over several years rather than a single year experience. If a detailed breakdown into depreciation categories cannot be estimated, a conservative category allocation should be chosen.

Taxes: Primary residence, secondary residence and timeshares with rentals require an allocation between occupancy use and rental use. If the property is occupied by a single tenant at a time, the allocation is based on days of rental use and personal use in a year. As there may be days of non-use (e.g. for resort properties), these days need not sum to a full year. If the property has multiple simultaneous occupancy then there is a fraction of personal use, for instance based on square footage, and the balance is considered rental use.

Real estate losses are generally considered passive and are subject to limitations on deductibility. However special treatment applies to real estate professionals. These professionals may choose to aggregate their properties for tax purposes (this information is recorded on the tax detail sheet). For all investors, their participation in the property may be material, active or passive and different levels of loss limitation will apply in each case.

For input, the fields may include:

| Label | Type | Contents |
| --- | --- | --- |
| Description | text | identifying label |
| Role | choice | classification as residence or investments |
| generates rents | check | true if currently generating rental income |
| Type | choice | type of property |
| Zip Code | string | 5 digit zip code of property |
| Locale | choice | type of neighborhood |
| Value | Integer | value of the property |
| Valuation Date | date | when the property was valued |
| Valuation Method | choice | how property was valued |
| Long Term Intention | choice | long term plan for the property |
| retain in: role | choice | new role for property |
| replace: with | text | identifying label of a property in the goal section |
| Firmness of Intention | choice | how certain the plan is |
| Change anticipated | choice | when change is to be made |
| Year | Integer | calendar year of anticipated change |
| Offset | Integer | offset from retirement date of anticipated change |
| Rental Initiation | check | true if intend to start renting |
| Rent Year | Integer | calendar year in which rents begin |

-continued

| Label | Type | Contents |
|---|---|---|
| Rent amount | Integer | expected rent proceeds per year |
| Personal Use | float | fraction property deemed personal use |
| Willingness to sell | choice | how willing to sell the property |
| Willingness to mortgage | choice | how willing to mortgage the property |
| Property Tax | Integer | current annual property tax |
| Increase Limited | check | true of increase in property tax restricted |
| Increase Rate | float | maximum annual increase in taxes |
| Insured Value | Integer | value for which property is insured |
| Premium | Integer | annual insurance premium |
| Other Operating Cost | Integer | annual costs of property other than tax and insurance |
| Purchase | date | when purchased |
| Basis | Integer | tax basis |
| Recourse Mortgage | check | true if mortgage is recourse |
| Assumable Mortgage | check | true if mortgage is assumable |
| Rent Amount | Integer | annual rental proceeds |
| Owner Tenancy | check | true if owner partially occupies rental property |
| Personal Fraction | float | fraction residency deemed personal occupancy |
| Owner Use | check | true if owner time shares property |
| Personal Days | Integer | days per year owner uses property |
| Rental Days | Integer | days per year owner rents the property |
| Rent Stability | choice | how stable rent is |
| Rent Control | float | maximum annual rental increase if rent controlled |
| Minimum Rent | Integer | minimum annual rent expected over next five years |
| Maximum Rent | Integer | maximum annual rent expected over next five years |
| Owner Participation | choice | how tax law views owners involvement with the property |
| Capitalized Operating Expense | float | fraction operating expense which is capitalized |
| Similar Depreciation Structure | check | true if new costs will be allocated to depreciation categories same as old costs |
| depreciation: item | text | identifying label |
| depreciation: year | Integer | year expense capitalized to |
| depreciation: method | Method | how depreciated |
| depreciation: original balance | Integer | balance at start of depreciation |
| new depreciation: method | Method | how depreciated |
| new depreciation: percentage | float | fraction new cost depreciated by this method |

The "role" of real estate may be primary residence, secondary residence, time-share, or investment. Type may be chosen among detached home, townhouse, condominium unit, multi-unit dwelling, commercial, or undeveloped. Locale is urban, suburban, and rural. Valuation method is market or appraisal. Long-term intention is retain, retain in new role, replace, or sell. Intention is firm, likely, or vague. Change anticipated is expressed as a year or as a retirement offset. Rental initiation is yes, contingent or none. Willingness to sell is yes, contingent or no. Willingness to mortgage is yes, contingent or no. Rent stability is stable, controlled, increases steadily, fluctuates with economy, or fluctuates independent of economy. Owner participation is material, active or passive.

Lifetime resources and claims statement may present real estate as:
estimated market value
(principal mortgage balance)
mortgage cost adjustment
(deferred tax)
net equity
memo: cash flow value of the
property The mortgage cost adjustment could be either positive or negative, especially in the case of swap financing. The memo item only appears for investments and for secondary residences and timeshares that produce rents. A zip code may be mapped to a region. Region, locale and type may be combined to select or derive a price index. Let I(t) denote the selected price index at time t. Let $t_1$ be the previous valuation date and $t_2$ the present date. Then the current estimated market value is $$M = V \frac{I(t_2)}{I(t_1)}$$

where V is the supplied value. Haircut is as usual. For a discussion of mortgages see below. To calculate tax, we examine the investor's intentions for the property. If the intention is to retain, then the tax is zero. Otherwise, find the target year for sale or replacement. Check to see if the property is a principal residence in the year of sale. If not, calculate gain as market value minus basis. Suppose the property is a principal residence for a qualified period. If the property generates rents, then split its value between the rental and residential components based on the personal use fraction. Split the basis into two components similarly. Calculate the gain on each component as market value less basis. Then adjust the residential gain as follows. If the residential gain is less than zero, set it to zero. If it is greater than zero, then look up the exclusion amount based on filing status and reduce gain by the exclusion amount, but not below zero. Recombine the two gain components to get the gain on the property. Check if holding period at time of sale is short or long term. Calculate tax by applying appropriate capital gain rate to gain.

Where real estate is reflected on the lifetime resources and claims statement depends on intentions. If the investor is willing to sell, show under illiquid. If contingently willing to sell, show under contingent. If not willing to sell, but willing to mortgage or contingently willing to mortgage, show under it illiquid/contingent. If not willing to mortgage or sell, but willing to rent, we show the value of the rents under income producing and the principal value under reserve. If not willing to sell, mortgage or rent we show the property under reserve.

If the property is an investment, we calculate its value by the cash flow method and show the result as a memo item. If the property is not an investment and it generates rents, then we calculate the value of the rents and show that value in the income generating section of the lifetime resources and claims statement. There is considerable overlap in the two calculations. The following equations can be used to project annually the cash flow from the property and the after-tax rents.

rent=(1+growth rate)×prior year rent depreciation=sum over different items of annual depreciation mortgage principal=prior year mortgage balance−prior year mortgage service interest=interest rate×mortgage principal mortgage service=mortgage amount−interest property value=(1+appreciation rate)×prior value insured value=(1+appreciation rate)×prior insured value appraised value=(1+tax appreciation rate)×prior appraised value property tax=property tax rate×appraised value insurance=insurance rate×insured value operating cost=(1+operating cost growth rate)×prior year operating cost capitalised expense=capitalized operating expense×operating cost current operating cost=operating cost−capitalised expense deductible cost=depreciation+insurance+current operating cost deduction=deductible fraction×deductible cost taxable income=rent−interest−property tax−deduction tax=ordinary tax rate×taxable income cash flow=rent−mortgage amount−property tax−insurance−operating cost−tax aftertax rent=rent−tax If rents are stable, the growth rate is zero. If rents are not controlled, the growth rate is a table look-up based on region, type and locale. If they are controlled, it is the lesser of the controlled rate and the look up rate. The mortgage interest rate may be fixed or floating. If fixed, it is given. If floating, it is determined using a table look up for the base, to which a margin is applied. The appreciation rate is a table look up based on region, type and locale. The tax appreciation rate is the same as the value appreciation rate, if taxes are not limited. If they are limited, it is the lesser of the appreciation rate and the limit rate. The property tax rate is based on the current ratio of property tax to appraised value. The insurance rate is based on the current ratio of insurance premium to insured value. The operating cost growth rate is the inflation rate (a system value). If there is owner tenancy, the deductible fraction is one minus the personal use. If there is owner use, then the deductible fraction is the ratio of rent days top the sum of rent and personal days. If there is neither owner tenancy nor use, the deductible fraction is 1. One allocates the annual capitalized expense to different depreciation classes based on the proportions provided. If a similar depreciation structure was selected, then one calculates proportions based on the current original depreciation balances. One extends the projections over the period from now until property sale or owner's life expectancy, whichever is shorter. If rents do not begin until a certain date, then rents from now until that date are zero. The rental value is present value of the after-tax rents using the tax free discount multipliers. The cash flow value results from applying the multipliers to the cash flow. Note that a negative cash flow value might result.

We need to calculate the tax shelter value, if any, of real estate losses. Proceeding year by year, aggregate the cash flows generated by real properties on the following basis. If the taxpayer is a real estate professional and participation is material, then aggregate all properties (but do not include a principal residence if it does not generate rent). If the taxpayer is a professional but does not aggregate, then aggregate all properties where participation is material. If the taxpayer is not a professional, then aggregate all properties where participation is active. Look at the aggregated cash flows. In any years where cash flow is positive, set it to zero. In any year where it is negative, flip the sign. The result is the loss as a positive number. For professionals, compare the loss to other income and take the smaller number. For non-professionals, calculate an allowance. The allowance is a base amount for incomes below a trigger and then phase out over an interval (currently $25,000 for incomes below $100,000 and phasing out by incomes of $150,000). Take the lesser of the allowance and the loss. Multiply the result by the ordinary tax rate. The result is the tax shelter. Discount it and show the result as a tax asset ("Tax shelter value of real estate losses").

In simulation, first map zip code to a region. Then combine region, locale and type to get a price index. Let I(t) denote the selected price index at time t. Let $t_1$ be the previous valuation date. Then, at time t the market value is $$M = V \frac{I(t)}{I(t_1)}$$

where V is the supplied value. If the property is not an investment but generates rents, use its personal-use fraction f. This is given for multi-tenancy dwellings and is $$f = \frac{\text{personal use days}}{\text{personal use days} + \text{rental days}}$$

for time shares. For investment properties we have f=0. When sold, gain g is market value less basis. Personal gain is fg. Determine an exclusion amount and reduce personal gain by the exclusion amount. If a loss results, set personal gain to zero. Investment gain is (1−f)g. Taxable gain is the sum of personal and investment gain. The basis is returned as capital.

If the property generated depreciation, there can be recapture of excess depreciation on sale. This only applies to properties placed in service prior to 1987 and depreciated under an accelerated method. Form 4797 is used to figure the recapture.

If the property generates rents, then we recognize the following cash flows:

Rent: If rents are stable, growth rate is zero. If rents are not controlled, the growth rate is a table look up based on region, type and locale. If they are controlled, it is the lesser of the controlled rate and the look up rate.

Mortgage service: Determined by simulating the mortgage

Property tax: The appreciation rate is a table look up based on region, type and locale. The tax appreciation rate is the same as the appreciation rate if taxes are not limited. If they are limited, it is the lesser of the appreciation rate and the limit rate. The property tax rate is based on the current ratio of property tax to appraised value.

Insurance: Take the current ratio of insured value to market value and apply it to future market value to get future insured value. The insurance rate is based on the current ratio of insurance premium to insured value. Apply that rate to future insured value to get future insurance cost. One minus the personal fraction represents the portion recognized as the rental cost.

Operating cost: These increase in line with the CPI. Multiply by one minus the personal use fraction to get the deductible portion. Take a capitalized fraction of this and book as depreciable expense with the indicated composition. The remaining deductible portion is taken as the current rental cost.

Depreciation: Is calculated according to its method and shown as depreciation.

These various cash flows are run through the tax spreadsheets to determine the net rent income, the deductible ordinary loss (if any) and the booked passive loss.

Private Investments

Private investments can be either debt or equity. Seller financed mortgages are perhaps the most common form of private debt. Limited partnership interests and small business ownership interests are the primary forms of private equity.

Distinctive features of private investments include that information about the investments cannot be looked up in databases and there is no active, liquid market for the investments. The first issue can be addressed by having the investor provide basic descriptive information for the investment. The second issue means that the value of the investment needs to be estimated. Additionally, the plan, if any, for liquidating the investment in the future becomes of importance.

The boundaries of the private investment category are somewhat vague. A security may actually be a public security that is not covered by standard databases or actively traded. In this case, it may be more effectively handled in the system as a private investment. Many limited partnership interests are of this type. With an owner operated business, there may be a question as to whether one should view this as two separate relationships, as an equity interest in a private business and an employment relationship with the business, or whether the two roles should be treated as single relationship and treated as human capital. In deciding which approach to take, a useful criterion to consider is whether the business has independent value which can be separated from the current owner. If so, it may be preferable to represent the situation as a combination of human capital and private investment. For instance, a lawyer in private practice probably does not have meaningful business assets that can be sold to a third party. A bush pilot who owns his plane could potentially sell his "flying business" (whose assets consist mainly of the aircraft) independent from continuing to being the pilot employed by the business. The pilot's business could be considered a private investment separate from the human capital.

We treat private mortgages by describing the underlying property and mortgage terms. For business loans and equity interests there are at least two possible approaches. The first method first describes the firm backing the interest and then describes the economic interest in the firm. The second method simply describes the cash flows from the investment without delving into the details of how those flows are produced. The second method is preferred where those cash flows are well known (e.g. royalty interests in oil production) whereas the first method is preferable for investments where the flows are more uncertain (e.g. a retail store.)

For loans, whether they be mortgages or private business loans, we require a credit assessment, given as: Almost sure, if default is most unlikely; likely, if the debt is expected to be paid; uncertain, if there is more than theoretical doubt as to whether the debt will be paid; or unlikely, if it is not expected that the debt will be paid in full and in a timely fashion. If the debt is unlikely to be paid, then an estimate should be made of what salvage value will actually be derived from the investment. This is basically the sum for which the investor would be willing to sell the claim to a third party.

For private mortgages and loans, we assume the investor's intent is to hold to maturity and we show such interests in the income producing section of the balance sheet. The lifetime resources and claims statement presentation of these items is principal value
interest rate adjustment
(credit adjustment)
(private market adjustment)
net value Private Mortgage Private mortgages are described by an abbreviated property description and the mortgage terms as for real property and a credit assessment.

Input for calculations may include:

| Label | Type | Contents |
| --- | --- | --- |
| Description | text | identifying label |
| Role | choice | classification as residence or investments |
| Type | choice | type of property |
| Zip Code | string | 5 digit zip code of property |
| Locale | choice | type of neighborhood |
| Value | integer | value of the property |
| Valuation Date | date | when the property was valued |
| Valuation Method | choice | how property was valued |
| Senior debt | integer | prior claims on mortgaged property |
| Credit assessment | choice | assessment of credit quality |
| Salvage Value | integer | estimate of recovered value in a foreclosure |

The role for a private mortgage may be primary residence, secondary residence, timeshare, or investment. Type may be detached home, townhouse, condominium unit, multi-unit dwelling, commercial, or undeveloped. Locale is urban, suburban, or rural. Valuation method is market, or appraisal. Credit assessment is almost certain, likely, uncertain, or unlikely.

On the lifetime resources and claims statement, the principal value is the current mortgage balance B. Value the mortgage using the current risk free rate structure, calling the result V. Let V' be B plus the prepayment penalty. If V>V' then let V=V'. Then V−B is the interest rate adjustment. Next we make a credit sensitive valuation C. For this purpose assign a credit rating to the debt based on the credit assessment as

| Assessment | Rating |
| --- | --- |
| almost certain | AA |
| likely | BBB |
| uncertain | B |
| unlikely | C |

If the rating is C, then set C to the salvage value. Otherwise, project the cash flows and discount the using the interest rate for that credit rating and take the discounted value to be C. Let $$S=\max(0,(0.95\times value)-\text{senior debt})$$

be the effective security value. If the result is greater than B then set S=B. If C is less than S set C=S. If C is greater than V the credit adjustment is zero, otherwise it is C−V. The private market adjustment is zero if the rating is AA or C. It is 5% of B if the rating is BBB and it is 15% of B if the rating is B.

Private Firm

The description of a private firm depends on a combination of financial statements and analytic judgments It is typical for debt holders to have access to only partial financial statement information. Accordingly, we give a full and abbreviated form. The abbreviated form is

| Label | Type | Contents |
| --- | --- | --- |
| Date | date | financial statement date |
| Revenue | integer | annual revenue |
| Operating Earning | integer | annual operating earnings |
| Interest | integer | annual interest payments |
| Assets | integer | total assets on statement date |
| Senior Debt | integer | senior claims on assets |
| Debt | integer | other debt claims |

The full form is

| Label | Type | Contents |
| --- | --- | --- |
| Date | date | financial statement date |
| Revenue | integer | annual revenue |
| Operating Earning | integer | annual operating earnings |
| Interest | integer | annual interest payments |
| Taxes | integer | income tax levied at firm level |
| Preferred Dividend | integer | preferred dividends paid |
| Profit | integer | Profit to common |
| Common Dividend | integer | common dividend paid |
| Assets | integer | total assets on statement date |
| Senior Debt | integer | senior claims on assets |
| Debt | integer | other debt claims |
| Preferred equity | integer | face value of preferred equity |
| Common Shares | integer | number of common shares or partnership units |

Besides its most recent financial statement, a firm is also described by certain descriptive and analytic detail. The descriptive detail describes the business and its sensitivity to the business cycle. Analytic detail is a view on the firm's ability to continue in business and grow. The assessment of whether the firm is a going concern or not is based on the following tests. A going concern is consistently profitable and able to attract capital on commercial terms from third parties. An uncertain business is marginally profitable or consistently unprofitable but with current cash adequate to fund operations for several years. A not a going concern is not profitable and dependent on capital provided by affiliates.

Input for calculations may include:

| Label | Type | Contents |
| --- | --- | --- |
| Description | text | identifying label |
| Industry | industry | industry in which active |
| Impact of Business Cycle | choice | how sensitive firm is to the business cycle |
| Going Concern | choice | whether firm is a going concern |
| Business Prospect | choice | growth prospects |

Impact of the business cycle is slight, moderate, average or severe. Going concern is going concern, uncertain, or not a going concern. Business prospect is stable, growing, fluctuating, or declining. To this data the latest financial statements would be attached.

Private Business Loan

Input for calculations may include:

| Label | Type | Contents |
| --- | --- | --- |
| Description | text | identifying label |
| Credit assessment | choice | assessment of credit quality |
| Salvage Value | integer | |

On the lifetime resources and claims statement, the principal value is the current balance B. Value the loan using the current risk free rate structure, calling the result V. Let V' be B plus the prepayment penalty. If V>V' then let V=V'. Then V−B is the interest rate adjustment. Next, we make a credit sensitive valuation C. For this purpose, assign a credit rating to the debt based on the credit assessment in a range such as AA, BBB, B or C. As above, if the rating is C, then set C to the salvage value. Otherwise, project the cash flows and discount the using the interest rate for that credit rating and take the discounted value to be C. If C is greater than V the credit adjustment is zero, otherwise it is C−V. The private market adjustment is zero if the rating is AA or C. It is 5% of B if the rating is BBB and it is 15% of B if the rating is B.

Private Equity

This term covers partnership, preferred and common stock interests. A security convertible into such an interest requires that the equity be described as well. Unlike private debts, we take note of the investor's plans for liquidating the investment. The level of control over the firm exercised by the investor is also an additional datum that may be collected. Control is described as Full when the investor is presumed to have full control over the firm, including the ability to liquidate it. It is operational when the investor can control the disposition of the firm's cash flows, but may not be able to liquidate it. It is minority when the investor does not have a control interest but does have voting rights. The investor who has no voting rights has no control. The investor's estimate of the value that could be realized in a liquidation of the investment is also used. For these purposes, it is useful to distinguish between an abrupt liquidation and a planned liquidation. Often there will be little or no value available in an abrupt liquidation, but some value may be realizable in a properly planned liquidation. Liquidation here refers to liquidation of the investment, not liquidation of the firm as a whole.

Input for calculations may include:

| Label | Type | Contents |
| --- | --- | --- |
| Description | text | identifying label |
| Estimated Value | integer | value of interest |
| Valuation Date | date | when valued |
| Fraction on Demand | float | fraction available on demand |
| Intention | choice | intention with respect to the investment |
| Liquidation Year | integer | year of planned liquidation |
| Control | Choice | degree of control the investor exercises |

Intention is sell, contingent or retain. Control is full, operational, minority or none.

The interest is shown on the lifetime resources and claims statement at its estimated value in a statement section corresponding to the investor's intentions.

Cash Flow Method

In the cash flow method, we ignore detail about the entity generating investment returns and just consider the income and principal flows it generates. One of several methods is chosen for describing future flows: an annual schedule; a current value and a progression; or a formula of the form base+multiplier×index The tax character of the income and losses is given. If the investment is not self liquidating, then details of the liquidation plan should be given.

Input for calculations may include:

| Label | Type | Contents |
| --- | --- | --- |
| Description | Text | identifying label |
| income: class | label | income classification |
| income: weight | float | fraction of income of given type |
| basis | integer | tax basis |
| Form | Choice | form of input |
| schedule: year | integer | year paid |
| schedule: income | integer | income paid |
| schedule: principal | integer | principal paid |
| progression: start | integer | year income first paid |
| progression: base | integer | income paid in first year |
| progression: rate | float | annual change in income |
| progression: cola | Check | true if income adjusts to inflation |
| progression: end | integer | year sold |
| progression: value | integer | estimated value when sold |
| formula: start | integer | year income first paid |
| formula: base | integer | base value |
| formula: multiplier | float | multiplier |
| formula: index | price index | index |
| formula: end | integer | year sold |
| formula: value | integer | estimated value when sold |

Income: class lists the different tax classifications of income. Form is schedule, progression or formula.

For the lifetime resources and claims statement, consider first the schedule. Expand the income column into positive income, ordinary losses, capital losses and passive losses. This division is based on the income weights and whether the income is positive or not. Calculate the blended tax rate and apply it to the positive income to get after tax income. Reduce basis by any principal payments prior to sale. Subtract adjusted basis from final value to get gain. If gain is negative, include it as capital loss. Otherwise, apply the capital gain rate and include the result as after tax income. Include the adjusted basis in principal. Combine after tax income and principal payments to get after tax cash flow. Discount at the after tax rate and show in the income generating section of the balance sheet. Multiply ordinary losses by the ordinary tax rate and discount at the after tax rate. Show the result as a tax shelter asset on the balance sheet. Sum capital losses, multiply by the long-term capital gain rate and multiply by the discount factor for the year of sale. Show on the balance sheet as a capital loss tax asset. Treat passive losses similarly, using the ordinary tax rate instead of the capital gain rate, and showing on the balance sheet as a passive loss asset. For progression and formula, generate a schedule and then see the prior case.

Concrete Objectives

Here, we return to using concrete objectives as a means of eliciting information that is difficult for many users to express, followed by automatically translating the concrete objectives into models or constraints suitable for simulation. For instance, the goal of putting a child through college can be presented with a starting date and ending date, a degree to be obtained, a current cost of tuition, room and board, a school classification and a goal for paying all or less than all of the costs, as illustrated in FIG. 5. The server-side system or a thick client uses some or all of the start date, the degree to be obtained and the school classification to look up and apply an educational inflation index and, in turn, to determine the future costs of obtaining the degree. Optionally, the educational institution could be identified by name and the system could look up some or all of the school classification and current cost of tuition, room and board. It is useful to apply an educational inflation index, instead of the Consumer Price Index, because educational expenses typically rise more quickly than general expenses. Putting a child through college during a particular span of years at a particular school is an example of a concrete objective. This goal is more readily described by most parents as a concrete objective than as a cash flow required to accomplish the goal.

FIG. 5 further illustrates entry of an educational expense goal, as a concrete objective rather than a cash flow. This example depicts paying for boarding school for a granddaughter. A descriptive name for the educational goal is entered 501. The beneficiary 502 is identified from among individuals entered during the household setup process. Because the household has more than one principal, a donor type 503 is specified and, optionally, a specific donor identified. Funding 504 may come from personal or joint assets of the principals. There are many family constellations that may lead to the use of individual assets for certain educational goals. The length of program 505 is specified, along with a start date 506. Optionally, the institution and degree 507, 508 may be specified. Annual costs of tuition and board are entered 509, 510, and in current amounts, which the system will automatically adjust to future dollars. As described above, these amounts may be derived from the institution name and degree. The grandparents set funding targets 511, including minimum, target and maximum levels. These alternative levels of goal fulfillment are useful when balancing goals. In addition to the fields indicated, an institution type may be identified or may be looked up based on the institution name.

Returning to FIG. 4, creation of household goals 402 and balancing those goals 403 further involves setting priorities among goals and alternate levels of accomplishing goals. For instance, having a minimum income level during retirement and paying for half of a child's college education may be primary goals. Having additional income during retirement and paying for all of the child's college education may be secondary goals. A significant charitable donation may be an additional goal. General wealth accumulation may be a residual goal. Some goals, such as retaining the family home, may be subject to economic conditions and general need. Such goals may be contingent. Balancing of goals further may involve timing of partial and full retirement. A goal may be to retire as early as possible or in a span from five to 10 years hence. Retirement may mean partial retirement with a reduced income until a certain age. Another goal may be to sell the family house and buy a retirement house two years after full retirement. Once goals initially have been set, simulations can be run to test whether the goals are balanced. Unachievable and overly modest goals are adjusted during a balancing stage 403.

Claims in General

Claims consist of debts and goals. Whereas assets produce wealth (hopefully), claims consume wealth. With debts, the pattern of consumption is fixed by the terms of the loan. For goals, the pattern of consumption is determined by the consumption policy of the simulation. Let $\phi$ represent a certain simulation path, t a simulation time and n≥0 will represent a number of months after t. For i=1, 2, 3 we have three quantities $C_1(n,t,\phi)$ termed the minimum, target and maximum spends respectively. Here $C_2(n,t,\phi)$ is the best estimate based on the facts available at time t along $\phi$ of the spend at time t+n along $\phi$. The actual spend at time t+n will lie in the interval $[C_1(n,t,\phi), C_3(n,t,\phi)]$. Thus $C_1(n,t,\phi)$ represents the required or baseline spending at time t+n whereas $C_3(n,t,\phi)$ represents a ceiling on spending for that goal. For debts there is no choice in the spending and so $C_1(n,t,\phi)=C_2(n,t,\phi)=C_3(n,t,\phi)$. For goals, one has $$C_1(n,t,\phi) \le C_2(n,t,\phi) \le C_3(n,t,\phi)$$

and equality often does not apply.

For each claim, a number of fields are provided that determine the quantities $C_i(n,t,\phi)$. With debts, the cash flow is a deterministic function of time t. For some goals, spending depends on the absolute time. For other goals, however, spending is defined relative to an event, and the timing of the event may differ from one simulation path to another. For instance, we might have a goal of making a certain expenditure five years after we retire. In general, the date of retirement for path $\phi$ will be determined by the retirement policy. The principal events determining the timing of goals are the dates of partial and full retirement. The partial retirement date is defined as the first date at which a member of a household becomes partially retired. The full retirement date is the date at which the last member of the household fully retires. The full and partial retirement dates of individuals are determined by the data described in the section on the retirement timing goal below. We write $C_i(n,t,\phi,e)$ to indicate the dependence of cash flows on the retirement dates e.

Among the data which typically appears in the definition of goals are:

Owner: A goal may be owned by both members of a household or by a single member. Normally a goal terminates on the death of the owner. However, if the goal terminates on a date, then it may be specified to continue past the death of the owner.

Beneficiaries: Goals which involve spending in favor of an individual normally terminate on the beneficiary's death but may be specified to continue (basically with a new beneficiary stepping into the shoes of the deceased beneficiary).

Amount: Goals typically provide minimum, target and maximum parameters from which the three spending levels are determined.

Timing: For some goals, flexibility about timing is expressed. The target date is the date currently planned on. The earliest date is the date to which the user would bring the goal forward if resource levels permitted. The latest date is the date by which the goal must be accomplished even if resources decline.

Time units: Often start and end dates of goals may be stated in terms of absolute time or event relative times.

Inflation adjustment: Some goals call for mandatory adjustment of spending amounts to reflect inflation. Others optionally provide for such adjustment and still others make no adjustment. Where adjustment is called for, typically the CPI is used in the adjustment, but sometimes other price indices are used. In general the choice of index depends on the particular goal to be adjusted. Where a goal calls for inflation adjustment, the following procedure applies. First the cash flows $C_i(n,t,\phi,e)$ are determined in constant dollars of epoch 0. Let $I(t,\phi)$ be the current value of the price index at time t along path $\phi$ and let $\mu$ be the mean annual rate of increase in the inflation index. Then the adjusted values in dollars are $$C'_i(n,t,\phi,e)=(1+\mu)^{n/12}I(t,\phi)C_i(n,t,\phi,e)$$

Describing claims may include a funding field. This field determines whether the spending called for in this claim is funded out of all assets of the household or only out of assets belonging to one or another members of the household.

Claims provide a basic interface. In our description of this interface $\phi$ represents a particular simulation path and t is time along this path. Thus t=0 corresponds to now, and so is a common point for all paths. We have a vector r consisting of three annual interest rates. We have a vector e where $e_1$ is the date of partial retirement and $e_2$ is the date of final retirement. We have a Boolean value f which is true if our currency units are dollars and false if they are constant dollars of epoch t=0.

Is_goal( ): Return true if goal and false if debt.

Adjusted( ): Returns true if it is a goal subject to inflation adjustment, else returns false.

Cash_flow(t,e,$\phi$,f): Return the data $\{(n, C_1(n,t,\phi,e), C_2(n,t,\phi,e), C_3(n,t,\phi,e))\}$ for all the months t+n where there is non-zero spending and with spending given in the currency units specified by f.

Present_value(r,t,e,$\phi$,f): Return $$V_i = \sum_n \frac{C_i(n, t, \phi, e)}{(1+r_i)^{n/12}}$$

Dollar_duration(r,t,e,$\phi$,f): Return $$D_i = \frac{1}{12} \sum_n \frac{nC_i(n, t, \phi, e)}{(1+r_i)^{(n+12)/12}}$$

Value_basis_point(r,t,e,$\phi$,f): Return $D_i/10,000$.

Macauly_duration(r,t,$\phi$,f): Return $M_i=D_i/V_i$ for $D_i$ the dollar duration and $V_i$ the present value.

Modified_duration(r,t,e,$\phi$,f): Returns $M_i/(1+r_i)$ for $M_i$ the Macauly duration.

Convexity(r,t,$\phi$,f): Return $$\frac{1}{144} \frac{1}{V_i} \sum_n \frac{n(n+12)C_i(n, t, \phi, e)}{(1+r_i)^{(n+24)/12}}$$

Percentage_convexity(r,t,$\phi$,f): Return the convexity divided by 100.

Statistics(t,$\phi$,e): Returns the present value, dollar duration, Macauly duration, modified duration, convexity, percentage convexity and value of a basis point for both dollars and constant dollars together with the adjusted flag.

Face_value(t,φ): For a debt returns the principal amount of the debt at time t along φ. For a goal returns 0.

Initial_value(): Returns the face_value at time t=0.

Cost(t,φ): Returns a balance sheet detail on the cost of the claim. For a debt the presentation is

| Face Amount | F |
| Interest Cost | V − F |
| Total Cost | V | where F is the face amount and V the present value. For a goal the presentation is

| Base Cost | $V_1$ |
| Target Increment | $V_2 - V_1$ |
| Target Cost | $V_2$ |
| Additional Increment | $V_3 - V_2$ |
| Total Cost | $V_3$ | where the $V_i$ are the three present values in dollar units.

Spend(t,φ,e): Returns $C_i(0,t,\phi,e)$ in dollar units.

Apply(x,t,φ): Performs actions consequent on spending amount x at time t on the claim. Typically, this results in debiting the master bank account for amount x and returning book keeping items recording one or more categories of spending. Some claims, however, take different or additional actions.

Reschedule_cost(schedule): Only applies for debts. It is called with a proposed rescheduling of principal payments and it returns the full cost of the rescheduled debt. A schedule is a list of tuples of the form (date, minimum, target, maximum). Here, date is an absolute date and minimum; target and maximum are the percentage of current principal balance to be repaid by date. In general, we calculate the rescheduled cost by first calculating the cost of immediately repaying the existing loan (principal plus repayment penalty if any) and then calculating the cost of a new loan in that amount which conforms to the provided schedule.

Reschedule(schedule): Only applies for debts. It is called with a rescheduling of principal payments and it replaces the existing debt with the rescheduled debt.

The basic cycle for each period t is that for each claim j we call spend(t,φ,e) based on the current estimates of the retirement times e to get the three levels of spending $s_{j,i}$. We define the aggregate spending $S_i$ by $$S_i = \sum_j s_{j,i}$$

Let $A_1 = S_1$, $A_2 = S_2 - S_1$, $A_3 = S_3 - S_2$. The consumption policy will have determined an actual level of spending L. We define three allocation ratios $\rho_i$ by $$\rho_1 = \begin{cases} 1 & \text{if } L > S_1 \\ L/A_1 & \text{otherwise} \end{cases}$$

$$\rho_2 = \begin{cases} 0 & \text{if } L < S_1 \\ 1 & \text{if } L \geq S_2 \\ (L - S_1)/A_2 & \text{otherwise} \end{cases}$$

$$\rho_3 = \begin{cases} 0 & \text{if } L < S_3 \\ 1 & \text{if } L \geq S_3 \\ (L - S_2)/A_3 & \text{otherwise} \end{cases}$$

The actual spend $x_1$ in the period on goal j is then $$x_j = \rho_1 s_{j,1} + \rho_2 [s_{j,2} - s_{j,1}] + \rho_3 [s_{j,3} - s_{j,2}]$$

and for each claim j we call apply( ) with the spend $x_j$. On a quarterly basis we call statistics( ) on each claim and accumulate the results to generate eventual output.

Debts

Several types of debts are among the claims.

Mortgages

Mortgages are basically bonds, but their contractual terms can be unusually complex. The simplest type of mortgage is the conventional mortgage which consists of a number of equal monthly payments, typically made for anywhere between 10 and 30 years. It is considered that each payment consists partially of an interest payment and partially of a principal payment. The interest is calculated at a fixed rate on the outstanding principal balance at the start of the month. The principal payments gradually reduce that balance through time. In consequence as time goes by, the interest component of the monthly payment drops and the principal payment rises. In other words, principal is repaid at an accelerating rate over the life of the loan. In general only the interest portion of the payment is deductible to the payer and taxable income to the investor. Thus, the tax character of the income stream also drops through time. Other mortgage structures are the interest only mortgage, the installment mortgage, the negative amortizing and reverse mortgage.

With the interest only mortgage (also known as a balloon mortgage), the monthly payments are all considered interest and the principal is repaid with the final payment. Thus the structure is the same as an ordinary (i.e. bullet) bond. With an installment mortgage (rarely used), a level fraction of the principal is repaid in each period together with interest on the outstanding balance. In consequence, each payment is smaller than the previous payment.

With a negative amortizing mortgage, an interest rate is fixed initially, but for some period of time, the periodic payments are less than the interest due. The unpaid interest is added to the principal balance. Then at a certain date the monthly payment is adjusted so that at least the interest is being fully paid (i.e. negative amortization ends.) At this point, the loan is equivalent to an interest only mortgage. At a possibly latter date, the periodic payment increases again, with the result that principal is now being paid down and so the loan is, now equivalent to a conventional mortgage.

An extreme form of the negative amortizing structure is the reverse mortgage. In this structure, there is a periodic monthly payment to the debtor and this payment plus accrued but unpaid interest is added to the principal. This continues until the principal reaches a certain value at which point the loan either comes due or switches to a service mode (either interest only or amortizing). The interest on a mortgage can either be fixed or floating. If the rate is floating it usually has floors and caps.

Mortgages typically contain options under which the debtor may choose to accelerate payment of principal, either in whole or part. Acceleration of principal payment may result in a fee being levied on the debtor.

Often a mortgage comes due if the underlying property is sold. With an assumable mortgage the property purchaser has the option to assume the mortgage payments.

If the debtor defaults on a mortgage, then the lender assumes ownership of the property. Typically the lender sells the property as fast as possible so as to curtail the costs of ownership (e.g. taxes, insurance, maintenance).Because of hurried sale, the mortgage forecloser typically is not able to realize the full value of the property.

The same property may have several mortgages on it—described as first, second, third mortgages, etc. Mortgages other than a first mortgage are sometimes termed home equity loans. If a default occurs, the first mortgage holder can take possession and sell off the property, with whatever residue is generated being distributed to the second and third mortgage claimants. Since the first mortgage holder has no incentive to sell for a higher price than his own claim and since he has an incentive to sell quickly and thus cheaply, the likelihood of there being a substantial residue is remote. Thus when a default occurs, an equity lender is faced with the choice of either writing off the loan as a bad debt or else purchasing the property from the first mortgage holder for the value of the first mortgage and then trying to turn a net profit by selling the property for more than the amount of the first mortgage.

In general, property owners keep up loan payments as long as there is net value in the property and so defaults usually occur when property values are close to the principal balance on the outstanding debts. Mortgage structures (if they provide for amortization) will typically reduce principal balances over time and property values typically rise over time due to general inflation. Thus, with conventional financial structures, the possibility of default typically declines over time. Thus although mortgages may have long lives, the credit risk inherent in the mortgage is typically concentrated in the first few years. With negative amortizing structures, however, this pattern does not necessarily apply.

Generally, non-conventional mortgage structures can embed high and complex risks in terms of both credit and interest rate risk. Typically such loans are only extended by professional lenders (i.e. banks) and most private mortgages are of the conventional type.

Finally, it should be emphasized that mortgages contain complex interest rate risks. Basically if rates fall, the debtor will refinance which results in principal being received when opportunities for reinvestment are poor. If rates rise, the debtor will typically not repay the loan unless forced to by the mortgage both being non-assumable and the borrower deciding to sell the property (e.g. because the borrower's job has moved.) However, if rates rise, the value of the loan on a present value basis will fall below par. In short, changes in interest rates generally represent reduction in value to the mortgage investor, no matter which direction rates move in. Mortgage investors prefer high stable interest rates. Mortgage borrowers, by contrast, prefer rates that trend steadily downwards.

Basically, mortgages are described by giving the contractual terms that determine cash flows and the current principal balance. To allow for complex mortgages whose payment structures evolve through time, terms are given as a list of terms that apply over subperiods of loan life. Simple mortgages may have only a single element on the list.

Input for calculations may include:

| Label | Type | Contents |
|---|---|---|
| description | text | identifying label |
| date | date | balance date |
| amount | float | principal balance on date |
| assumable | check | true if assumable mortgage |
| pre-pay premium | float | fee for full pre-payment as a fraction of outstanding balance |
| default risk | check | true if full performance on the loan is unlikely |
| salvage value | integer | estimated value in the event of a default |
| list: structure | choice | type of payment structure in period |
| list: trigger | choice | what triggers start of period |
| list: start date | date | date period starts if trigger is date |
| list: start amount | float | amount at which period starts if trigger is principal balance |
| list: period | integer | number payments per year |
| list: amount | float | periodic payment or principal installment if installment |
| list: rate | choice | how interest rate determined |
| list: fixed_rate | float | annual interest rate if fixed rate |
| list: base | list | base rate off which rate floats |
| list: spread | int | spread added to base rate |
| list: has_cap | check | true if there is a cap on the interest rate |
| list: cap | float | maximum interest rate |
| list: has_floor | check | true if there is a floor on the interest rate |
| list: floor | float | minimum interest rate |

Structure is conventional, interest only, balloon, maturity, installment, negative amortizing and reverse. Trigger is date or amount. Rate is fixed or floating. Base is a list of base rates (e.g. COFI.) Default risk and salvage value only apply to mortgages owned. Prepay penalty and assumable only pertains to mortgages owed.

On the creditor's lifetime resources and claims statement, we show the loan as
 principal amount
 (interest adjustment)
 (credit adjustment)
 net amount On the debtor's lifetime resources and claims statement, we omit the credit adjustment. The principal amount is the current principal balance on the loan. Compare the principal amount to the loan's present value (see the simulator section for the calculation.) If the present value is greater than the principal amount, the interest adjustment is zero for the creditor. If the present value is less than the principal amount, then the creditor's interest adjustment is equal to the principal amount less the present value. For the debtor, calculate the refinancing amount by applying the refinancing fee to the current principal balance and calculate the adjusted principal balance as the principal balance plus the refinancing amount. If the adjusted present value of the mortgage is greater than the adjusted principal balance then the interest adjustment is equal to the refinancing amount. If the adjusted present value is between the principal balance and adjusted principal balance then the interest adjustment is the adjusted present value less the principal balance. If the adjusted present value is less than the principal amount then the interest adjustment is the principal amount minus the adjusted present value. For the creditor we calculate the credit adjustment as follows. If default is considered likely, take the salvage value to be the recovery. Otherwise, add the total of prior indebtedness (if any) to the current principal balance to get total debt. If total debt is less than 90% of current market value then credit adjustment is zero. Otherwise the likely recovery is 85% of market value minus prior indebtedness. If the recovery is less than zero set it equal to zero. Let X be the sum of the principal amount and interest adjustment. If the recovery is greater than or equal to X then the credit adjustment is zero. Otherwise the credit adjustment is X minus the recovery.

In simulation, one determines the condition applying to a time period as follows. If the trigger is start then a set of conditions starts on that date. It the trigger is amount then the conditions start when the principal balance reaches the trigger amount. Conditions continue until the next condition applies or the principal balance is reduced to zero. One determines the annual interest rate as follows. If the rate is fixed then it is given by fixed_rate. If it is floating we find the value of the base rate for the period and add to it the spread. We then compare that to the cap (if present) and reduce it to the cap if above. Similarly we compare it to the floor, if present, and raise it to that level if below. However, determined, the annual rate is divided by the number of periods per year to arrive at the period rate.

We determine the cash flow during a period as follows. For a conventional mortgage, the periodic payment is given by amount. For an interest only mortgage, the payment is determined by applying the period rate to the outstanding principal amount at the start of the period. A balloon results in a single payment in the given amount. A maturity results in a single payment equal to the principal balance. An installment results in a payment which is the sum of amount plus the interest rate times the initial principal balance. For a negative amortizing mortgage the cash flow is the amount. For a reverse mortgage the debtor receives cash equal to the amount.

One determines tax flow and updated principal balance as follows. For a conventional mortgage apply the interest rate to the principal balance, the result is the interest paid. Subtract interest paid from cash flow to get principal paid. Subtract principal paid from principal balance to get the new principal balance. For interest only, the cash flow is all interest paid and the principal balance is unchanged. For balloon and maturity, the payment is all principal and principal balance is reduced by the amount of the payment. For installment, the amount is principal and it is applied to reducing the principal balance and the rest of the payment is interest. For negative amortizing calculate the interest due by applying the interest rate to the principal balance. Interest paid is equal to interest due. Subtract the amount paid from interest due to get unserviced interest. Unserviced interest is added to principal balance. For reverse calculate interest due as before. Then, interest paid equals interest due. Add interest due to the cash amount received to get the period advance. Add the period advance to the principal balance to get the new principal balance.

To calculate the current present value of the loan, assume current interest rates remain constant and project cash flows over the remainder of the loan's life. Then discount those cash flows using the interest rates from the conventional mortgage yield curve. If the mortgage is assumable, the adjusted present value equals the present value. If the mortgage is not assumable and the property owner's plans call for selling the property before the loan is fully repaid, then project cash flows through to the estimated sale date and interpolate a maturity payment at the sales date. Then discount the cash flows as before to get the adjusted present value.

When a loan is rescheduled, assume the rescheduled loan is a conventional mortgage whatever the type of the initial mortgage was.

Debt types other than mortgage include margin loans, life policy loans, installment debt, credit cards and educational loans, among others.

Investment Strategies

Returning again to FIG. 4, the user has a choice to create a custom investment strategy and policy 405, regardless of the outcome of goal balancing. If customization is selected, an investment strategy and policy are set. The user also has the choice of creating scenarios 407 for difficulties that might be encountered. Scenarios that may be directly offered by the system include one of the principals dying on a given date, the principals dying in a certain order, a specific date when a whole class of assets experience a particular economic impact or when a particular asset experiences the impact, a date on which a merger forces liquidation of a certain asset or results in extinction of a conversion right, or a period of abnormal capital market behavior. Behavior countering a scenario may be specified, either directly responsive to the scenario or after a specified learning period.

Simulation of the portfolio 408 preferably includes simulation of trading costs, tax consequences, management fees and particulars of assets. The portfolio holdings and associated costs may be driven by a style of investment, distribution of investments among sectors and overlapping among sectors held in mutual funds or other diversified investments. An initial simulation is likely to result in revisions to asset holdings over time. Current investments may be the subject of recommendations regarding cash distribution, mix of investments, asset balancing and the like. Analysis of current investments may be constrained to defined investment opportunities, such as funds managed by the analyst's employer. Future asset and investment allocation over time is likely change at least once in a thirty year span, for instance, as the principals' risk tolerance and desired margin of safety change. The consequences of taxes, fees and management should be taken into account, for the simulation to meaningfully project future outcomes. Useful metrics of the simulation results include comparing a current investment strategy to a recommended asset mix. Metrics include cash flow analysis over time and goal achievement under a variety of conditions, from unfavorable to favorable or unfortunate to fortunate. Optionally, to avoid fixation on the upside of a portfolio, goal achievement may be described for an average case, unfavorable case and an unfortunate case, without describing the better than average, favorable cases. Other metrics include trajectory analysis, risk budget analysis, margin of safety analysis and a lifetime resources and claims statement. These metrics can be included in one or a series of client report(s) 409, as the analysis is refined.

An investment strategy may be tested or illustrated by simulation. A risk budget may be recommended, combining stated risk taking propensity with a rigorous analysis of value at risk, safety margin or a similar measure. Generic and personal investment opportunities and investment horizon analysis can be generated from the simulation statistics. A margin of safety graph can be presented. Similarly, cash flow requirements, lifetime resources and claims statement analysis and simulated IRS tax form 1040 reports can be produced from the simulation results. These additional elements can be included in the client reporting 409.

Retirement Timing and Income Goals

Retirement Goals Overview

Figures 6, 8:
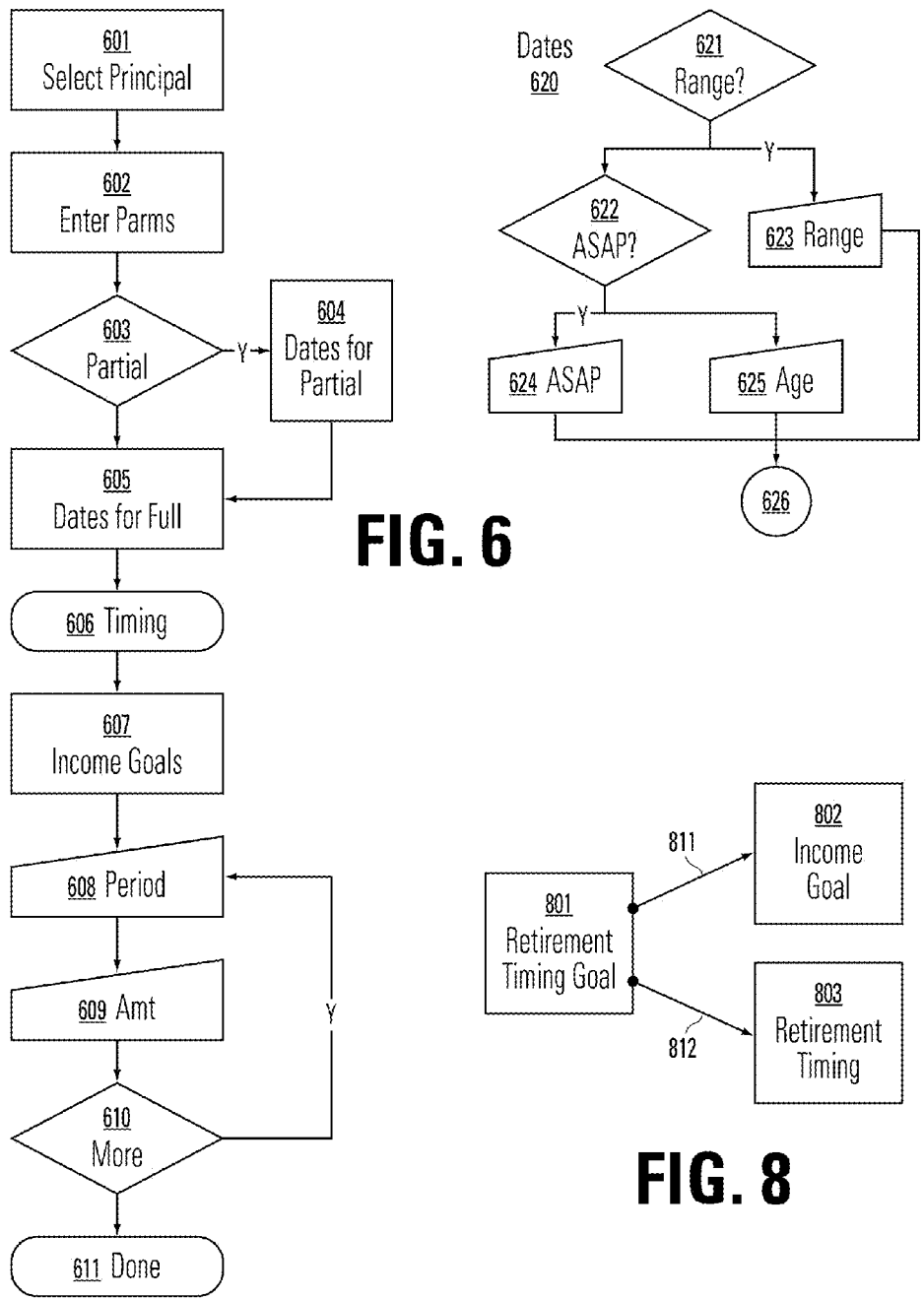
FIG. 6 depicts one flow of collecting retirement goal information. The left hand diagram illustrates the overall flow.
FIG. 8 depicts the relationship between a retirement timing goal and a plurality of income goals and retirement timings.

FIG. 6 depicts one flow of collecting retirement goal information. The left hand diagram illustrates the overall flow. The right hand date entry diagram 620 depicts logic that is repeated for partial retirement 604 and full retirement 605 dates. Because a household may include more than one principal, the flow begins with selecting a principal 601. The next selection is to enter retirement timing parameters 602. Optionally, this could be done after entering income goals 607. The system determines whether the user intends a period of partial retirement 603. If so, dates for partial retirement are entered 604. Dates for full retirement are entered 605. This completes entry of timing data 606. The detail of entering dates for partial or full retirement 604, 605 are in the dates entry flow 620. The system determines whether a range of dates will be entered 621 and, if not, whether retirement is desired as soon as possible 622. The system accepts data entry for retirement as soon as possible 624, at a particular age 625 or during a range of ages 623. The flow continues 626 with the dates for partial or full retirement entered. Upon selection of income goal entry 607, the relevant period is identified 608, among full employment, partial retirement or full retirement. Optionally, partial retirement of one or two wage earners could be distinguished. A floor amount of income during the retirement period is entered 609. If more periods remain to be entered 610, the process is repeated. When entry for all relevant periods is complete, the entry of income goals is done 611.

FIGS. 7A-7B depict one interface that implements steps in the FIG. 6 flow. FIG. 7A corresponds to date entry 620. In this embodiment, radio buttons are used to implement the retirement timing choices 621, 622. Selection of a radio button enables corresponding date entry fields. In the left hand column of FIG. 7B, a sequence of steps used by this wizard is given, which collectively enable entry of retirement data for a two principal/wage earner household. In the right hand column, alternative amounts of disposable income for a retirement period can be entered: minimum, target and maximum amounts are supported by this embodiment.

FIG. 8 depicts the relationship between a retirement timing goal 801 and a plurality of income goals and retirement timings 802, 803. Households are defined in this embodiment as having one retirement timing goal that aggregates several other goals. The household retirement timing goal is associated 811 with income goals 802 for periods of full employment, partial retirement and full retirement. The retirement timing goal is also associated 812 with retirement timing goals 803 for each of the household principals or wage earners.

Retirement Timing

The conceptual framework is that a person has a period of full employment, then a period of partial employment and finally a period of full retirement. In certain instances, of course, one or more of these periods may be collapsed into non-existence (for instance for already retired persons.) Thus the dates of partial and full retirement fix these periods. A couple may involve two employed persons each with retirement dates. For the couple partial retirement commences on the earliest full or partial retirement of a member of the couple. Similarly, for the couple full retirement commences when both members are fully retired. Dates given relative to the full/partial retirement events should use the couple's full/partial retirement dates. For both partial and full retirements one may specify a target date and a range within which the date may fall. We treat the latest date as representing a mandatory retirement point. Thus there is no cost associated with retirement at the latest possible date. Bringing the retirement date forward from there incurs cost equal to the salary income foregone by early retirement.

Input for calculations may include:

| Label | Type | Contents |
|---|---|---|
| person | choice | person who retires |
| partial_not_applicable | check | true if no partial retirement period |
| income_fraction | Float | salary during partial retirement as percentage of salary in full employment |
| partial_start | choice | as soon as possible, or at age |
| partial_age | integer | target age at which partial retirement starts |
| partial_before | integer | earliest age for partial retirement |
| partial_after | integer | oldest age for partial retirement |
| full_not_applicable | check | true if no full retirement period |
| full_start | choice | as soon as possible, or at age |
| full_age | integer | target age at which full retirement starts |
| full_before | integer | earliest age for partial retirement |
| full_after | integer | oldest age for partial retirement |

One should have partial_before≤partial_age≤partial_after, full_before≤full_age≤full_after, and partial_before≤full_before, partial_age≤full_age, partial_after≤full_after, Adjusted: True if the annual salary is inflation adjusted Cost: Let $p_1$, $p_2$, $p_3$ denote the dates of partial retirement (earliest, target and latest respectively. Similarly let $q_1$, $q_2$, $q_3$ denote the dates of final retirement. We are given actual partial and final retirement dates $e_1$ and $e_2$ Let f be the income fraction. Let $S(n,t,\phi)$ be the salary at time t+n if fully employed. Then in dollars $$C(n, t, \phi, e) = \begin{cases} 0 & \text{if } n + t < e_1 \\ (1 - f)S(n, t, \phi) & \text{if } e_1 \leq n + t < e_2 \\ S(n, t, \phi) & \text{if } e_2 \leq n + t < q_3 \\ 0 & \text{if } q_3 \leq n + t \end{cases}$$

Spend: Return $C_i(0,t,\phi,e)$.

Apply: Called when retirement policy decides retirement should occur. Updates human capital accordingly. May adjust insured amount for term life.

Income Goals

Income goals are goals for personal spending during different periods of life. The periods are those of full employment, partial retirement and full retirement. From the point of view of user input we provide both a short form and a long form of input.

Input for calculations may include:

| Label | Type | Contents |
|---|---|---|
| period | choice | life period |
| minimum | integer | minimum income requirement |
| target | integer | target income requirement |
| maximum | integer | maximum income requirement |

An implicit input is the cola sensitivity κ with a value of 1.
Input for calculations may include:

| Label | Type | Contents |
|---|---|---|
| period | choice | life period |
| as_prior | check | if true set all values equal to prior life period |
| schedule: category | Text | static text label for major spending category |
| schedule: item | Text | static text label for minor spending category |
| schedule: as_prior | check | if true set item value equal to prior life period |
| schedule: amount | integer | target spending level for amount |
| schedule: fixed | check | if true amount must equal target |
| schedule: minimum | integer | minimum spending level for amount |
| schedule: maximum | integer | maximum spending level for amount |

For each item minimum≤amount≤maximum. If fixed is true, then internally treat minimum and maximum as equal to amount (but display is blank). If as prior is checked for an item, then internally carry forward the values of amount, fixed, minimum and maximum from the prior period, but display as blank. If as prior is checked for the whole period then treat as if checked for each item. The initial list of categories and items is:

Rental Expense: Rent, maintenance fee, renter's insurance.
Household Expenses Groceries and supplies, restaurant meals, garden supplies, computer equipment/supplies, appliances.
Household Services Gardner, domestic, household employee taxes, water, gas, electricity, trash, security, pool, telephone, television, internet, plumbing/repair services, personal property insurance.
Transportation Expenses Gasoline, service, parking, tolls, taxes and fees, fines, public transit.
Personal Expenses Toiletries/cosmetics, nonprescription drugs, clothing
Personal Services: Dry cleaning/laundry, barber/salon/spa, legal/accounting, banking/investment.
Health Care Expenses: Insurance, doctor, dentist, vision/hearing, prescription drugs, therapies.
Recreational Expenses Entertaining, Vacation/travel, reading/music/movies, gym/clubs, gifts, contributions, hobbies, tickets.
Professional Expenses Uniform/clothing, Dues, Publications, Education, disability insurance, home office expenses.
Children Expenses Day care/school tuition, school supplies, lunch money, allowances, clothing, barber, gifts, activities/lessons, medical, dental/orthodontia, prescriptions, vision/hearing, vacation/camp.
Capital expenses: automobile, other motor vehicles, rug/furniture, household appliances, house/garden/pool systems.
Miscellaneous Expenses: Other.

The list of categories and items can be expected to evolve. Sum over all items to get target, minimum and maximum expense levels. Let $v_i$ be the amount for item i. The cola sensitivity is $$\kappa = \frac{\sum_i v_i \sigma_i}{\sum_i v_i}$$

where $\sigma_i$ is the sensitivity coefficient for item i.

Adjusted: Returns true.
Cost: Let $I(t,\phi)$ denote the CPI index at time t along path $\phi$ and let $\mu$ denote the expected inflation rate. Let κ be the cola sensitivity. Let the adjusted mean be $\mu'=\kappa\mu$ and the adjusted index be $I'(t,\phi)=(1+\kappa r)^t$ where $r=e^{\ln [I(t,\phi)]/t}-1$
Let $Q_i(k)$ denote the minimum, target and maximum amounts divided by 12 (to adjust to monthly from annual) for period k. Let $$\psi(s, e) = \begin{cases} 1 & \text{if } s < e_1 \\ 2 & \text{if } e_1 \leq s < e_2 \\ 3 & \text{otherwise} \end{cases}$$

for $e_1$ and $e_2$ the dates of partial and full retirement. Then $C_i(n,t,\phi,e)$ is the result of inflation adjusting $Q_i(\psi(t+n, e))$ using the adjusted index and mean.
Spend: Return $C_i(0,t,\phi,e)$.
Apply: Debit cash for spend and return a cash flow of form INCOME_DISTRIBUTION.

Special Expenditures
Education
Education goals reflect payment of educational expenses for oneself or others, as discussed in the context of FIG. 5. Typical examples include sending children or grandchildren to secondary school or college.
Input for calculations may include:

| Label | Type | Contents |
|---|---|---|
| Description | text | identifying label |
| Donor | choice | household or individual |
| Name | list | name of household member if donor is individual |
| Funding | choice | how funded |
| Degree | choice | degree sought |
| Institution | choice | type of institution |
| Years | integer | planned length of program |
| Starting | date | year and month program starts |
| Tuition | integer | estimated annual cost for tuition, books, etc. |
| Board | integer | estimated annual boarding expense |

| Label | Type | Contents |
| --- | --- | --- |
| minimum | float | minimum percentage funded |
| Target | float | target percentage funded |
| maximum | float | target percentage funded |

Choices for funding are all, personal, personal plus joint. Choices for degree are high school diploma, 2 year college certificate, business college degree, 4 year college (BA/BS), graduate (MA/PhD), professional (MBA/MD/LLD). Choices for institution are public, parochial, private, selective private, for profit.

Adjusted: Returns true.
    Cost: Based on the degree and institution determine the appropriate inflation index to use for adjusting the tuition amount. Use the CPI inflation rate to adjust board. Denote the adjusted tuition and board by $T(n,t,\phi)$ and $B(n,t,\phi)$ respectively and set the monthly spending $S(n,t,\phi)=[T(n,t,\phi)+B(n,t,\phi)]/12$. Let $x_i$ denote the minimum, target and maximum ratios. Determine the finish date of the program by adding years to start. Let $\chi(m)$ be 1 if time m is between the start and finish dates and 0 otherwise. Then $C_i(n,t,\phi)=x_i\chi(t+n)S(n,t,\phi)$
    Spend: Returns $C_i(0,t,\phi)$.
    Apply: Debit cash and generate cash flow item of type EDUCATION_EXPENSE.
    Family Support This goal is the counterpart of the family support resource. It represents periodic payments to an individual (typically a family member) or to a family unit. Typical examples would include support for elderly parents, for a divorced daughter and her child or for an orphaned grandchild or niece/nephew. Issues are:

Does the payment generate a gift tax liability for the benefactor or is it excludable from tax?
    Does the payment terminate on the benefactor's death and if so, is the benefactor the household (if a couple) or just a single member of the household?
    Does the payment terminate on a fixed date, on the beneficiary's death or on the earlier or latter of the two events?

It should be noted that there is no assumption in the goal that the beneficiary is actually related to the donor. Thus, this goal might for instance be used to represent payment of a pension to a retired domestic.

Input for calculations may include:

| Label | Type | Contents |
| --- | --- | --- |
| Description | text | identifying label |
| Donor | choice | household or individual |
| Name | List | name of household member if donor is individual |
| Funding | Choice | how funded |
| Minimum | integer | minimum annual payment |
| Target | integer | target annual payment |
| Maximum | integer | maximum annual payment |
| cola | check | true if subjected to cost of living adjustment |
| gift tax excludable | check | true if not subject to gift tax |
| start | date | date payments start |
| end | choice | event ending the payments |
| end_date | date | date payments end if end is date |
| schedule: beneficiary | text | beneficiary name |
| schedule: born | integer | year of birth |
| schedule: sex | choice | beneficiary's sex |
| terminated | check | true if payments terminate on benefactors death |
| benefactor | choice | benefactor is household or individual (if terminated true) |
| name | choice | name of benefactor if benefactor is an individual (if terminated true and benefactor is individual) |

Choices for end are date and beneficiary death. The schedule holds particulars on the beneficiaries (not needed if end is date). Choices for benefactor are household or individual (not needed if terminated is false).

Adjusted: True if subject to cola.
    Cost: Let $\phi(m)$ denote the probability that the beneficiary is alive at time m. If the support is terminated by a date let $$\chi^{(m)} = \begin{cases} 1 & \text{if } m \text{ is between the start and end dates} \\ 0 & \text{otherwise} \end{cases}$$

If the support is terminated by the beneficiaries death let $$\chi^{(m)} = \begin{cases} \phi(m) & \text{if } m \text{ is on or after the start date} \\ 0 & \text{otherwise} \end{cases}$$

If the support is terminated by the earlier of the end date and the beneficiary's death then let $$\chi^{(m)} = \begin{cases} \phi(m) & \text{if } m \text{ is between the start and end dates} \\ 0 & \text{otherwise} \end{cases}$$

If the support is terminated by the latter of the end date and the beneficiary's death then let $$\chi^{(m)} = \begin{cases} 1 & \text{if } m \text{ is between the start and end dates} \\ \phi(m) & \text{if } m \text{ is after the start date} \\ 0 & \text{otherwise} \end{cases}$$

Let $A_i$ denote the minimum, target and maximum amounts divided by 12. If the amounts are subject to cola then let $Q_i(n,t,\phi)$ denote $A_i$ after adjustment by the CPI. Otherwise let $Q_i(n,t,\phi)=A_i$. If the payment's are terminated by the benefactor's death let $\psi(s)$ be the probability the benefactor is alive at time s otherwise let psi(s)=1. Then $C_i(n,t,\phi)=\chi(n+t)\psi(n+t)Q_i(n,t,\phi)$.

Spend: Returns $C_i(0,t,\phi)$.

Apply: Debit cash. Return a cash flow item of type FAMILY_SUPPORT or TAXABLE_GIFT depending as excludable or not.

Charitable Giving

This goal consists of one-time or annual contributions to organizations. Some organizations may be considered charities in which case the contribution is tax deductible. The goal is formulated as a total spend rather than on a per beneficiary basis. By default, spending is assumed to terminate on the death of the donor, who may be either the household or a member of the household, but can be specified to continue until a date.

Input for calculations may include:

| Label | Type | Contents |
|---|---|---|
| Description | text | identifying label |
| Donor | choice | household or individual |
| Name | choice | name of household member if donor is individual |
| Funding | choice | how goal is funded |
| start | choice | absolute or event time |
| frequency | choice | one-time or annual |
| terminates | choice | absolute or event time, if frequency annual |
| terminus | date | when terminates if frequency annual |
| survives | check | true if spending survives donor's death |
| amount | choice | dollar or percent after tax income |
| Minimum | integer | minimum spend |
| Target | integer | target spend |
| Maximum | integer | maximum spend |
| deductible | integer | tax deductible fraction |

Cost: Let t denote a time variable. If amount is dollar let $A_i(t)$ denote the minimum, target and maximum values respectively for i=1, 2, 3. If amount is percent let $\pi_i$ denote the three percentages; let $I_i(n,t,\phi)$ be the minimum, target and maximum income for time t+n and set $A_i(n,t,\phi)=\pi_i I_i(n,t,\phi)/12$. Define $\chi(t)$ to be 1 between start and terminus and 0 otherwise. Let $\psi(s)$ denote the probability that the donor is alive at time s if giving is terminated by the donor's death and let $\psi(s)=1$ otherwise. Let $C_i(n,t,\phi)=\chi(t+n)\psi(t+n)A_i(n,t,\phi)$.

Adjusted: False if amount is dollar, else true.

Spend: Returns $C_i(0,t,\phi)$

Apply: Debit cash. Calculate the deductible fraction and return a cash flow item of type CHARITABLE_DEUCTION. Return an item of type CONTRIBUTION for the remaining balance.

Capital Expenditures

Real Property Purchase

The goal of purchasing real property shares considerable descriptive data with the real property resource, but may be less detailed, reflecting the generally greater vagueness about a planned acquisition than an actual holding. One aspect of a real estate purchase is how it will be financed. We assume the following financing structure: Proceeds from sale of an identified existing property are applied; additional cash may be invested at time of purchase (a down payment); a mortgage is taken for a term of years; if the mortgage is not fully amortizing the remaining balance is paid at maturity (final payment); and the property may generate annual rents and tax deductions.

Several examples will indicate typical possibilities. A starter home may be purchased with a small down payment and a long fully amortizing mortgage. An expansion home is purchased with the proceeds from the sale of the starter home, a cash down payment and a partially amortizing mortgage whose final payment coincides with a planned lump sum payout from a retirement plan. A rental property is purchased with a down payment and a mortgage where the rents and tax benefits offset the mortgage service cost. In general, the costs of ownership include both the purchase price and the annual upkeep (taxes, maintenance and insurance.)

Input for calculations may include:

| Label | Type | Contents |
|---|---|---|
| Description | text | identifying label |
| Funding | choice | how funded |
| Type | choice | type of property |
| Neighborhood | choice | type of neighborhood in which located |
| Location | choice | geographical region in which located |
| Minimum | integer | minimum purchase price |
| Target | integer | target purchase price |
| Maximum | integer | maximum purchase price |
| tax | float | annual property tax rate |
| maintenance | float | annual maintenance cost as percent of purchase price |
| insurance | float | annual insurance cost as percent of purchase price |
| timing | choice | event time or absolute time |
| Earliest | date | earliest purchase date |
| Planned | date | planned purchase date |
| Latest | date | latest purchase date |
| preference | check | true if preference is for sooner rather than latter |
| schedule: property | choice | property resource whose sale proceeds are applied to purchase |
| schedule: percentage | integer | percentage of net sales proceeds applied |
| cash | choice | units are dollars or percent of purchase price |
| Minimum cash | integer | minimum cash down payment |
| Target cash | integer | target cash down payment |
| Maximum cash | integer | maximum cash down payment |
| mortgage fraction | integer | fraction original balance amortized over term |
| term | integer | years original life in mortgage |
| rent | choice | dollar or percent of purchase |

-continued

| Label | Type | Contents |
| --- | --- | --- |
| cash rent | integer | annual cash rent |
| depreciation | integer | annual depreciation claimed on tax form |

Cost: Let t be the time at which we are evaluating cost. If earliest or planned are before t then advance them to t. We calculate three cases. The target case is for the target value at the planned time. If preference is for sooner the minimum case is for the minimum amount at the latest time and the maximum case is the maximum at the earliest time. If preference is for latter then the minimum case is for the minimum amount at the earliest time and maximum case is for the maximum value at the latter time. Consider one case. Let the purchase time be t+n. Use type, neighborhood, and location to determine an inflation index. Inflation adjusts the purchase price to the purchase date; call the result P. For each property i in the schedule, let $N_i$ be the net proceeds from sale at the purchase time t+n for the case. Let $f_i$ be the associated percentage and let $$N = \sum_i f_i N_i$$

be the total net proceeds. Let N'=min(P, N). Let B=P−N' be the balance. If B=0 let D=0. Otherwise let c be the minimum, target or maximum cash depending as this is the maximum, target or minimum case. If cash is percent let d=cP otherwise d=c. Set D=min(d,B). Let M=B−D. Then D is the cash down payment and M is the mortgage amount. The final amount is F=(1−a)M for a the amortization fraction. The cash flows are N'+D at time t+n
as determined by the mortgage terms through maturity
F at maturity
Spend: Returns $C_i(0,t,\phi)$.
Apply: Called when purchase occurs. Sell the scheduled properties and repay attached mortgages. If a mortgage is assumable and has a negative interest cost adjustment then reduce sales price by adjusted mortgage balance and remove the mortgage from the portfolio. Debit cash for the amount of the down payment. Create a new property holding. Set its fields based on descriptive data provided. Attach a conventional mortgage of the indicated term and amortization rate.

Lump Sum
A one-time spending goal without special features.
Input for calculations may include:

| Label | Type | Contents |
| --- | --- | --- |
| Description | text | identifying label |
| Donor | choice | household or individual |
| Name | list | name of household member if donor is individual |
| Funding | choice | how funded |
| Minimum | integer | minimum annual payment |
| Target | integer | target annual payment |

| Label | Type | Contents |
| --- | --- | --- |
| Maximum | integer | maximum annual payment |
| cola | check | true if subjected to cost of living adjustment |
| Earliest | date | Earliest date |
| Planned | date | Planned date |
| Latest | date | latest date |

Adjusted: True if cola applies.
Cost: Let the minimum case be the minimum value at the latest time, the target case be the target value at the target time and the maximum case be the maximum value at the earliest time. If cola applies, CPI adjust the value to the time. The cash flow is the (possibly adjusted) value at the time.
Spend: Return $C_i(0,t,\phi)$.
Apply: Called when expenditure occurs. Debit cash and return a cash flow item of type CAPITAL_EXPENDITURE.

Estate Planning Goals
Personal Gifting
This goal represents the goal of giving money on an annual basis to a group of individuals. Typically gifting programs are entered into as an estate planning tool and are calibrated to maximize the tax benefit. Currently tax law allows $11,000 a year to be given from one donor to one beneficiary tax free. Thus a typical gifting program would call for a couple to jointly give $22,000 a year to each child during the couples joint lives and then $11,000 a year during the survivor's life. Several obvious variants on this on this scheme would include:

Giving less than the tax-free maximum or more.
Including spouses and grandchildren in the program so as to maximize the tax free transfer.
Only one member of the household makes the gifts (perhaps because the children come from a prior marriage).
Giving different amounts to different individuals, e.g. because the goal is equal transfers on a family unit basis rather than a per individual basis.
Does the gift flow terminate on a beneficiaries death (or does it continue in favor of a representative of the deceased beneficiary)?
Does the program terminate once the donor's net worth has been reduced to some level (e.g. the lower limit for incurring an estate tax.)?

It is support for these various features which distinguish the personal gifting goal from the family support goal.
Input for calculations may include:

| Label | Type | Contents |
| --- | --- | --- |
| Description | Text | identifying label |
| Grantor | choice | individual or household |
| Name | choice | name of individual if grantor is individual |
| Funding | choice | how funded |
| Start | choice | event or absolute time |
| start time | date | when program starts |
| until | choice | when program terminates |
| terminates | date | terminal time |
| early termination | check | true if terminates on low net worth |
| net worth | integer | net worth level at which program terminates |

-continued

| Label | Type | Contents |
|---|---|---|
| amount | choice | dollar or percent after tax income |
| Minimum | integer | minimum program spend |
| Target | integer | target program spend |
| Maximum | integer | maximum program spend |
| tax limit | check | true if spend limited to tax free amount |
| maximize transfer | check | true if shares of spend adjusted to maximize transfer |
| schedule: name | text | beneficiary name |
| schedule: born | integer | year beneficiary born |
| schedule: sex | choice | male or female |
| schedule: shares | integer | shares in total spend |
| schedule: survivor | check | true if gift survives beneficiary's death |

Adjusted: False if dollar else true.

Cost: Let t be a time variable. Define $\chi(t)$ to be 1 between start and terminus and 0 otherwise. If amount is dollar let $A_i(t)$ denote the minimum, target and maximum values respectively for i=1, 2, 3. If amount is percent let $\pi_i$ denote the three percentages; let $I_i(n,t,\phi)$ be the minimum, target and maximum income for time t+n and set $A_i(n,t,\phi)=\pi_i I_i(n,t,\phi)$. If the amount is limited to the tax free amount and shares can be increased, calculate the limit as $L=\tau(t)n_g n_b$ where $\tau(t)$ is the limit per gift in year t, $n_g$ is the number of grantors and $n_b$ is the number of beneficiaries. Then reduce $A_i(n,t,\phi)$ to L should it be greater. If shares cannot be increased, let $S_i$ be the number of shares for beneficiary i, S the total number of shares and x the largest value of $S_i$. Then $L=\tau(t)S/x$ and we may adjust $A_i(n,t,\phi)$ as before. Let $\psi(s)$ be the probability that the grantor is alive at time s if death terminates giving and $\psi(s)=1$ otherwise. Let $C_i(n,t,\phi)=\chi(t+n)\psi(t+n)A_i(n,t,\ )/12$. Let $V_i$ be the present value of the gift stream. If early termination applies, let R denote total resources, $G_i$ the value of other goals at the three levels, and K the minimum wealth level to be maintained. Let $N_i=\max(0,R-G_i-K)$. If $V_i>N_i$ then reduce $V_i$ to $N_i$.

Adjusted: False if amount is dollar else true.

Spend: Returns $C_i(0,t,\phi)$.

Apply: Debit cash. Determine exempt fraction and return a cash flow item of type EXEMPT_GIFT. Return a cash flow item of type TAXABLE_GIFT for the balance.

Bequest Goal

This goal establishes a size for one's estate (before estate taxes).

Input for calculations may include:

| Label | Type | Contents |
|---|---|---|
| Description | Text | identifying label |
| Testator | choice | household or individual |
| Name | Choice | name of household member if testator is individual |
| Funding | Choice | how funded |
| Minimum | integer | minimum estate |
| Target | integer | target estate |
| Maximum | integer | maximum estate |
| cola | check | true if subject to cost-of-living adjustment |

Adjusted: True if cola

Cost: Let $b_i$ represent the minimum, target and maximum bequest amounts for i=1, 2, 3. Let d(n,t) represent the probability that death occurs at time t+n given survival to time t. If cola applies let $B_i(n,t,\phi)$ be $b_i$ after CPI adjustment to time t+n. Otherwise let $B_i(n,t,\phi)=b_i$. Then $C_i(n,t,\phi)=d(n,t)B_i(n,t,\phi)$.

Adjusted: True if cola applies.

Spend: Returns 0.

Apply: Called on death. Debits cash and returns a cash flow item of type BEQUEST.

Property Bequest Goal

This goal represents bequest of a particular property plus cash in some ratio to the value of the property. For instance, the goal might be to leave a house to one child and cash of equal value to two other children, so in this case the cash ratio would be 2.0. Here the minimum, target and maximum are taken as percentage realization of the goal.

Input for calculations may include:

| Label | Type | Contents |
|---|---|---|
| Description | Text | identifying label |
| Testator | choice | household or individual |
| Name | Choice | name of household member if testator is individual |
| Property | text | property identifier |
| debt_free | Boolean | bequest free of debt if true |
| Cash | float | cash multiple of property value |
| Minimum | integer | minimum percentage |
| Target | integer | target percentage |
| Maximum | integer | maximum percentage |

Adjusted: Return true.

Cost: Let $P(t,\phi)$ be the market value of the property at time t along path $\phi$, and let $D(t,\phi)$ be the value of mortgages on the property at time t along path $\phi$. Let $\kappa$ be the cash multiplier. If the goal is to leave the property debt free let $Q(t,\phi)$ be $D(t,\phi)+\kappa P(t,\phi)$. Otherwise let $Q(t,\phi)$ be $\kappa[P(t,\phi)-D(t,\phi)]$. Let $\pi_i$ be the three percentages. Let d(n,t) be the probability of death in year t+n and $\rho$ the risk free rate. Then $$V_i(t,\phi) = \pi_i\left[P(t,\phi) + Q(t,\phi)\sum_n \frac{d(n,t)}{(1+\rho)^n}\right]$$

is the cost of the goal.

Spend: returns 0.

Apply: Called on death. If mortgage to be paid then pay it. Remove property from household. Debit cash for any associated cash bequest. Return cash flow item of type BEQUEST equal to total value paid out.

Schema Architecture

FIGS. 9A-9B include selected excerpts from the object model schema (OMS) of a retirement goal. The OMS representation has been developed to fulfill needs not satisfied by traditional XML schema languages. The full OMS of a retirement goal appears in the accompanying computer program listing appendix on CD-ROM. This listing is generated using the grid feature of XMLSpy from the XML data in the CD-ROM appendix. The retirement timing goal 901 in the grid corresponds to the retirement timing goal 801 of FIG. 8. The final retirement income goal 902 is one of three instances of the association 811 between the retirement timing goal 801 and the income goal 802.

While XML has emerged as a de facto standard for web-based data formats, translation among XML, relational database formats and object-oriented programming languages is challenging. The many schema languages devised for XML have various strengths and weaknesses. See, e.g., Lee, D. and Chu, W. W. 2000. Comparative analysis of six XML schema languages. SIGMOD Rec. 29, 3 (September 2000), 76-87. http://doi.acm.org/10.1145/362084.362140 (last visited Apr. 24, 2006); Lee, D., Mani, M., and Chu, W. 2003. Schema Conversion Methods between XML and Relational Models in Omelayenko, B. and Klein, M. eds. Knowledge Transformation for the Semantic Web. IOS Press, Amsterdam (last visited Apr. 24, 2006)<URL>; Mani, M. 2003. Data modeling using XML schemas. Dissertation, UCLA (last visited Apr. 24, 2006)<URL>.

The OMS disclosed supports code generation for Java-Beans, XML mappings, SQL queries, SQL DDL definitions and DAO library objects. The model is rich enough that other code generators could use OMS; an advantage of OMS is that it reduces the dependence of the system on a particular code or programming technology. As technologies evolve, code generators can be written to use new technologies based on the existing OMS, with little or no modification of the OMS.

The retirement timing goal object can be thought of as a relational database table. In a language like Java, this object extends another object definition, such as a retirement goal type. That is, it inherits some properties from other definitions. This system treats a retirement timing goal has a special kind of financial goal that aggregates several other goals. Instead of minimum, target and maximum values, which are used for monetary targets, relevant timing values are depicted by reference 620 two DD entry and FIG. 7A. Model properties of the retirement timing goal object type support code generation of beans, classes, SQL and XML. A retirement timing goal is identified as a specialization of a retirement goal. That is, it inherits properties of a retirement goal in the class inheritance sense.

The final retirement income goal attribute and association can be thought of as a row in a relation table of a relational database. Admittedly, a relation table is typically used in relational databases to implement an m:n relationship. Here, a retirement timing goal object relates to between one and three income goals. The association between the retirement timing goal object and the final retirement income goal instance of an income goal object can be thought of as a row in relation table that has one to three rows. The three rows correspond to a full employment income goal, a partial retirement income goal and a full retirement income goal. In the full OMS, these three associations are separately defined.

The final retirement income goal definition 902 includes both an attribute and an association/association end pair. These structures represent the same underlying data value in two alternative ways. The attribute version is used in one embodiment by user interface metadata structures, while the association is used by code and documentation generators. The reader will recognize that in these two alternative representations can be reconciled and condensed to use only the association, as the attribute can be inferred from the association.

The association 902 attribute is named by qualifying the association name by the domain table name. The domain reference is the retirement timing goal table entry 801. The co-domain is one of up to three income goal table 802 entries. The corresponding association is named in parallel with the attribute. The association end includes two entries for objects at opposite ends of the association, namely the tables for retirement timing goals 801 and for income goals 802. These association ends are identified as co-domains. The association itself is the domain reference.

For both attributes and associations, model properties are given that support code generation. Combining the model properties of attributes and associations will support inference of the attribute from the association.

Goal Balancing

A display useful for goal balancing is provided in FIGS. 21A-21B. The client has entered the basic client household information, including lifetime resources and claims; it is useful to make sure the goals are realistic and consistent with available resources and constraints. After creating a new client household, is likely that the goals are not in balance with resources available for obligations. Accordingly, it is useful to adjust the goals and balance them with resources and obligations. Margin of safety percentages are a useful tool in accomplishing this. Basic information for lifetime resources and claims appears in the right hand column 2112, 2132. Only part of the claims information 2132 is visible, due to screen limitations. A resources and goals chart 2131 provides a graphic comparison of resources and claims. In this example, the present value of resources is $4 million, divided among investments, future job-related earnings (human capital), entitlements (pension) & insurance, and other. (We acknowledge that the chart does not match the amounts shown in the right column.) The claims are categorized into liabilities, which must be satisfied, primary goals, such as basic living expenses, secondary goals and additional goals. A margin of safety analysis provides a table 2111 and chart 2121 that prominently analyze the margin of safety. In this example, the resources far exceed liabilities, leaving a substantial margin of safety. The resources match the liabilities plus primary goals, leaving no margin of safety. The secondary goals are reach 150 percent of the resources and the additional goals reach 200 percent of the resources, measured on a present value basis. Because the resources are inadequate, the margin of safety is negative.

During simulation, we apply funds, for instance, first to fund goals to level 1, then to level 2 and finally to level 3. Level 1 may be liabilities. Within a level funds are divided among goals equally. To perform this calculation let $CO_0=0$ and $CO_4=\infty$. Then there is a unique $i<4$ such that $CO_i \leq R < CO_{i+1}$. Let $X=R-CO_i$. If $i=3$ then every goal is funded to the maximum level and there are excess funds X. If $i<3$ then there are no excess funds. The funding status of the retirement goal is $FR=CR_i+(X/3)$. Similarly the funding status of the bequest and lump sum objectives are $FB=CB_i+(X/3)$ and $FL=CL_i+(X/3)$. Here $CR_0=CR_0=CL_0=0$. The results of this funding allocation appear in various reports.

Applying available resources preferably is constrained during simulation so that the estate is not depleted before the retirees die. The so-called "longevity risk" is that resources will be exhausted prior to death. It may be that the most basic goals, such as minimum required income and meeting debt obligations, cannot be met in some cases, which should lead to reformulation of the minimum requirements (or may lead to an acceptance that retirement may be difficult). In the runs in which minimum goals are satisfied, the simulation applies funds to successive levels of goals and tracks the levels of funding (e.g., on a percentage basis) achieved in each simulation run. As the resources available vary from run to run, so the level of goal funding does as well. In the runs that produce sufficient resources to meet minimum requirements through death, it is more useful for planning purposes to describe levels of funding attainable for various goals than to pick a particular spending level and predict the year when the money runs out.

Margin of Safety and Lifetime Resources and Claims Statement

Figure 10:
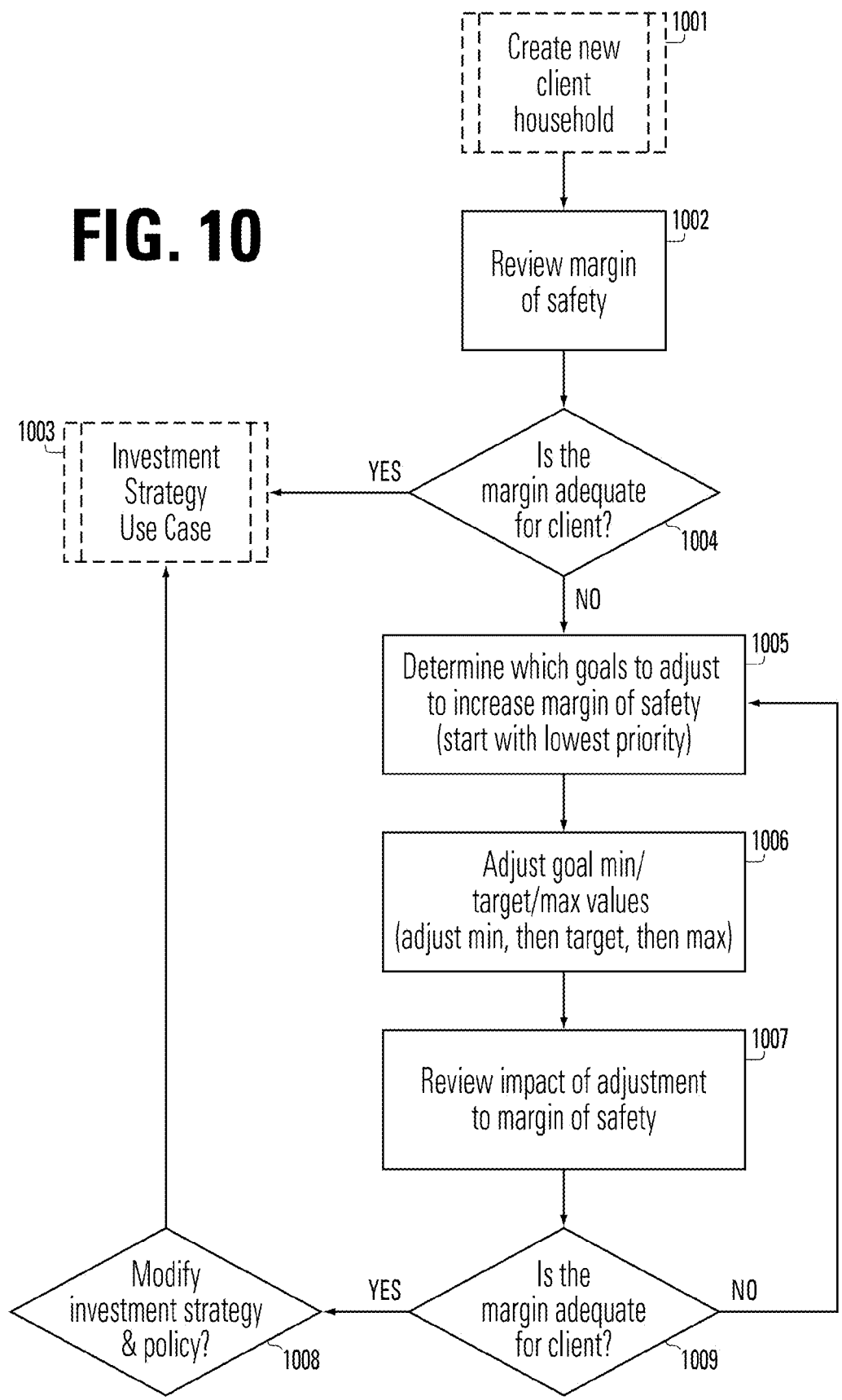
FIG. 10 depicts additional detail of goal balancing.
Figure 12:
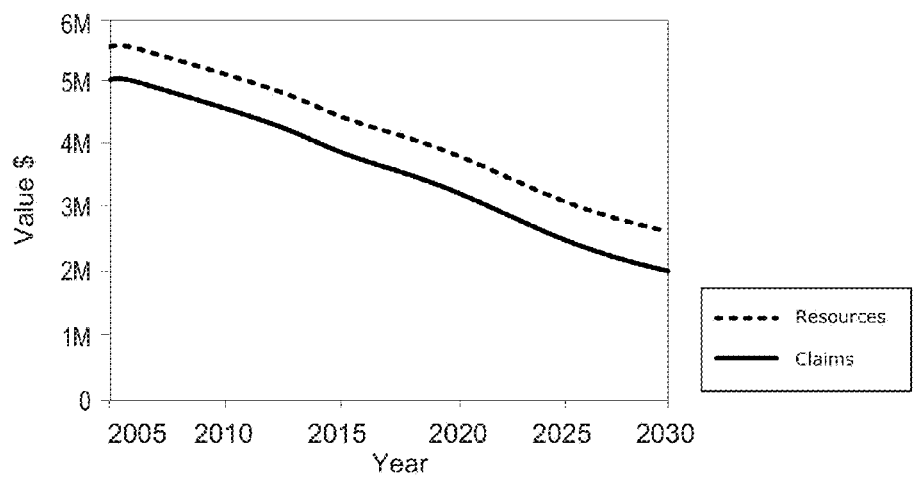
Figure 13:
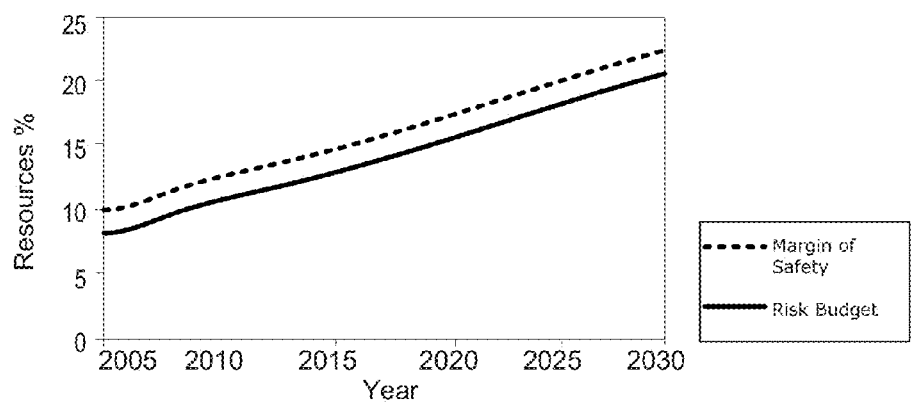

The margin of safety we define as a percentage margin between resources available and resources needed. To illustrate the margin of safety, the lifetime resources and claims statement depicted in FIG. 11 and the margin of safety graphs depicted in FIGS. 12-13 are useful. Other useful illustrations include: a summary of goals by goal type, minimum, target and maximum amounts, timing and goal priority; a timeline life events; table listing resources, value and percentages; the table listing claims, value and percentage; and the graph of claim details, including claim breakdown, funding breakdown, obligation breakdown and goal breakdown. The flow in FIG. 10 begins after creation of a new client household 1001. A customer or analyst reviews and considers the desired margin of safety 1002. Iteratively, simulations are run and the resulting margins of safety are considered for their adequacy 1004. If the resulting margin is unsatisfactory, and evaluation is made of which goals to adjust to increase the margin of safety than 1005 preferably beginning with the lowest priority goals. Adjustments are made 1006 minimum, target and maximum values or, for timing goals, to lengthen the period of full or partial employment. The simulation is rerun and the impact of adjustments on the margin of safety is evaluated 1009. Then, if the margin of safety remains inadequate, further determinations are made regarding goal adjustment in 1005. If the margin is adequate, the advisor or customer still may choose to modify investment strategies and policies 1008. Modifications lead to investment strategy instances 1003 that can be tested and compared against one another.

Revisiting the lifetime resources and claims statement of FIG. 11, a value figure appears next to each line item. Conceptually, the value of an asset is an estimate of the after tax proceeds from an immediate liquidation of the asset. For an obligation, the value is the current cost to retire or defer the claim. We also wish to estimate the value of tax deferral. Tax deferral represents the value due to postponing payment of tax from now until the point of likely liquidation of the asset.

The standard lifetime resources and claims statement calculations are:

$$\text{market value} = \text{quantity} \times \text{price}$$

$$\text{liquidation cost} = \text{haircut} \times \text{market value}$$

$$\text{gain} = \text{market value} - \text{basis}$$

$$\text{tax} = \text{tax rate} \times \text{gain}$$

$$\text{discount factor} = (1 + \text{risk free rate})^{-\text{years to sale}}$$

$$\text{present value of tax} = \text{discount factor} \times \text{tax}$$

$$\text{value tax deferral} = \text{tax} - \text{present value of tax}$$

$$\text{net value} = \text{market value} - \text{liquidation cost} - \text{tax} - \text{loan value}$$

For some assets the standard calculations are implemented as given. But for other assets the calculations require local modifications.

The lifetime resources and claims statement of FIG. 11 may be organized in three parts: sellable assets, contingent sale assets and retained assets. Sellable assets are those which can be sold as needed to raise funds. Financial assets financial typically fall in this category. Contingent sale assets would normally only be sold under stress. Assets with some emotional content such as homes and collections fall in this category. Finally, retained assets are assets which either are not sellable or which one definitely plans on not selling. Interests in a family business might fall in this category. For retained assets the tax is zero.

The lifetime resources and claims statement organizes its data in a hierarchical structure. In one embodiment, the highest level structure is:

I. Resources—Economic assets, further subdivided as
   A. Marketable—Assets that can be sold for cash. Subdivided as
      i. Liquid—Assets which are easily converted to cash
      ii. Illiquid—Assets which take some time to convert to cash
      iii. Restricted—Assets not fully available to the owner. Within this group we organize the accounts first by owner and second by type as per
         a. Deferred Accounts (traditional IRA, 401k, Sep IRA)
         b. Sheltered Accounts (Roth IRA, Coverdale, HSA)
         c. Employee Incentive Compensation
      iv. Contingent—Assets which owner could sell but intends not to unless pressed to it
   B. Income Producing—Assets that generate income but cannot be sold
   C. Reserve—Assets that cannot be sold and which do not generate cash income
   D. Informational—Assets which are "set aside" and not considered in the analysis
II. Obligations—Contractual obligations not specifically tied to particular resources.
III. Goals—Life aspirations Within each resource group, we organize the accounts by owner, possibly account type and alphabetically by account name. Within an account we organize by asset class. Within an asset category we organize alphabetically by asset name or description and within an asset lots are listed in time order.

Financial assets are reflected on the lifetime resources and claims statement. The key aspect of such assets is that they are held in accounts and the nature of the account determines the tax treatment. In regular accounts a quantity of an asset is purchased on a date for an amount termed its basis. The same asset may have been purchased on multiple occasions, so each occasion represents a separate tax lot for the asset. The gain on the asset is the difference between its current value and tax basis. Depending on the nature of the asset and how long it has been held, one has different amounts of tax calculated on the gain. In tax sheltered accounts (e.g. IRAs) these calculations are done on an account level rather than on an asset level. In consequence, one no longer needs to know the purchase date and amount. It is sufficient to know the quantity held. Since one can ignore the purchase date, one effectively treats all holdings of an asset as belonging to the same lot. Thus the lot concept is unimportant in this setting.

The basic lifetime resources and claims statement presentation is

Market Value1
. . .
Market ValueN
   Total Market Value
   (Transaction Cost)
   (Margin Loan)
   (Deferred Tax)
   Net Value Here the first column is at the asset level and the second column at the account level. Market values are calculated by rolling lot quantities up to asset quantities and multiplying by a price. This price is either market price, or if such is unavailable, a model price. Transaction costs are calculated at the asset level as market value times a haircut percentage that depends on the type of asset. These quantities are individually small and only become interesting once rolled up to the account level. For regular accounts, gain is calculated at the lot level and rolled up to the account level. If a net gain results then a deferred tax is calculated. If a net loss results then a loss carry forward (a type of tax asset) is created. For sheltered accounts the tax is calculated at the account level. Margin loans are shown at current value as a reduction in net value.

Tools for Understanding Simulation Results

The lifetime resources and claims statement, depicted in FIG. 11, is a useful tool for understanding simulation results. It presents a new framework for household portfolio simulation and analysis, moving toward providing households with a plan that they can implement over their lifetime. The lifetime resources and claims statement is dynamic and reasonably predictable. The view that it give broadly encompasses the household's resources and goals, including a portfolio of investments.

Lifetime Resources and Claims Statement Case Study

The lifetime resources and claims statement (sometimes shortened to "lifetime R&C statement") provides a snapshot of the estate at a particular date, such as the date of full retirement or at the age of 80. In this lifetime resources and claims statement, investments are given at market value. A home value is an estimated value. Human capital and Social Security are actuarial present values. A mortgage has a remaining principal balance. Deferred taxes represent capital gain to unrealized gains and ordinary income to on withdrawals from retirement accounts. Estimated income taxes are stated as the present value of tax on income resources. Valuation reserves are primarily transaction costs of asset liquidations. Rules are actuarial present value the discount rates chosen based on priority class. Rather than giving a balance sheet of assets and liabilities, this hybrid statement of resources and claims is stated in terms of lifetime resources and claims, at a particular date. The resources include traditional resources, such as retirement and investment accounts and stock options, plus home value, human capital and Social Security benefits. The claims are grouped into obligations, primary goals, secondary and additional goals and residual goals. Categories such as obligations include entries such as mortgage, deferred taxes, estimated income tax and valuation adjustments. The primary, secondary and additional goals are set by the customer. Basic income is a primary goal and additional income a secondary goal. Examples of other primary and secondary goals are education and basic bequest. An additional bequest or a charitable donation is an example of an additional goal. Wealth building is typically a residual goal. The lifetime resources and claims statement is particularly useful for balancing lifetime resources and claims A case study of the Rockwells helps illustrate the lifetime resources and claims statement as an analytical tool. Anthony Rockwell is a 50-year-old mid-level financial services executive, with a wonderful family. His wife Julie, age 48, is a full-time homemaker and budding artist. They have two children: Carrie, age 13, and Jake, age 10. For the last 10 years, they live in their four-bedroom, single-family home near a major financial center, and they have 10 years left on their 20-year mortgage. Carrie is a smart kid—she is definitely going to a good college. She also loves horses and is dreaming of becoming a vet. Jake's future is a bit less certain.

Anthony is planning to retire in 15 years at age 65. By that time the kids should have graduated from college. Upon retirement, Julie wants them to move to a smaller house in Arizona, but in the meantime the mortgage needs to be paid. This is a relatively standard situation.

Let's analyze their resources in more detail. What do they have? They have a four-bedroom, suburban home which has increased substantially in value. In fact, it has almost doubled over the time they have lived there. They will have earned the maximum social security benefit during retirement. In terms of their accumulated investment assets, they have actually been fairly big spenders in the past, so they don't have much in the way of savings. There is $300 k in the corporate 401(k) plan and $100 k in taxable investments. Anthony and Julie's parents are getting on in age, and it is realistic to expect that they will inherit approximately $250 k in the next 10 years as their parent's estate is divided among their siblings.

Anthony recently visited his local broker who told him, "Anthony, you are a moderate investor!" As such, Anthony was told that he should hold 60% equity and 40% bonds. He left his broker with the warm fuzzy sense that his asset allocation is non-controversial. It is diversified, appropriate for his level of "risk tolerance" and he believes that this won't get him into trouble. Again, a fairly typical situation.

Let's now take a look at this moderate asset allocation in a bit more detail. This is the how it would typically break down for an investor like Anthony. He might have $150 k in investments based on the Lehman Aggregate and $150 k in the S&P 500 as the two principle investments in the 401(k) account. These are the benchmarks against which the actual assets would be managed. As well, there is $100 k in the taxable account, split between a benchmark of the S&P 500 and the EAFE. This would allocate 63% of his investments in equity, fifteen percent of that in EAFE, or international equity, and 37% in fixed income. A traditional approach to summarizing the Rockwell's financial situation appears in the table below:

| Portfolio | |
|---|---|
| 401(k) Account | |
| Lehman Aggregate | 150,000 |
| S&P 500 | 150,000 |
| Taxable Account | |
| S&P 500 | 40,000 |
| EAFE | 60,000 |
| Analysis | |
| Domestic Equity | 48% |
| International Equity | 15% |
| All Equity | 63% |
| Fixed Income | 37% |

However, what if Anthony is not sure that he is a moderate investor? In fact, it is quite likely that Anthony hasn't the foggiest clue what a "moderate investor" means. While the advice is fairly standard and is probably safe, is it the best advice? Can the Rockwell's do better?

How else can we analyze the Rockwells' situation? As described above, we should go beyond just focusing on the assets and fussing about the minutiae of the asset portfolio structure. We need to take a holistic view, with an inventory of the full complement of their assets, and question whether these are sufficient to fund their goals.

Our departure from the traditional financial planning environment starts with a much better description of the Rockwells' circumstances, but following an economic rather than cash flow perspective. First, we list all of the Rockwells' resources, the totality of their net assets that they can use to support their future aspirations and goals. For simplicity, we specify this list of resources after netting out the Rockwells' day-to-day living expenses. The resources part of the lifetime R&C statement contains information such as depicted in the following table:

| Resources | |
|---|---|
| 401(k) Fund | |
| Securities | 300,000 |
| Deferred Tax | (30,000) |
| Net Value | 270,000 |
| Taxable Account | 100,000 |
| All Investments | 370,000 |
| Social security | 275,000 |
| Home | |
| Market Value | 1,500,000 |
| Mortgage | (424,000) |
| Deferred Tax | (81,000) |
| Net Home Equity | 995,000 |
| Human Capital | |
| Base Salary | 257,000 |
| Bonus | 289,000 |
| Net Human Capital | 546,000 |
| Prospective Inheritance | 200,000 |
| TOTAL RESOURCES | 2,386,000 |

In this table, the Rockwells' resources include the 401(k) plan, which has an associated deferred tax (approximately $30 k) liability, as they will have to pay taxes when they withdraw funds from their 401(k). Our view of this deferred tax is that it represents partial leverage advanced by the IRS in the 401(k) plan. Combined with their taxable account, the sum of all of the Rockwells' investments is $370 k.

Next, there is Social Security. The actuarial present value of the Social Security benefit for the Rockwells is approximately $275 k. They also have their home, which has a current market value of $1.5 M, and $424 k remaining on their mortgage. There is also a potential deferred tax liability when they sell their house since the gain is substantial.

Next, we factor in the Rockwells' human capital. For human capital, we first consider the incremental savings that can be applied from Anthony's excess base salary in excess of living expenses that can be used to build up resources over time. The actuarial present value of this savings component is approximately one quarter of a million dollars. We assume that Anthony is going to work until age 65. Though he many not remain in his current job, we assume that he can probably get another similar job with a similar base salary at some other firm. The bonus component is a bit different. Anthony's bonus is based largely on firm performance, which in turn is tied largely to the performance of the financial services sector. If the firm performs well, and the financial services sector has strong performance overall, Anthony does well. If financial services and his firm underperform, Anthony's bonus earnings will suffer. The present value of his bonus, taking into account the risk inherent in it, is almost $300 k. In total, Anthony's human capital, net what is spent for living expenses, is a bit over half a million dollars.

Finally, Anthony's prospective inheritance, which may occur over the next ten years, is present valued at approximately $200 k.

Despite the fact that the Rockwell's have only $100 k in a taxable investment portfolio, if we consider this expanded view of the family's resources, they are now actually worth $2.5 million.

One final comment on the Rockwells' list of resources. It appears to be quite diversified—real estate, human capital, and traditional investments—but overall, it is relatively illiquid. Indeed, one can argue that the Rockwells are really not in control. What are the decisions that the Rockwells can take? To some extent, with the benefit of an advisor, they can organize an investment strategy, but they don't have much else to decide. Anthony can decide to change jobs or not to work, but if he decides not to work, a large part of the family's resources, disappears.

In the lifetime R&C statement approach, the resources serve one purpose—funding goals. Goals represent the other side of this lifetime R&C statement.

What sort of goals? What could the Rockwells use these resources for? The Rockwells could certainly increase their level of spending and their standard of living, but their aspirations are directed elsewhere. They are focused on retirement in Arizona and college education for the kids. Let's take a close look at the implications (see table below). We consider the present value of the retirement income the Rockwells will need, which is a bit over a million dollars. This assumes that they maintain their present standard of living, and that they are likely to have a more beneficial tax rate in retirement. They also want a house in Arizona, so the overall retirement goal is approximately $1.7 M.

| Goals | |
|---|---|
| Retirement | |
| Income | 1,178,000 |
| House in Arizona | 500,000 |
| Total Retirement | 1,678,000 |
| Education | |
| Carrie | 250,000 |
| Jake | 116,000 |
| Reserve for Jake | 110,000 |
| Total Education | 476,000 |
| TOTAL GOALS | 2,154,000 |
| NET RESOURCES | 232,000 |

The Rockwells are also contemplating an Ivy League education for Carrie, starting five years from now, costing a quarter of a million dollars. They also need a reserve for Jake, because they want more or less the same amount of funding for the two kids. The total education goal is half a million dollars, so the total amount of the goals is a little over two million dollars. The net resources are $232 k, which represents the excess of the Rockwells' resources over the present value of the goals. Will they make it?

The net resources number is positive, but we must consider their "margin of safety," which is the net resources as a percentage of total resources. In the Rockwells' case the margin of safety is about 10%, which does not represent a great deal of safety. However, as we are working with present value calculations at this point, it appears that they may make it.

So far our analysis has had no mention of risk. If we start by considering the risk of the fixed income component of their lifetime R&C statement, it turns out that it is fairly interesting, and also fairly exotic. Their mortgage represents borrowing from a savings and loan, and the Rockwells are in essence therefore short fixed income $424 k.

| Side | Item | Value ($) | Modified Duration |
|------|------|-----------|-------------------|
| Short | Mortgage | (424,000) | 5 |
| Short | Deferred Taxes | (111,000) | 28 |
| Long | Lehman Aggregate | 150,000 | 4.5 |
| Long | Social Security | 275,000 | 22 |
| Long | Mortgage Prepay Options | 8,400 | n/a |
| | | (101,600) | 25.4 |

The Rockwells' mortgage is a 20-year fixed-rate mortgage at 5%, with a modified duration of about 5 years. They have a deferred tax obligation of $111 k from the future sale of their home and from 401(k) redemption. Because this is a long term obligation, the modified duration is 28 years. On the long side, the Rockwells have three assets: the investment in the Lehman Aggregate ($150 k), with a modified duration of 4.5 years, the Rockwell's Social Security benefit (Present Value=$275 k), with a modified duration of 22 years, and the embedded prepayment option on the mortgage, which has a value of $8,400. The net value of the Rockwell's rather exotic fixed income portfolio, therefore, is $101,600 short with a modified duration of 25.4 years. As a result, this is a really long-term obligation with significant interest rate sensitivity.

The next question to ask is how the Rockwell's fixed income portfolio actually behaves as a result of the primary factors which drive interest rates, namely the real rate of interest and the rate of inflation. The complex dynamics are obvious from the table shown below. If treasury rates increase 100 basis points and the increase is due to a change in the real rate, then the return will be negative and the obligation of $101,600 will increase to $132,000. However, if we believe the change in treasury rate arises from a change in inflation, the results are different. Because much of the long portfolio is inflation neutral, the change in the value is $30,600 for a rate of return of 38%. A similarly complex dynamic occurs when the treasury rates fall. If the fall is due to a change in the real rate, then a positive return results, whereas if it is due to inflation, the portfolio is neutral.

| Scenario | Due to | Change Value ($) | Return (%) |
|----------|--------|------------------|------------|
| Treasury rate rises 100 bps | Change in real rate | (30,400) | −35 |
| | Change in inflation | 30,600 | 38 |
| Treasury rate falls 100 bps | Change in real rate | 59,600 | 74 |
| | Change in inflation | (400) | 0 |

Next, we turn to the equity portfolio, which is summarized in the table below. When one views the world in a lifetime R&C statement approach, the simplicity of looking at assets alone goes away to some extent. The equity component of the portfolio is composed of three assets: the S&P 500, the EAFE, and the bonus component of Mr. Rockwell's salary. So the total equity component is $590 k and we see that the largest part is, in fact, the bonus component of the salary. It is interesting to note that the S&P 500 has 20% exposure to the domestic finance sector, while the bonus component of the salary has an exposure of 100%. This is because Mr. Rockwell's bonus is paid based on the firm's performance in the financial services sector. As a result, the total weight in the finance sector of the Rockwell's equity portfolio is 61%. This is a far from a well-diversified portfolio. In fact, it is a highly concentrated portfolio which will behave almost completely in line with the finance sector.

| | Equity Portfolio | | |
|---|---|---|---|
| Item | Value ($) | Weight | Finance Sector Exposure |
| S&P 500 | 190,000 | 35% | 20% |
| EAFE | 60,000 | 11% | 0% |
| Salary, bonus component | 289,000 | 54% | 100% |
| | 539,000 | | |

What does this analysis of the Rockwell's fixed income and equity portfolio tell us about the risk that they bear in trying to meet their goals? One way of examining the risk is to look at the value-at-risk of their net resources. Their net resources are $232 k, but the value at risk is $226 k. As such, the margin of safety that the Rockwells have could easily be blown by a poor series of outcomes in the fixed income and equity markets. In fact, there is a one-in-forty chance that they can expect the value-at-risk to be a minus $226 k. While this may not seem particularly serious in any particular year, over a five-year planning horizon, the risk is probably one year in eight.

Where is this risk coming from? It turns out that almost 70% of the risk is derived from the bonus compensation, while the direct investments contribute only 6% of the risk. More interesting, although the house is the largest asset, it actually reduces their overall risk by 1%. This is because real estate is diversifying relative to the equity portfolios and has a beneficial response to changes in interest rate and inflation. Finally, the retirement goal is responsible for 25% of the Rockwell's risk. In terms of the overall exposures, one can view the bonus compensation as being a major hotspot, as well as the risk of being able to meet the retirement goal. One can think of these two risks as being similar to a concentrated position in an equity portfolio.

In this case, rather than looking at individual assets, we are taking a holistic view of the Rockwells' entire financial picture. Our advice for the Rockwells is that in order to have a satisfactory financial future, Anthony clearly needs to earn the bonus compensation. Furthermore, they need to track their progress towards their retirement goal very closely.

Let's discuss some observations regarding how we may further advise the Rockwells. In an asset-only world, the structure of the asset portfolio, its tracking error relative to benchmark, and the overall expected return is clearly important. However, in a lifetime R&C statement world, the financial plan is driven by the goals and whether the resources are sufficient to fund those goals. In the Rockwells' case, the bonus is clearly the most important source of funding. As a result, we would advise the Rockwells to focus on earning the bonus. All the fussing about whether the portfolio should be moderate or moderate-aggressive is relatively unimportant.

A much larger issue is whether the assets are invested appropriately to either earn a large expected return or to hedge the real asset risk. If we want to invest to hedge the risk of the real assets, a radical idea would be to use part of the assets to buy puts on the finance sector. Clearly, Mr. Rockwell's employers would find this potentially disloyal, as Mr. Rockwell is investing to profit on the financial services sector's decline. However, from a family-oriented view, this is clearly not an inappropriate strategy.

There are less radical ideas of course. There is some value to restructuring the fixed income component, probably by adding more TIPS. There is also significant value in shifting the domestic equity into the S&P 500, or perhaps a more broadly diversified equity fund ex-finance. With the introduction of products such as Sector SPDRs, such a strategy can be easily implemented. There may also be a reason to increase the EAFE holding to reduce the domestic finance exposure and the correlation with the rest of the portfolio. It is interesting to note that few of these ideas would result from a traditional asset-only approach. In contrast, a holistic, lifetime R&C statement approach provides more coherent solution and could generate significant value.

It is also important to realize that the lifetime R&C statement will shift significantly over time and that the portfolio will need to adapt. One of the hallmarks of the lifetime R&C statement approach is that the investment process should be dynamic. Fortunately, this approach is by nature dynamic and somewhat predictable, because we have a good sense as to how the lifetime R&C statement will evolve over time. In particular, as indicated in the tables below, we see what happens to the Rockwells' lifetime R&C statement five years from our starting point, now ten years prior to their retirement. Amounts are given in future dollars, which reflect the likely impact of inflation. You will see that the investments have increased from $370 k to $910 k. Their taxable account has increased quite substantially, as did the 401(k) plan. The present value of the Social Security benefit has increased a bit, while net value of the Rockwells' home has increased quite dramatically, both from an increase in market value and the reduction in mortgage which has been paid down.

| Resources | |
|---|---|
| 401(k) Fund | |
| Securities | 440,000 |
| Deferred Tax | (50,000) |
| Net Value | 390,000 |
| Taxable Account | 520,000 |
| All Investments | 910,000 |
| Social security | 295,000 |
| Home | |
| Market Value | 1,725,000 |
| Mortgage | (181,000) |
| Deferred Tax | (131,000) |
| Net Home Equity | 1,413,000 |
| Human Capital | |
| Base Salary | 170,000 |
| Bonus | 191,000 |
| Net Human Capital | 361,000 |
| TOTAL RESOURCES | 2,979,000 |

The deferred tax is now $131K on realizing the investment in their home. In terms of the human capital, the present value of the savings from Anthony's base salary is at $170 k, so the $170 k represents allocations that could be made to additional resources. The present value of Anthony's bonus is $191 k, resulting in net human capital of $361 k. Finally, notice that the Rockwell's parents passed away and they received a bequest which has been added into their investment resources.

| Goals | |
|---|---|
| Retirement | |
| Income | 1,473,000 |
| House in Arizona | 625,000 |
| Total Retirement | 2,098,000 |
| Education | |
| Carrie | 312,500 |
| Jake | 145,000 |
| Reserve for Jake | 137,000 |
| Total Education | 595,000 |
| TOTAL GOALS | 2,693,000 |
| NET RESOURCES | 286,000 |

Let's now consider how the goals have changed. The present value of the Rockwells' desired retirement income is almost $1.5M, and the present cost of the house in Arizona is now $625 k, for a total retirement present value of $2,100,000. The education goal for Carrie has grown to $312,500, and for Jake $280,000, for a total present value of all goals of almost $2,700,000. So the net resources have increased, but the margin of safety has not changed dramatically from five years prior.

It is interesting to see how the next five years will evolve, taking Anthony to a time which would be only five years from retirement. For example, Carrie's education goal is almost exactly funded by the Rockwell's net human capital. Ironically, therefore, one can view the Rockwells' remaining working life has to be almost entirely funding his children's education. In any event, it would appear critical for the Rockwells to approach their situation as a dynamic one and to make adjustments as their situation and priorities change.

There are an interesting set of questions regarding the investment strategies for the Rockwells. Could a fixed asset allocation of 60/40 be an appropriate asset structure for them? Would a life cycle fund be an adequate investment? Clearly it would be hard for a life cycle fund to be designed to meet both the retirement goals and the educational goals. How about the investment strategy suggested earlier of investing in a broad-based equity strategy ex the domestic financial sector? Clearly, over the next five years, the Rockwells' human capital, which was the largest part of the financial services exposure decreases, there is some value to moving back into the finance sector.

With regards to goals for the future, it is insightful to realize that the human capital is both dynamic and predictable, and should be used as a basis for designing an investment strategy. This is appropriate for the Rockwells' needs.

So far, we have viewed the Rockwell's lifetime R&C statement as dynamic, but largely predictable. Clearly, within this structure we can use simulation technology to give us a good view of how assets would evolve over time. This is technology that has been used widely and effectively in the financial planning community. However, there is another set of variables that needs to be simulated. This relates to the life expectancy and the health of the Rockwells. This lifetime R&C statement approach is a natural foundation for a joint simulation on both the growth of the asset and liability values or lifetime R&C statement evolution, and the life expectancy of the Rockwells.

Within this approach, one can set up a number of scenarios. For example, what levels and types of life insurance would be appropriate for the Rockwells? By simulating the Rockwells' life expectancy, one can identify the appropriate level of life insurance to minimize overall risk. A related structure would determine whether or not disability insurance for Anthony would be valuable. And, indeed, whether long-term assisted care might be an appropriate investment. Other questions that can be answered in the same framework relate to what happens if Anthony lost his job, if they did not receive the inheritance, or if social security were to be redefined.

The Rockwells' lifetime R&C statement is informative and a useful place to start understanding their future financial success. It is the basis for sensible and pragmatic financial planning, and we have found that this approach generates immediate client interest and attention.

In this approach, it is the portfolio of resources and goals, jointly defined, which must be managed, not just the portfolio of investments. The investments are simply one part of the Rockwells' asset structure and should be managed not in isolation, but in conjunction with the other assets and liabilities. The liabilities, or goals, are a very important part of the Rockwells' financial life. Finally, it is clear that irrespective of whatever his day job is, Anthony Rockwell is a hedge fund manager. It is an ironic comment, given the media's infatuation with hedge funds, that Anthony Rockwell is not alone, since every individual investor can, and should, also be viewed as a hedge fund manager, in that the "longs" (resources) and the "shorts" (goals) are strongly inter-related and cannot be viewed independently. This viewpoint offers much room for innovation in financial planning, and we would argue a better client experience for the Rockwells and their peers.

Margin of Safety Analysis

Risk related to investment strategies and spending levels can be made more understandable by applying a margin of safety analysis to a retirement plan and setting a risk budget. FIGS. 12 and 13 depict alternative ways of understanding a margin of safety. In FIG. 12, the margin of safety is the distance between the household resources, for instance in an unfavorable case, and the claims remaining be satisfied. For most people in retirement, the available resources dwindle as the end of the planning horizon approaches. Retirement is understandably more comfortable when the remaining claims are visibly less than the remaining resources. For this analysis, the resource trend depicted may sensibly be the normal trajectory of lifetime resources and claims, instead of a less favorable trajectory. FIG. 13 depicts a risk budget in relationship to the margin of safety that can be seen in FIG. 12. The risk budget is typically stated as the portion of asset value that may be lost over the course of the year in one out of 20 simulations of portfolio value, which corresponds to a 95% level of confidence. Other time horizons can, of course, be used to express risk and the other levels of confidence, such as 90% or 97%, can be used. One use of FIG. 13 is to alert a customer to whether the risk budget for a particular investment strategy is within the predicted margin of safety for available resources.

Figure 14:
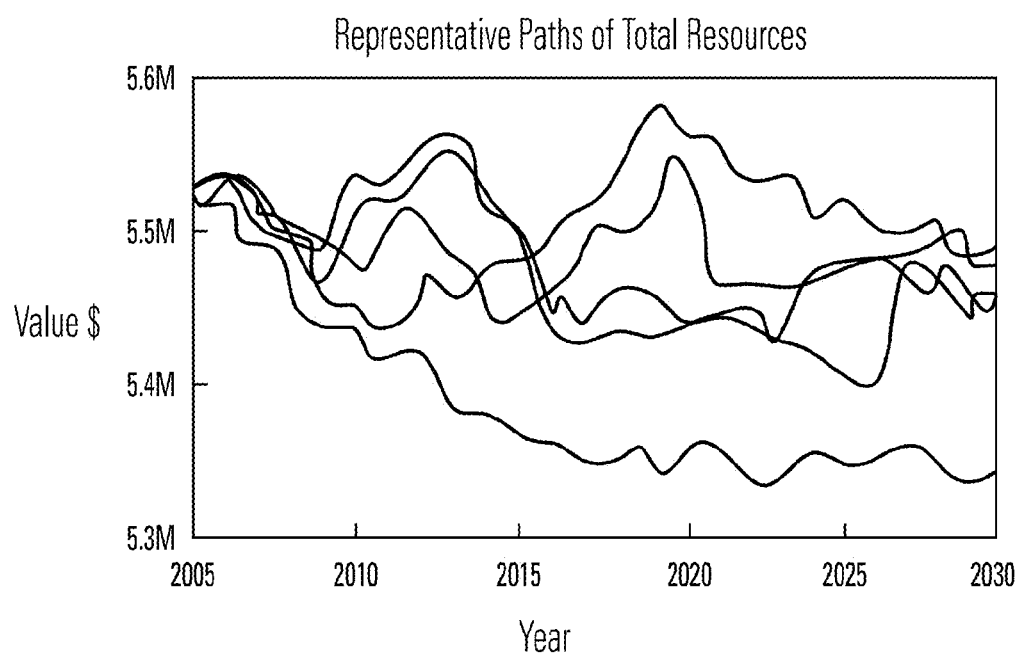
FIG. 14 depicts representative paths of total resources.

The next series of figures summarize the results of numerous simulation runs. These figures generally depict a random walk approach to simulation. FIG. 14 depicts representative paths of total resources. It shows that similar outcomes, represented by the upper for at lines may seem to follow different ups and downs over the years some of them being quite sharp. However, this kind of depiction of individual simulation cases needs to be summarized and aggregated to be very useful.

Figure 15:
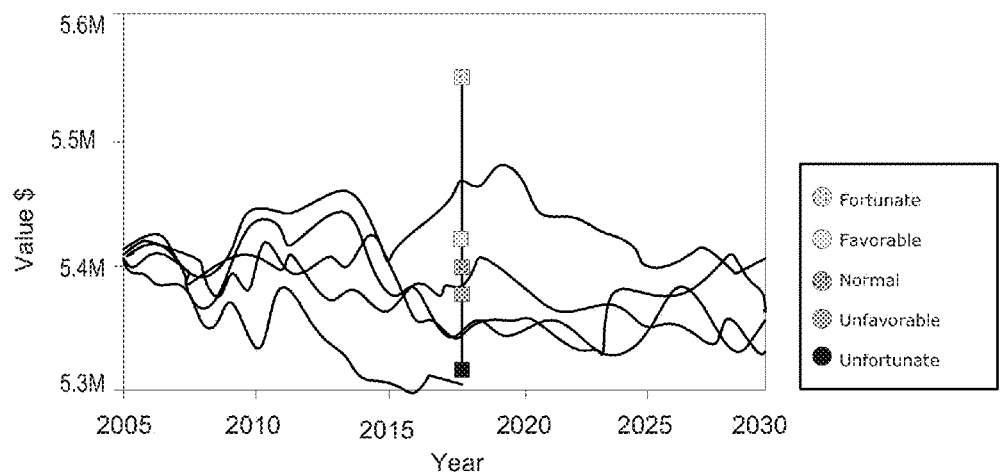
FIG. 15 labels the paths from fortunate to unfortunate, based on either a current progress or a projected outcome at the end of the planning horizon.

FIG. 15 depicts how, at each point in time, five cases can be selected. An unfortunate case can be the chosen so that 95% of the paths at that time resulted in greater remaining resources. The unfavorable case can be chosen so that 75% of the paths produce better results and 25% produce worse results. The normal case represents half of the paths and doing better than half the cases doing worse. The favorable cases chosen to do better than 75% of the paths. An unfortunate case is chosen to do better than 95% of the paths. In FIG. 15, these levels of fortune and misfortune are depicted for a midpoint between 2015 in 2020. By repeating this process at each point in time and connecting trend lines, we get curves that are referred to as trajectories. For instance, the normal trajectory is the curve formed by connecting together the selected normal case from each point in time.

Figure 16:
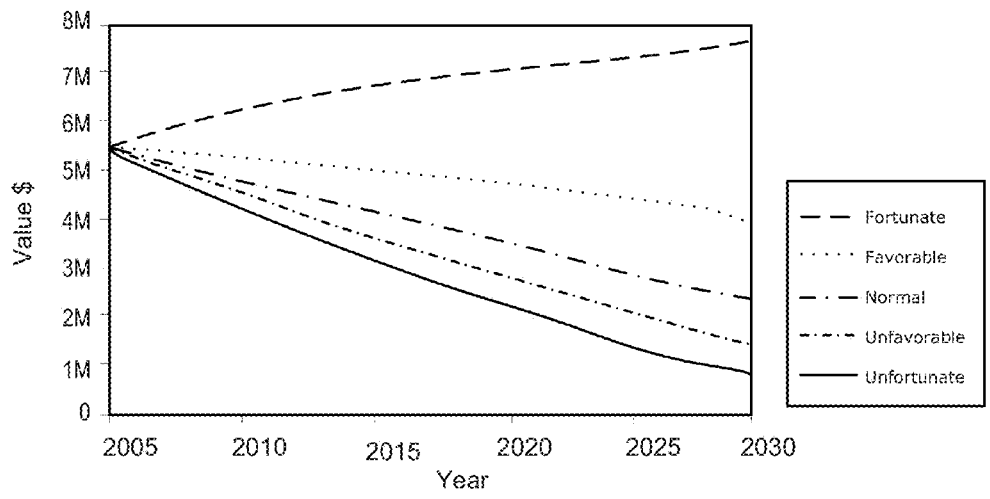
FIG. 16 normalizes the fortunate to unfortunate trajectories.

FIG. 16 depicts the trajectories of total resources. The trajectories are smoother than any individual path. The jerkiness of individual paths indicates how much things might change from period to period in the future, where as trajectories give us a sense of where paths might take us over time. The normal trajectory gives a neutral indication of how things might be expected to turn out. The favorable trajectory shows how things could turn out in the future investment climate were favorable, while the unfavorable trajectory gives a sense of outcomes if the investment climate turns poor. In general, the normal trajectory may be balanced with secondary and additional goals and even the unfortunate trajectory should leave room to satisfy essential goals and minimum requirements.

Goal achievement can be stated using the same five trajectories as depicted in FIG. 16. Typically, the cost of obligations is independent of good fortune. The cost of primary goals may be slightly lower in fortunate circumstances the unfortunate circumstances. The cost of secondary goals may increase with fortunate circumstances, for instance, as inflation carries the value of investments and the costs of meeting goals upward. The percentage of obligations funded, primary goals achieved, secondary goals achieved and additional goals achieved will vary depending on whether the unfortunate normal or fortunate case is considered. Residual funding may be realized only in fortunate or favorable cases. Alternatively, goal achievement can be summarized by the percentage of simulated paths that result in full funding of an obligation for a primary, secondary or additional goal. Yet alternatively, the average funding level of obligations and of primary, secondary and additional goals can be stated. Again, a reasonable plan is expected to produce an average funding of 100% of obligations and primary goals. Lesser percentages of full funding an average funding for secondary and additional goals will be predicted by the simulation model when lifetime resources and claims are relatively in balance.

Figure 17:
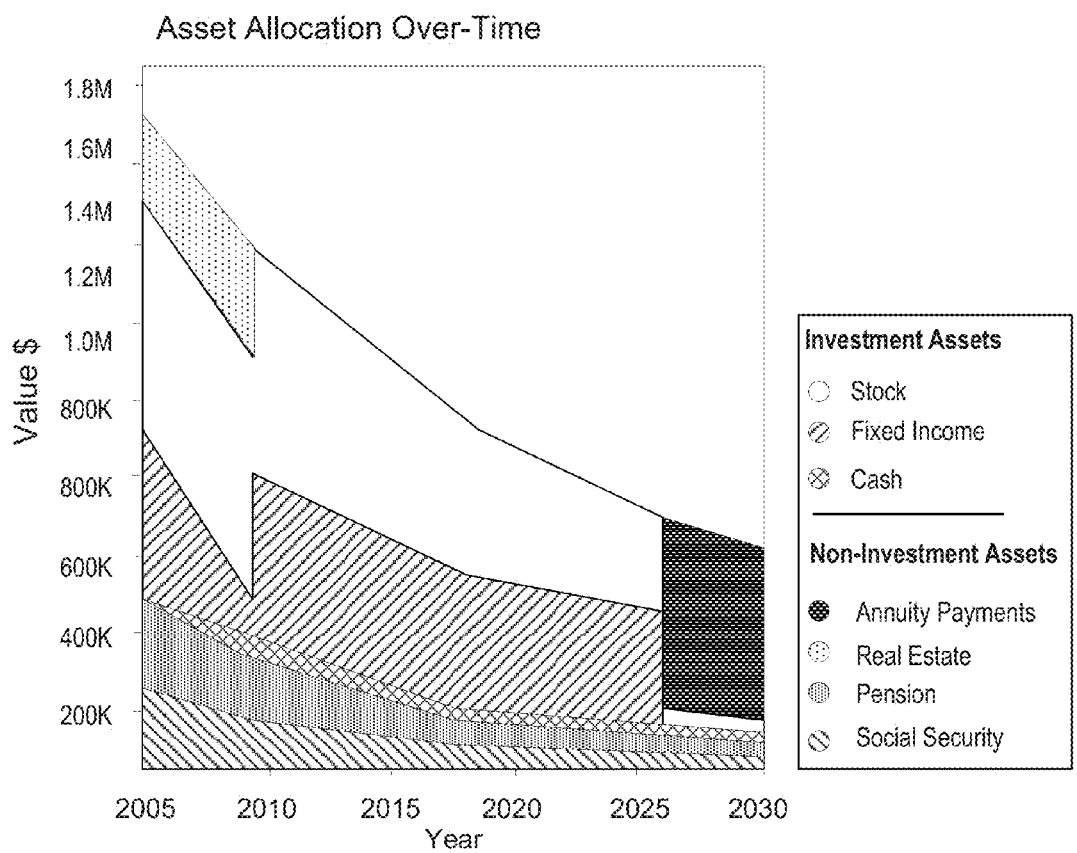
FIG. 17 depicts two major adjustments in asset allocation along a normal economic trajectory through the course of life.

FIG. 17 depicts two major adjustments in asset allocation along a normal economic trajectory through the course of life. In 2010, available resources for shift in from real estate, such as the family home, into fixed income investments. In 2027, stock and fixed income assets are largely converted to annuity payments. These conservative reallocations of assets are intended to keep the risk budget within the margin of resources and satisfy all claims.

Figure 18:
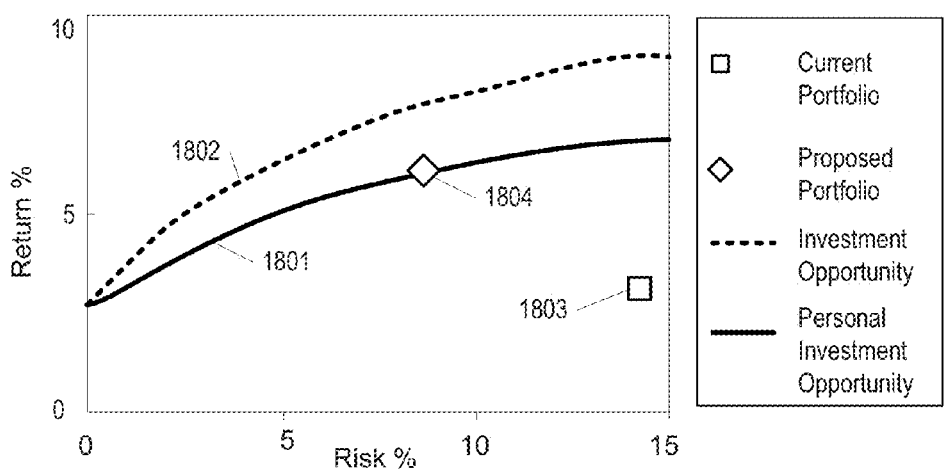
FIG. 18 depicts risk and reward relationships for a personal investment opportunity and the general investment opportunity.

The relationship between simulated risk and return is useful for comparison of alternative investment strategies. FIG. 18 depicts risk and reward relationships for a personal investment opportunity 1801 and the general investment opportunity 1802. The customer's current portfolio 1803 and a proposed portfolio 1804 are contrasted. The use of simulation to place a current portfolio and proposed portfolio on a graph of risk and returns is a powerful way to generate meaningful information from the sea of data that results when hundreds of simulation runs are performed.

FIGS. 19A-19B and 20A-20B present a cash flow and pro form a tax form report generated by simulation. The cash flow analysis depicts results in particular years. The results in FIG.

19 roughly correspond to the asset shift depicted in FIG. 17. That is common FIG. 19A, annuity payments are first realized in a column for 2030. Capital drawdown is no longer necessary when the annuity payments began, as annuities exceed income requirements. The pro form a tax report estimates for a particular year the household's tax position based on a simulated investment plan. It is to assist in working with a tax advisor, not for reporting to the IRS. This tool takes advantage of the basis values entered for assets that are liquidated during the simulation period and other tax attributes known to the system, simulating the tax calculations that apply, instead of taking an overall estimated tax rate that is insensitive to tax realization when assets are liquidated and gains realized.

Some Particular Embodiments

The technology disclosed may be practiced as a method or device adapted to practiced method. This technology may be embodied in an article manufacture such as computer readable media impressed with logic adapted to simulating an interaction among income, assets and expenses.

A Method, Embodiments and Aspects

One embodiment is a computerized method of simulating resources and claims of a household, including electronically receiving data regarding a household. The data represents responses to a questionnaire. The questionnaire covers at least plurality of positions in stocks and bonds. The information regarding these positions includes identification of industry sectors for the stocks and bonds, if the industry sectors are not automatically identified, for instance from a stock symbol. The questionnaire further may cover a home ownership, including a location of the home and one or more household members' preferences for disposition of the home. Disposition of the home may include borrowing money against the home, renting it, taking out a reverse mortgage (annuity) or selling it. The questionnaire further may cover an employment prospect for at least one household member, who may be presently employed, seeking employment or retired. The employment prospect may be described by an identification the employer, identification of an industry sector for the employer, if the industry sector is not automatically identified, and the household member's personal expectations of future job-related earnings and job stability. Related to the employment prospect is a description of the household member's preferences for partial and/or full retirement. These preferences may be expressed as definite dates or as a range of dates.

The method further includes creating a plurality of data structures from the received questionnaire data, including financial asset objects, a home asset object and a human capital object. The financial asset objects are adapted to represent the positions in stocks and bonds, including risk, return, allowable transaction types, cash flows and tax treatment. The allowable transaction types can capture the illiquidity of some stocks or bonds. The tax treatment may capture relevant dates and basis amounts. The method further includes creating at least one home asset object. The home asset object is adapted to represent the home ownership, including risk, return, the preferences for disposition of the home, cash flows and tax treatment. The method further includes creating at least one human capital object. The human capital object is adapted to represent the employment prospect, including at least milestones for future job-related earnings, full employment, partial retirement and full retirement. It further includes the industry sector for the household member and the household member's personal expectations of job stability. For an employed individual, the industry sector of the household member may be represented by the industry sector of the employer. The object further may include the household member's personal expectations of job-related earnings and job stability. The job-related earnings may include cash, stock options, retirement funds and other forms of compensation.

The method further includes modeling in computer readable memory economic interactions. Economic interactions may be between underlying economic factors and the data: the positions, the home ownership and the employment prospect. The various data objects are represented in the model. The modeling takes into account the industry sector of the household member and the industry sectors of the stocks and bonds, consequently, thereby modeling at least a risk of unemployment and decreased earnings and a coincidence of risk between the positions and the employment prospect. (It is not surprising to find that someone employed in an industry will feel comfortable investing in related industries, even though doing so increases their risk related to underperformance of that industry sector.) The method further includes repeatedly running a probabilistic simulation to evaluate performance of the positions, the homeownership and the employment prospect. This includes applying a plurality of a priori rules about liquidating the positions in stocks and bonds, modifying household expenses and drawing down equity and homeownership. The probabilistic simulation further includes accounting for tax consequences of income flows resulting from the future job-related earnings and application of the a priori rules. The results of the simulation, at least in summary form, are reported in some form, either to a display or to memory, where they can be referenced in the future.

A preferred way of using a priori rules in the probabilistic simulation is to apply them at the point in the simulation where choices are to be made, without any preview or omniscience of the future course of the simulation. This simulates what people do, selecting principles to govern their finances and applying the principles to the circumstances that they encounter.

One aspect of this is embodiment is that it may further include electronically receiving data corresponding to answers to a questionnaire covering various household expenses. The various household expenses may include at least periodic living expenses, educational expenses, such as for household members or others, and real estate acquisition. The periodic living expenses may change with retirement. Educational expenses may be for children, grandchildren or relatives. Real estate acquisition may include, for instance, buying or selling a vacation home or moving to a different, larger or smaller home. This aspect further includes electronically receiving desirability ratings of the various household expenses and alternative levels of funding for the various household expenses. The method further may include creating at least one household expense object as a data structure from the data. The household expense object is adapted to represent one of the various household expenses, including at least expense amounts and expense timing and the desirability ratings and the alternative levels of funding. With alternative levels of funding specified, the reporting may include whether full or partial funding of the various household expenses is achieved. For instance, it may be desirable but not essential to buy a retirement condominium. Or, there may be alternative levels of discretionary spending. The reporting may indicate, for instance, the percentage of the simulations in which there was enough money available to buy the retirement condominium.

Another aspect that may be combined with any of the embodiments above includes electronically receiving data regarding questions about entitlements. Typical entitlements include eligibility for Social Security and eligibility for pension payments. These entitlements may apply to some or all household members. This aspect further includes creating at least one miscellaneous income object as a data structure from the data. The miscellaneous income object is adapted to represent the entitlements, including at least milestones for income from the entitlements, indexing of the entitlements over time and survivor benefits payable to other household members. Then, the modeling in computer readable memory includes the entitlements along with other income and assets available to meet various household expenses.

Household expenses to be considered further may include paying down a mortgage on the home ownership. The questionnaire may further cover a mortgage type, mortgage terms and a desirability rating for early payoff of a mortgage. Retiring other debts also may be treated as a household expense.

Loosely categorized as a household expense, this computerized method further may cover donating to a charity. The questionnaire covering donating to a charity may cover a beneficiary name, whether cash or appreciated property is to be donated, an amount or specific property to be donated, a date or range of dates when the donation should occur and a desirability rating for the donation. Similarly, the so-called household expenses may include leaving a bequest. The questionnaire covering the bequest may cover a beneficiary name, whether cash or appreciated property is to be bequest, an amount or specific property to be bequest and a desirability rating for the bequest.

Household expenses further may include supporting a family member outside the household. For instance, supporting a parent or a relative.

Among the list of household expenses given, three, four, more or any combination that includes at least periodic living expenses may be simulated using the technology described.

The probabilistic simulation that is repeatedly run may include simulating by period over time the interaction and resulting resources available to satisfy the various household expenses. Practicing this aspect of the technology may further include following the a priori rules to apply the resources available in a particular period to satisfy the household expenses, first satisfying obligations including the mortgage and the tax consequences, then satisfying base levels of funding for the household expenses that have a high desirability rating. After satisfying the base levels, the resources available can be applied consistent with the desirability ratings and the alternative levels of funding to other household expenses. As dictated by scarce resources, some household expenses may be left unsatisfied, including being partially satisfied at a lower alternative level of funding.

Regarding educational expenses, the questionnaire may further elicit a beneficiary name, school name, type of educational institution for the school, expected years of attendance, current cost of attendance, levels of funding toward a future cost of attendance and desirability ratings for the levels of funding. Some of the questionnaire subjects may be automatically detected and entered with or without confirmation, based on the name of the school. As a further aspect, the modeling may include adjusting the current cost of attendance automatically using an index of educational cost increases. This index can be applied consistent with the underlying economic factors to reach a future cost of attendance coincident with the expected years of attendance. A further aspect may include covering in the questionnaire a preference between accumulating funds in a tax-advantaged account versus drawing from undesignated resources available during the expected years of attendance without pre-funding in a tax-advantaged account. This will impact the years in which the school expense is funded.

An Extended Method

This method may be extended to summarizing household resources and claims as of a particular date in the future. By that future date, resources and claims will have evolved and a priori rules will have been applied. The resources and claims as of that particular date in the future can be based on one or more results of repeatedly running a probabilistic simulation from the present through the particular date in the future to evaluate performance of the positions, the home ownership and the employment prospect and satisfaction of the household expenses, including applying the plurality of a priori rules and accounting for tax consequences of income flows resulting from the future job-related earnings and application of the a-priori rules. From the simulation, the resources and the claims as of the particular date in the future are derived from one or more results of repeatedly running the probabilistic simulation. A mean or median path of simulation may be selected or an average across all simulations.

This extended method includes evaluating, for the particular date, actuarial present value balances of at least the employment prospect, the entitlements, the household expenses, and tax consequences of the employment prospect and tax-deferred gains in the home ownership and the positions in stocks and bonds. Among the data object types, some are given an estimated present value and others are given an actuarial present value balance. Positions in stocks and bond and a home ownership can be sold, so an actual or estimated present value is used. Human capital and household expenses are yet to unfold, so an actuarial present value balance is more appropriate. Accordingly, the method may include summarizing for the present values on the particular date of certain resources and claims, including the positions in stocks and bonds, the home ownership and deferred taxes on gains in the positions and the home ownership, and summarizing the actuarial present value balances of other resources and of the claims, organized into groups of the resources and the claims. In the summary, a base level of living expenses, the tax consequences and the mortgage payments may be grouped, thereby representing obligations, and other of the household expenses may be organized by the desirability ratings of the household expenses, thereby representing at least primary and secondary goals among the household expenses.

An optional aspect of this method is that the various household expenses may be subject to different discount rates when calculating the actuarial present value balances. Obligations are unvarying, so a relatively lower discount rate should be applied to the obligations than, for instance, to the secondary goals. This corresponds to historical rates of return on very stable investments that can be used to assure funding of obligations, as opposed to riskier and potentially more profitable investments that can be used to reach funding levels necessary to achieve secondary goals. A logical consequence of varying discount rates is that demoting a financial goal from essential to secondary, for instance, will make it more affordable, but less certain to be accomplished, if the investment opportunities are matched to goal priority.

This method of summarizing a lifetime of resources and claims further includes reporting a residual (or deficit) of the resources exceeding the claims, thereby reflecting wealth building.

A System, Embodiments and Aspects

As a computerized system, the technology described includes a system that simulates pre- and post-retirement income streams, assets and expenses and applies preferences for trade-offs among financial goals. Features of the system may implement any of the methods or aspects of methods described herein. In particular, the system may include a processor, at least one memory coupled to the processor, and the simulation module, operative on the processor and the memory.

The system further includes a collection of data structures in the memory. The data structures are populated from electronically received responses to a questionnaire. The data structures include financial asset objects, a home asset object, a human capital object and a priori rules. The financial asset objects are adapted to represent the positions in stocks and bonds, including risk, return, allowable transaction types, cash flows and tax treatment. The allowable transaction types can capture the illiquidity of some stocks or bonds. The tax treatment may capture relevant dates and basis amounts. The home asset object is adapted to represent the home ownership, including risk, return, the preferences for disposition of the home, cash flows and tax treatment. The human capital object is adapted to represent the employment prospect, including at least milestones for future job-related earnings, full employment, partial retirement and full retirement. It further includes the industry sector for the household member and the household member's personal expectations of job stability. For an employed individual, the industry sector of the household member may be represented by the industry sector of the employer. The object further may include the household member's personal expectations of job-related earnings and job stability. The job-related earnings may include cash, stock options, retirement funds and other forms of compensation. The a priori rules address at least liquidating the positions in stocks and bonds, modifying household expenses and drawing down equity and homeownership.

The system further includes a model in computer readable memory representing economic interactions. Economic interactions may be between underlying economic factors and the data: the positions, the home ownership and the employment prospect using the financial asset objects, the home asset object and the human capital object. The model takes into account the industry sector of the household member and the industry sectors of the stocks and bonds, consequently, thereby modeling at least a risk of unemployment and decreased earnings and a coincidence of risk between the positions and the employment prospect.

The system further includes simulation logic, run by the simulation model, operative to repeatedly execute a probabilistic simulation to evaluate performance of the positions, the homeownership and the employment prospect. This includes applying a plurality of a priori rules about liquidating the positions in stocks and bonds, modifying household expenses and drawing down equity and homeownership. The probabilistic simulation further includes accounting for tax consequences of income flows resulting from the future job-related earnings and application of the a priori rules. The results of the simulation, at least in summary form, are reported in some form, either to a display or to memory, where they can be referenced in the future.

Again, the system may implement the methods, embodiments of methods and aspects of methods described above. For instance, the data objects of the system further may include one or more miscellaneous income objects as data structures adapted to represent entitlements to social security and/or pension payments, including at least milestones for income from the entitlements, indexing of the entitlements over time and survivor benefits payable to other household members from the entitlements. According to this aspect, the simulation logic may take into account income from the miscellaneous income objects when applying the a-priori rules.

Another Method Resembling the Extended Method

Another method described is a method of summarizing household resources and claims through a future lifetime as of a particular date, which is useful when a household is balancing proposed claims against the resources. This method includes accessing a collection of data structures in computer readable memory. The data structures may include financial asset objects, a home asset object, a human capital object, a miscellaneous income object and a plurality of household expense objects. The financial asset objects are adapted to represent the positions in stocks and bonds, including risk, return, allowable transaction types, cash flows and tax treatment. The allowable transaction types can capture the illiquidity of some stocks or bonds. The tax treatment may capture relevant dates and basis amounts. The method further includes creating at least one home asset object. The home asset object is adapted to represent the home ownership, including risk, return, the preferences for disposition of the home, cash flows and tax treatment. The method further includes creating at least one human capital object. The human capital object is adapted to represent the employment prospect, including at least milestones for future job-related earnings, full employment, partial retirement and full retirement. It further includes the industry sector for the household member and the household member's personal expectations of job stability. For an employed individual, the industry sector of the household member may be represented by the industry sector of the employer. The object further may include the household member's personal expectations of job-related earnings and job stability. The job-related earnings may include cash, stock options, retirement funds and other forms of compensation. The one miscellaneous income object is adapted to represent entitlements to a social security benefit or a pension benefit, including at least milestones for income from the entitlements, indexing of the entitlements over time and survivor benefits payable from the entitlements. The plurality of household expense objects are adapted to represent various household expenses, one of the household expense objects including at least expense amounts and expense timing, a desirability rating for a particular household expense and alternative levels of funding for the particular household expense.

The method further includes evaluating, for a particular date, actuarial present value balances of at least the employment prospect, the entitlements, the household expenses, and tax consequences of the employment prospect and tax-deferred gains in the home ownership and the positions in stocks and bonds. Among the data object types, some are given an estimated present value and others are given an actuarial present value balance. Positions in stocks and bond and a home ownership can be sold, so an actual or estimated present value is used. Human capital and household expenses are yet to unfold, so an actuarial present value balance is more appropriate. Accordingly, the method may include summarizing for the particular date present values of certain resources and claims, including the positions in stocks and bonds, the home ownership and deferred taxes on gains in the positions and the home ownership, and the actuarial present value balances of other resources and of the claims, organized into groups of the resources and the claims. In the summary, a base level of living expenses, the tax consequences and the mortgage payments may be grouped, thereby representing obligations, and other of the household expenses may be organized by the desirability ratings of the household expenses, thereby representing at least primary and secondary goals among the household expenses.

An optional aspect of this method is that the various household expenses may be subject to different discount rates when calculating the actuarial present value balances. Obligations are unvarying, so a relatively lower discount rate should be applied to the obligations than, for instance, to the secondary goals. This corresponds to historical rates of return on very stable investments that can be used to assure funding of obligations, as opposed to riskier and potentially more profitable investments that can be used to reach funding levels necessary to achieve secondary goals. A logical consequence of varying discount rates is that demoting a financial goal from essential to secondary, for instance, will make it more affordable, but less certain to be accomplished, if the investment opportunities are matched to goal priority.

This method of summarizing a lifetime of resources and claims further includes reporting a residual (or deficit) of the resources exceeding the claims, thereby reflecting wealth building.

As a further aspect of this method, early retirement may be treated as a claim, when a range of dates are provided for potential retirement, and grouped according to a desirability rating of the early retirement.

For some purposes, it may be desirable to summarize household resources and claims at a particular date in the future, as opposed to today. By that future date, resources and claims will have evolved and a priori rules will have been applied. The resources and claims as of that particular date in the future can be based on one or more results of repeatedly running a probabilistic simulation from the present through the particular date in the future, following the methods and aspects of methods described above. In more detail, embodiment of the method may include accessing a data structure in memory adapted to represent a plurality of a priori rules about preferences for liquidating the positions in the stocks and bonds, modifying household expenses and drawing down equity in the home ownership. It further includes accessing a model in computer readable memory that represents economic interaction among underlying economic factors, the positions, the home ownership and the employment prospect using the financial asset objects, the home asset object and the human capital object, taking into account the industry sector of the household member and the industry sectors of the stocks and bonds. Repeatedly running a probabilistic simulation evaluates performance of the positions, the home ownership and the employment prospect and satisfaction of the household expenses, including applying the plurality of a priori rules and accounting for tax consequences of income flows resulting from the future job-related earnings and application of the a-priori rules. From the simulation, the resources and the claims as of the particular date in the future are derived from one or more results of repeatedly running the probabilistic simulation. A mean or median path of simulation may be selected or an average across all simulations.

A General Method

A general method describes and refines retirement-related objectives for a household, producing results that are useful for lifetime planning. The general method includes, for the household members, collecting data on computer-accessible storage media including a plurality of future wage scenarios (hereinafter "FWSs"). The FWSs include at least planned and latest dates of partial and/or full retirement and a range of expected wage levels prior to retirement. They also include eligibility for social security and pensions. This method further includes automatically converting the household members' data into financial terms suitable for simulation. For the household, the method includes collecting data on computer-accessible storage media including economic descriptions of a plurality of assets including at least investments and a family home, a plurality of future income requirements (hereinafter "FIRs") for living expenses, segmented at least by age or retirement status of the household members, the FIRs including at least planned and minimum requirements for living expenses. The household data collection further addresses concrete life objectives beyond the FIRs. The concrete life objectives may be elicited in terms of accomplishing predetermined goals, meaning eliciting data specific to the predetermined goals and not simply eliciting a generic cash flow and naming it. The predetermined goals cover at least four of: paying down a mortgage on the family home; retiring other debt(s) of the household members; putting a child through school; donating to a charity; leaving a bequest; supporting a family member other than the household members; and disposition of the family home.

The general method further includes automatically converting the household's data into financial terms suitable for simulation. Simulating by period, using the collected data for the household members and the household, walks through a range of future economic conditions and their impact on at least the investments, the family home and the FWSs and on the FIRs. The simulation also walks through the interaction between resources and goals, beyond the latest dates of full retirement. It calculates resulting satisfaction of at least planned and minimum FIRs and, as resources permit, funding of additional financial goals. This method includes storing on computer-accessible storage media at least summary simulation results or displaying the results on a display device.

This method may be applied to a plurality of household members having at least some individual objectives. According to the method, collecting household member data on computer-accessible storage media may further include collecting at least planned and latest dates of partial and/or full retirement.

Another aspect of the method ma include, for the household, collecting relative priorities among the concrete life objectives and planned and minimum FIRs. Then, when simulating by period the funding over time, applying funds available in a particular period successively to meet high priority objectives, including at least the minimum FIRs, then applying the funds available consistent with the relative priorities. According to this aspect, the funds available in a particular period may be limited automatically, such that at least the minimum FIRs are met until the household members reach simulated deaths. The method stores storing on computer-accessible storage media at least summary results of the simulation indicating at least a degree of success in funding of planned FIRs and the concrete objectives.

An alternative aspect of this method, that may be combined with other aspects above, includes following up on a predetermined goal of paying down a mortgage on the family home further by eliciting a mortgage type and mortgage terms adapted to the mortgage type and eliciting a goal to pay off the mortgage early.

Another alternative aspect includes following up on a predetermined goal of retiring other debt(s) of the household members by eliciting type of debt, periodic obligations and lump sum obligations adapted to that debt type and eliciting a goal to pay off the debt pay-off earlier than required by the terms of the debt.

Following up on a predetermined goal of putting the child through school may include eliciting a beneficiary name, a school name, a type of educational institution for the school, expected years of attendance, current cost of attendance, and a relative priority of the putting the child through school goal. This follow-up may carry through to adjusting the current cost of attendance automatically using an index of educational cost increases and consistent with the simulated economic conditions.

Following up on the putting the child through school goal may further include eliciting a plurality of percentages of the adjusted cost of attendance to be paid out of available resources and relative priorities among the plurality of percentages. For instance, a higher priority to pay half the cost of college education than to pay the whole cost. Following up may further include eliciting a choice among accumulating funds in a tax advantaged account or drawing from general resources during the years of attendance.

In yet another aspect, following up on the predetermined goal of donating to the charity may include eliciting a beneficiary name, whether cash or appreciated property is to be donated, an amount or specific property to be donated, a date or range of dates when the donation should occur and a relative priority of the donation.

Similarly, following up on the predetermined goal of leaving the bequest may includes eliciting a beneficiary name, whether cash or property is to be bequest, an amount or specific property to be bequest, and a relative priority of the bequest.

Eliciting details of the predetermined goal of supporting the family member other than the household members may include eliciting a beneficiary name, an amount of support in current dollars and expected years of support.

Eliciting the predetermined goal for disposition of the family home may include eliciting a relative priority of retaining the family home from categories in a range spanning at least: sell in a particular time frame; sell if necessary; or hold. For at least some alternative dispositions (e.g., other than hold), it may include eliciting a home basis and a date of acquisition event related to tax consequences, an approximate current value, a market location information from which an increase or decrease in value can be simulated, and whether the family home will be replaced by purchase of other real estate.

When collecting the economic descriptions of investments, the data collected may include eliciting liquidity, selected from predetermined categories spanning at least the range of immediately liquid market with prices published daily to limited liquidity with prices negotiated per transaction to limited control over liquidation.

When simulating by period, the economic conditions modeled may produce varied sets of potential conditions for at least inflation, interest rates and economic expansion that are self-consistent within a period and between successive periods.

Applying this method, collecting the economic descriptions of investments data may further include eliciting investment basis and a date of acquisition event related to tax consequences. Then, simulating by period can utilizes the investment basis and the acquisition event date to evaluate tax consequences of tax realization events. As with the other aspects and further included features, this feature can optionally be combined with virtually any of the foregoing aspects, features or embodiments.

Any of the methods or systems described above can be enhanced by producing from the simulation results a comparison of a present value of available resources, a present value of claims against the available resources and a margin of safety by which the available resources should exceed the claims. In some presentations, the comparison is presented as a graph over time of the present value of available resources, the present value of claims against the available resources and the margin of safety by which the available resources should exceed the claims It is useful, optionally, for the eligibility data collected for social security eligibility to conform to government reporting of eligibility, either as reported on paper or in response to an electronic query. Then, the simulating further includes applying rules for determining social security benefits that take into account simulated date of retirement, simulated income during partial retirement and simulated survival of one wager earner after the death of an other wage earner.

Similarly, it is useful, optionally, for the eligibility data collected for pension eligibility to conform to a pension fund statement of eligibility, either as reported on paper or in response to an electronic query. Again, the simulating will then further include applying pension fund rules for determining pension benefits, including rules for determining pension amount, taking into account simulated date of retirement, simulated income during partial retirement and simulated survival of one wager earner after the death of an other wage earner.

Optionally, when one of the investments is in real property, the method may include eliciting a real property sale goal, including eliciting a relative priority of retaining the real property from categories in a range spanning at least sell in a particular time frame, sell if necessary, or hold. For at least some relative priority categories, eliciting a real property basis and a date of acquisition event related to tax consequences, an approximate current value, an approximate target date of sale, either by age, year or relative to retirement date; and market location information from which an increase or decrease in value can be simulated. While the present invention is disclosed by reference to the preferred embodiments and examples detailed above, it is understood that these examples are intended in an illustrative rather than in a limiting sense. Computer-assisted processing is implicated in the described embodiments. Accordingly, the technology described may be embodied in methods for simulating resources and claims of a household and for stating lifetime resources and claims of the household in summary form. The technology may be incorporated in a system including logic and resources to simulate resources and claims of a household and to summarize lifetime resources and claims of the household, systems that take advantage of computer-assisted simulating of resources and claims of a household and/or for stating lifetime resources and claims of the household in summary form, media impressed with logic to carry out the simulating and/or summarizing methods, data streams impressed with logic to carry out he simulating and/or summarizing methods, or computer-accessible services that carry out computer-assisted simulating and/or summarizing methods. It is contemplated that modifications and combinations will readily occur to those skilled in the art, which modifications and combinations will be within the spirit of the invention and the scope of the following claims.

We claim as follows:

1. A method of summarizing household resources and claims through a future lifetime as of a particular date, thereby enabling a household to balance the claims against the resources over a time horizon, the method including:

accessing a collection of data structures in computer readable memory, including a savings object adapted to represent net savings cash flows prior to retirement;

a plurality of financial asset objects adapted to represent positions in financial assets and associated cash flows, if any, and a plurality of household expense objects adapted to represent various post-retirement household expenses, the household expense objects including at least expense amounts and expense timing, and a desirability rating for a particular household expense; and evaluating using a processor and summarizing for a particular date present values of resources and claims over a predicted lifetime, the resources and claims including at least the net savings cash flows prior to retirement, the positions in financial assets and the post-retirement household expenses, the summary organized into groups of the resources and the claims, wherein a base level of the household expenses are grouped together as obligations, other of the household expenses are organized by the desirability ratings of the household expenses, thereby representing at least primary and secondary goals among the household expenses, and a residual (or deficit) of the resources exceeding (or failing to satisfy) the claims is reported, thereby reflecting wealth building.

2. The method of claim 1, further including:

accessing at least one real estate object adapted to represent a real estate holding and associated cash flows, if any; and evaluating using a processor and summarizing for the particular date further includes the real estate holding and associated cash flows, wherein mortgage payments are grouped with the obligations.

3. The method of claim 1, wherein:

the plurality of household expense objects are further adapted to represent alternative levels of funding for the particular household expense; and using the alternative levels of funding to organize at least the primary and secondary goals for the household expenses.

4. The method of claim 2, further including:

repeatedly running a probabilistic simulation to stress test performance of at least the financial assets; and applying a plurality of a-priori rules about liquidating the positions in the financial assets and modifying the household expenses to satisfy the claims.

5. The method of claim 4, wherein the stress tested by the probabilistic simulation includes economic conditions.

6. The method of claim 4, wherein the stress tested by the probabilistic simulation includes at least one of disability or catastrophic illness.

7. The method of claim 4, further including executing the a-priori rules in the probabilistic simulation based on a state of the simulation when a choice is to be made, without previewing a future course of the probabilistic simulation.

8. The method of claim 2, further including:

accessing the collection of data structures in computer readable memory, wherein at least the financial asset objects and the real estate object are adapted to include tax attribute data; and evaluating using the processor tax consequences at least of liquidating positions in the financial assets and using financial equity in the real estate;

wherein the summary includes the tax consequences as obligations.

9. The method of claim 2, wherein the accessing the collection of data structures in computer readable memory, further includes at least one educational expense object that represents at least a beneficiary name, a school name, a type of educational institution for the school, expected years of attendance, a current cost of attendance, and alternative levels of funding toward a future cost of attendance; and evaluating using the processor future educational expenses represented by the educational expense object, wherein the summary includes the alternative levels of funding the future educational expenses with the primary and secondary goals.

10. The method of claim 9, further including automatically adjusting the current cost of attendance using an index of educational cost increases, consistent with at least the type of educational institution and the expected years of attendance.

11. A method of summarizing household resources and claims through a future lifetime as of a particular date, thereby enabling a household to balance the claims against the resources over a time horizon, the method including:

accessing a collection of data structures in computer readable memory, including a savings object adapted to represent net savings cash flows prior to retirement;

a plurality of financial asset objects adapted to represent positions in financial assets and associated cash flows, if any, and a plurality of household expense objects adapted to represent various post-retirement household expenses, the household expense objects including at least alternative levels of funding and expense timing for a particular household expense; and evaluating using a processor and summarizing for a particular date present values of resources and claims over a predicted lifetime, the resources and claims including at least the net savings cash flows prior to retirement, the positions in financial assets and the post-retirement household expenses, the summary organized into groups of the resources and the claims, wherein a base level of the household expenses are grouped as obligations, other of the household expenses are organized by the alternative levels of funding, thereby representing at least primary and secondary goals among the household expenses, and and a residual (or deficit) of the resources exceeding (or failing to satisfy) the claims is reported, thereby reflecting wealth building.

12. The method of claim 11, wherein:

accessing the collection of data structures further includes accessing at least one human capital object adapted to represent an employment prospect of a household member, associated cash flows, if any, and preferred dates of partial retirement and full retirement; and evaluating and summarizing the resources and claims further includes the employment prospect.

13. The method of claim 12, wherein the human capital object is further adapted to represent alternative dates of the early retirement, further including treating the early retirement as a claim, wherein the summary organized into groups includes the alternative dates of the early retirement with the primary and secondary goals.

14. The method of claim 12, further including repeatedly running a probabilistic simulation to stress test performance of at least the financial assets and the employment prospect, including applying a plurality of a-priori rules about liquidating the positions in the financial assets and modifying the household expenses to satisfy the claims.

15. The method of claim 14, further including:

accessing industry sector data that identifies industry sectors of the financial asset objects and the employment prospect; and when running the probabilistic simulation, taking into account covariance among the industry sectors.

16. The method of claim 15, further including, when running the probabilistic simulation, taking into account risks of unemployment related to the employment prospect.

17. The method of claim 14, further including executing the a-priori rules in the probabilistic simulation based on a state of the simulation when a choice is to be made, without previewing a future course of the probabilistic simulation.

18. The method of claim 12, wherein:
the accessing the collection of data structures in computer readable memory further includes at least one real estate object adapted to represent a real estate holding and cash flows, if any, whether the real estate is a residence, and one or more household members' preferred disposition of the real estate; and
the evaluating the present values of the resources and claims further includes the real estate, wherein mortgage payments for the real estate are grouped with obligations.

19. The method of claim 12, further including:
accessing at least one educational expense object that is adapted to represent at least a beneficiary name and alternative levels of funding toward a future cost of attendance; and
evaluating using a processor and summarizing further includes the educational expense object, wherein the summary includes the alternative levels of educational expenses with the primary and secondary goals.

20. The method of claim 19, further including automatically adjusting the current cost of attendance using an index of educational cost increases, consistent with at least the type of educational institution and the expected years of attendance.

21. A non-transitory machine readable storage memory that stores computer instructions that instruct a processor to:
access a collection of data structures in computer readable memory, including
a savings object adapted to represent net savings cash flows prior to retirement;
a plurality of financial asset objects adapted to represent positions in financial assets and associated cash flows, if any,
at least one real estate object adapted to represent a real estate holding and associated cash flows, if any,
a plurality of household expense objects adapted to represent various post-retirement household expenses, the household expense objects including at least alternative levels of funding and expense timing for a particular household expense; and
evaluate and summarize for a particular date present values of resources over a predicted lifetime and claims, the resources and claims including at least net savings cash flows prior to retirement, the positions in financial assets, the real estate, and the post-retirement household expenses, the summary organized into groups of the resources and the claims, wherein
a base level of the household expenses and obligations including mortgage payments for the real estate are grouped together as obligations,
other of the household expenses are organized by the alternative levels of funding, thereby representing at least primary and secondary goals among the household expenses, and
and a residual (or deficit) of the resources exceeding (or failing to satisfy) the claims is reported, thereby reflecting wealth building.

22. A non-transitory machine readable storage memory that stores computer instructions that instruct a processor to:
access a collection of data structures in computer readable memory, including
a savings object adapted to represent net savings cash flows prior to retirement;
a plurality of financial asset objects adapted to represent positions in financial assets and associated cash flows, if any,
at least one human capital object adapted to represent an employment prospect of a household member, including at least expected future job-related earnings, and preferred dates of partial retirement and full retirement,
a plurality of household expense objects adapted to represent various post-retirement household expenses, the household expense objects including at least expense amounts and expense timing, and a desirability rating for a particular household expense; and
evaluate using a processor and summarizing for a particular date present values of resources and claims over a predicted lifetime, the resources and claims including at least the net savings cash flows prior to retirement, the positions in financial assets, the employment prospect and the household expenses, the summary organized into groups of the resources and the claims, wherein
a base level of the household expenses as obligations,
other of the household expenses are organized by the desirability ratings of the household expenses, thereby representing at least primary and secondary goals among the household expenses, and
and a residual (or deficit) of the resources exceeding (or failing to satisfy) the claims is reported, thereby reflecting wealth building.

23. The machine readable storage memory of claim 22, further storing computer instructions that instruct a processor to repeatedly run a probabilistic simulation to evaluate performance of at least the financial assets and the employment prospect, including applying a plurality of a-priori rules about liquidating the positions in the financial assets and modifying the household expenses to satisfy the claims.

24. The machine readable memory of claim 22, further storing computer instructions that instruct a processor, when running the probabilistic simulation, to take into account risks of unemployment related to the employment prospect.

25. A system including:
a processor and memory coupled to the processor that stores computer instructions that instruct a processor to:
access a collection of data structures in computer readable memory, including
a savings object adapted to represent net savings cash flows prior to retirement;
a plurality of financial asset objects adapted to represent positions in financial assets and associated cash flows, if any,
at least one real estate object adapted to represent a real estate holding and associated cash flows, if any, and one or more household members' preferred disposition of the real estate,
a plurality of household expense objects adapted to represent various post-retirement household expenses, the household expense objects including at least alternative levels of funding and expense timing for a particular household expense; and
evaluate and summarize for a particular date present values of resources and claims over a predicted lifetime, the resources and claims including at least the net savings cash flows prior to retirement, the positions in financial assets, the real estate, the employment prospect and the post-retirement household expenses, the summary organized into groups of the resources and the claims, wherein
- a base level of the household expenses and obligations including mortgage payments for the real estate are grouped together as obligations,
- other of the household expenses are organized by the alternative levels of funding, thereby representing at least primary and secondary goals among the household expenses, and
- and a residual (or deficit) of the resources exceeding (or failing to satisfy) the claims is reported, thereby reflecting wealth building.

26. A system including:
a processor and memory coupled to the processor that stores computer instructions that instruct the processor to:
access a collection of data structures in computer readable memory, including
- a savings object adapted to represent net savings cash flows prior to retirement;
- a plurality of financial asset objects adapted to represent positions in financial assets and associated cash flows, if any,
- at least one human capital object adapted to represent an employment prospect of a household member, including at least expected future job-related earnings, and preferred dates of partial retirement and full retirement,
- a plurality of household expense objects adapted to represent various post-retirement household expenses, the household expense objects including at least expense amounts and expense timing, and a desirability rating for a particular household expense; and evaluate using a processor and summarizing for a particular date present values of resources and claims over a predicted lifetime, the resources and claims including at least the net savings cash flows prior to retirement, the positions in financial assets, the employment prospect and the post-retirement household expenses, the summary organized into groups of the resources and the claims, wherein
- a base level of the household expenses as obligations,
- other of the household expenses are organized by the desirability ratings of the household expenses, thereby representing at least primary and secondary goals among the household expenses, and
- and a residual (or deficit) of the resources exceeding (or failing to satisfy) the claims is reported, thereby reflecting wealth building.

27. The system of claim 26, further storing computer instructions that instruct a processor to repeatedly run a probabilistic simulation to stress test performance of at least the financial assets and the employment prospect, including applying a plurality of a-priori rules about liquidating the positions in the financial assets and modifying the household expenses to satisfy the claims.

28. The system of claim 26, further storing computer instructions that instruct a processor, when running the probabilistic simulation, to take into account risks of unemployment related to the employment prospect.

* * * * *